United States Patent
Oh et al.

(10) Patent No.: US 12,507,204 B2
(45) Date of Patent: Dec. 23, 2025

(54) DEVICE AND METHOD FOR PERFORMING PAGING IN WIRELESS COMMUNICATION SYSTEM

(71) Applicant: Samsung Electronics Co., Ltd., Suwon-si (KR)

(72) Inventors: Jinyoung Oh, Suwon-si (KR); Taehyoung Kim, Suwon-si (KR); Hoondong Noh, Suwon-si (KR); Hyoungju Ji, Suwon-si (KR); Jinhyun Park, Suwon-si (KR); Youngrok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 310 days.

(21) Appl. No.: 18/011,342

(22) PCT Filed: Jun. 10, 2021

(86) PCT No.: PCT/KR2021/007269
§ 371 (c)(1),
(2) Date: Dec. 19, 2022

(87) PCT Pub. No.: WO2021/256777
PCT Pub. Date: Dec. 23, 2021

(65) Prior Publication Data
US 2023/0262651 A1 Aug. 17, 2023

(30) Foreign Application Priority Data
Jun. 19, 2020 (KR) ........................ 10-2020-0075342

(51) Int. Cl.
*H04W 68/02* (2009.01)
*H04W 72/1273* (2023.01)
*H04W 72/232* (2023.01)

(52) U.S. Cl.
CPC ....... *H04W 68/02* (2013.01); *H04W 72/1273* (2013.01); *H04W 72/232* (2023.01)

(58) Field of Classification Search
CPC ............... H04W 68/005; H04W 68/02; H04W 72/1273; H04W 72/23; H04W 72/232; Y02D 30/70
See application file for complete search history.

(56) References Cited

U.S. PATENT DOCUMENTS 9,148,748 B2 * 9/2015 Wang ..................... H04W 76/27
10,448,361 B2 * 10/2019 Chen ...................... H04W 72/23
(Continued)

FOREIGN PATENT DOCUMENTS

CN 110063030 A 7/2019
CN 111972004 A * 11/2020 ............ H04W 72/23
(Continued)

OTHER PUBLICATIONS

LG Electronics; Paging design in NR; 3GPP TSG RAN WG1 Meeting #92; R1-1802205; Feb. 26, 2018, Athens, Greece.
(Continued)

*Primary Examiner* — Eric Nowlin
(74) *Attorney, Agent, or Firm* — Jefferson IP Law, LLP

(57) ABSTRACT

The present disclosure relates to a 5$^{th}$ generation (5G) or pre-5G communication system for supporting a higher data transmission rate than a 4$^{th}$ generation (4G) communication system, such as long term evolution (LTE). According to various embodiments of the present disclosure, provided is an operation method of a UE in a wireless communication system, the method comprising the steps of: monitoring a physical downlink control channel (PDCCH) in a configured paging occasion; acquiring a downlink control information (DCI) format via the PDCCH; acquiring a paging group indicator included in the DCI format; receiving a physical (Continued)

downlink shared channel (PDSCH) scheduled by the DCI format; determining whether a UE corresponds to the paging group indicator; and performing decoding on the PDSCH on the basis of whether the UE corresponds to the paging group indicator.

14 Claims, 19 Drawing Sheets

(56) References Cited

U.S. PATENT DOCUMENTS

| | | | |
|---|---|---|---|
| 10,602,481 B2 * | 3/2020 | Chen | H04W 68/02 |
| 10,827,460 B2 | 11/2020 | Lee et al. | |
| 10,945,254 B2 | 3/2021 | Soriaga et al. | |
| 10,951,359 B2 * | 3/2021 | Huang | H04W 72/23 |
| 10,993,196 B2 * | 4/2021 | Jung | H04W 56/0015 |
| 11,129,208 B2 | 9/2021 | Huang et al. | |
| 11,218,353 B2 | 1/2022 | Chen et al. | |
| 11,363,563 B2 | 6/2022 | Pan et al. | |
| 11,569,889 B2 * | 1/2023 | Koskela | H04W 56/001 |
| 11,617,141 B2 * | 3/2023 | Jung | H04W 56/0015 370/350 |
| 11,617,195 B2 * | 3/2023 | Huang | H04L 5/0053 370/329 |
| 2014/0369326 A1 * | 12/2014 | Wang | H04W 72/0446 370/336 |
| 2016/0057731 A1 * | 2/2016 | Damnjanovic | H04W 68/005 455/458 |
| 2017/0013433 A1 * | 1/2017 | Lee | H04W 4/06 |
| 2018/0139720 A1 * | 5/2018 | Chen | H04W 72/51 |
| 2018/0270790 A1 | 9/2018 | Shi et al. | |
| 2019/0222357 A1 * | 7/2019 | Huang | H04W 72/0446 |
| 2019/0230628 A1 * | 7/2019 | Chen | H04W 4/70 |
| 2019/0342907 A1 * | 11/2019 | Huang | H04W 72/23 |
| 2019/0349902 A1 | 11/2019 | Soriaga et al. | |
| 2020/0053670 A1 * | 2/2020 | Jung | H04W 56/0015 |
| 2020/0084081 A1 | 3/2020 | Yeo et al. | |
| 2020/0154394 A1 | 5/2020 | Shi et al. | |
| 2020/0163048 A1 * | 5/2020 | Kim | H04W 72/12 |
| 2020/0163050 A1 | 5/2020 | Lee et al. | |
| 2020/0403682 A1 * | 12/2020 | Koskela | H04B 7/0695 |
| 2021/0185652 A1 * | 6/2021 | Rune | H04W 72/0446 |
| 2021/0212002 A1 * | 7/2021 | Jung | H04W 56/00 |
| 2021/0219263 A1 | 7/2021 | Gao et al. | |
| 2022/0095226 A1 * | 3/2022 | Chang | H04W 52/0229 |
| 2023/0043139 A1 * | 2/2023 | Hwang | H04W 52/0229 |
| 2023/0070801 A1 * | 3/2023 | Liu | H04W 4/06 |
| 2023/0089446 A1 * | 3/2023 | Yao | H04B 7/0695 370/329 |
| 2023/0189147 A1 * | 6/2023 | Bala | H04W 68/02 370/311 |
| 2023/0209563 A1 * | 6/2023 | Huang | H04L 5/0053 370/329 |
| 2023/0262651 A1 * | 8/2023 | Oh | H04W 68/02 370/329 |

FOREIGN PATENT DOCUMENTS

| | | | | |
|---|---|---|---|---|
| CN | 111972004 B | * | 6/2023 | H04W 36/30 |
| EP | 4171136 A1 | * | 4/2023 | H04W 68/02 |
| KR | 10-2018-0021628 A | | 3/2018 | |
| KR | 10-2018-0081784 A | | 7/2018 | |
| KR | 10-2019-0098721 A | | 8/2019 | |
| KR | 10-2020-0047690 A | | 5/2020 | |
| TW | 202005422 A | | 1/2020 | |
| WO | 2019015459 A1 | | 1/2019 | |
| WO | 2019/028589 A1 | | 2/2019 | |
| WO | 2019/099661 A1 | | 5/2019 | |
| WO | WO-2019193239 A1 | * | 10/2019 | H04W 72/23 |
| WO | 2020033884 A1 | | 2/2020 | |
| WO | 2020063928 A1 | | 4/2020 | |
| WO | WO-2020071880 A1 | * | 4/2020 | H04W 52/0229 |
| WO | WO-2021189461 A1 | * | 9/2021 | |
| WO | 2021/235860 A1 | | 11/2021 | |
| WO | WO-2021256777 A1 | * | 12/2021 | H04W 68/02 |
| WO | 2022/027328 A1 | | 2/2022 | |

OTHER PUBLICATIONS

Chinese Office Action dated Oct. 25, 2024, issued in Chinese Patent Application No. 202180043810.3.
Ericsson; Minor clarifications for paging, 3GPP TSG-RAN2 Meeting #104, R2-1817151, Nov. 12, 2018, Spokane, USA.
Extended European Search Report dated Nov. 23, 2023, issued in European Patent Application No. 21826978.5.
Chinese Office Action dated May 29, 2024, issued in Chinese Patent Application No. 202180043810.3.
Ericsson; Use of truncated UE IDs and other optimizations in paging DCI; 3GPP TSG-RAN WG2 #102; Tdoc R2-1806804; May 21, 2028, Busan, Republic of Korea.
Huawei, HiSilicon; Discussion on paging enhancement for UE power saving; 3GPP TSG-RAN2 Meeting#106; R2-1906901; May 13, 2019, Reno, USA.

* cited by examiner

DEVICE AND METHOD FOR PERFORMING PAGING IN WIRELESS COMMUNICATION SYSTEM

CROSS-REFERENCE TO RELATED APPLICATION(S)

This application is a U.S. National Stage application under 35 U.S.C. § 371 of an International application number PCT/KR2021/007269, filed on Jun. 10, 2021, which is based on and claimed priority of a Korean patent application number 10-2020-0075342, filed on Jun. 19, 2020, in the Korean Intellectual Property Office, the disclosure of which is incorporated by reference herein in its entirety.

TECHNICAL FIELD

The disclosure generally relates to a wireless communication system and, more particularly, to an apparatus and a method for performing paging in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "beyond 4G network" communication system or a "post long term evolution (post LTE)" system.

The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

DISCLOSURE OF INVENTION

Technical Problem

Based on the above background, the disclosure provides an apparatus and a method for performing paging in a wireless communication system.

Solution to Problem

According to various embodiments of the disclosure, a method of operating a UE in a wireless communication system is provided. The method includes monitoring a physical downlink control channel (PDCCH) in a configured paging occasion, acquiring a downlink control information (DCI) format through the PDCCH, acquiring a paging group indicator included in the DCI format, receiving a physical downlink shared channel (PDSCH) scheduled by the DCI format, determining whether the UE corresponds to the paging group indicator, and decoding the PDSCH, based on whether the UE corresponds to the paging group indicator.

According to various embodiments of the disclosure, a UE in a wireless communication system is provided. The UE includes a transceiver and at least one processor functionally connected to the transceiver, wherein the at least one processor is configured to monitor a physical downlink control channel (PDCCH) in a configured paging occasion, acquire a downlink control information (DCI) format through the PDCCH, acquire a paging group indicator included in the DCI format, receive a physical downlink shared channel (PDSCH) scheduled by the DCI format, determine whether the UE corresponds to the paging group indicator, and decode the PDSCH, based on whether the UE corresponds to the paging group indicator.

Advantageous Effects of Invention

According to an apparatus and a method according to various embodiments of the disclosure, it is possible to provide an apparatus and a method for performing paging in a wireless communication system.

Advantageous effects obtainable from the disclosure may not be limited to the above mentioned effects, and other effects which are not mentioned may be clearly understood, through the following descriptions, by those skilled in the art to which the disclosure pertains.

BEST MODE FOR CARRYING OUT THE INVENTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Figure 1:
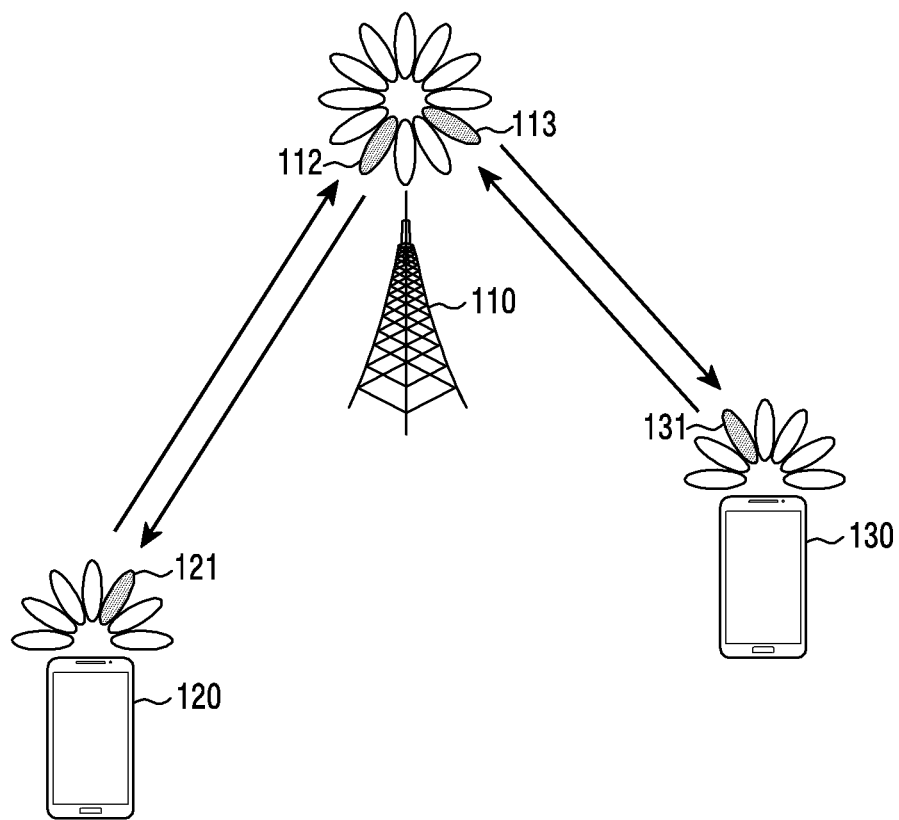
FIG. 1 illustrates a wireless communication system according to various embodiments of the disclosure.

FIG. 1 illustrates a wireless communication system according to various embodiments of the disclosure. FIG. 1 illustrates a BS 110, a UE 120, and a UE 130 as parts of nodes using a radio channel in a wireless communication system. Although FIG. 1 illustrates only one BS, another BS that is the same as or similar to the BS 110 may be further included.

The BS 110 is a network infrastructure element that provides radio access to the UEs 120 and 130. The BS 110 has coverage defined in a predetermined geographical area on the basis of the range within which a signal can be transmitted. The BS 110 may be referred to as an "access point (AP)", an "eNodeB (eNB)", a "$5^{th}$-generation (5G) node", a "gNodeB (next generation node B (gNB))", a "wireless point", or a "transmission/reception point (TRP)", or using another term having a technical meaning equivalent thereto, as well as "base station".

Each of the UE 120 and the UE 130 is a device used by a user and communicates with the BS 110 through a radio channel. Depending on circumstances, at least one of the UE 120 and the UE 130 may be operated without any involvement by the user. That is, at least one of the UEs 120 and 130 may be a device that performs machine-type communication (MTC), and may not be carried by the user. Each of the UE 120 and the UE 130 may be referred to as a "user equipment (UE)", "mobile station", "subscriber station", "remote terminal", "wireless terminal", or "user device", or using another term having an equivalent technical meaning, as well as "terminal".

Figure 2:
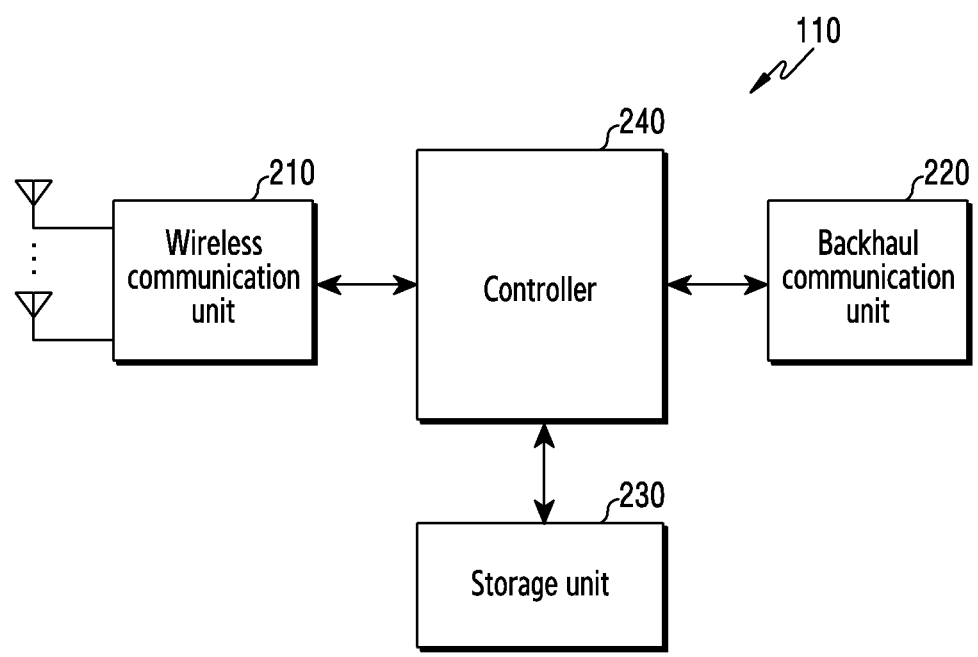
FIG. 2 illustrates the configuration of a BS in a wireless communication system according to various embodiments of the disclosure.

FIG. 2 illustrates the configuration of a BS in a wireless communication system according to various embodiments of the disclosure. The configuration illustrated in FIG. 2 may be understood as the configuration of the BS 110. The term "~unit" or "~er" used hereinafter may refer to the unit for processing at least one function or operation and may be implemented in hardware, software, or a combination of hardware and software.

Referring to FIG. 2, the BS includes a wireless communication unit 210, a backhaul communication unit 220, a storage unit 230, and a controller 240.

The wireless communication unit 210 performs functions for transmitting and receiving a signal through a radio channel. For example, the wireless communication unit 210 performs a function of conversion between a baseband signal and a bitstream according to the physical-layer standard of the system. For example, in data transmission, the wireless communication unit 210 may encode and modulate a transmission bitstream to generate complex symbols. In data reception, the wireless communication unit 210 reconstructs a reception bitstream by demodulating and decoding a baseband signal.

The wireless communication unit 210 up-converts a baseband signal into a radio-frequency (RF) band signal, transmits the RF band signal through an antenna, and down-converts an RF band signal received through an antenna into a baseband signal. To this end, the wireless communication unit 210 may include a transmission filter, a reception filter, an amplifier, a mixer, an oscillator, a digital-to-analog convertor (DAC), and an analog-to-digital convertor (ADC). Further, the wireless communication unit 210 may include a plurality of transmission/reception paths. In addition, the wireless communication unit 210 may include at least one antenna array including a plurality of antenna elements.

On the hardware side, the wireless communication unit 210 may include a digital unit and an analog unit, and the analog unit may include a plurality of sub-units according to operating power and operating frequency. The digital unit may be implemented as at least one processor (for example, digital signal processor (DSP)).

The wireless communication unit 210 transmits and receives a signal as described above. Accordingly, all or part of the wireless communication unit 210 may be referred to as a "transmitter", a "receiver", or a "transceiver". Further, in the following description, transmission and reception performed through a radio channel may include the above-described processing by the wireless communication unit 210.

The backhaul communication unit 220 provides an interface for communicating with other nodes within the network. That is, the backhaul communication unit 220 converts a bitstream transmitted from the BS to another node, for example, another access node, another BS, a higher node, or a core network, into a physical signal, and converts a physical signal received from another node into a bitstream.

The storage unit 230 may store a basic program for the operation of the BS, an application program, and data such as configuration information. The storage unit 230 may include volatile memory, nonvolatile memory, or a combination of volatile memory and nonvolatile memory. The storage unit 230 provides stored data in response to a request from the controller 240.

The controller 240 may control the overall operation of the BS. For example, the controller 240 transmits and receives a signal through the wireless communication unit 210 or the backhaul communication unit 220. The controller 240 records data in the storage unit 230 and reads the same. The controller 240 may perform the functions of a protocol stack required according to communication standards. According to another implementation, the protocol stack may be included in the wireless communication unit 210. To this end, the controller 240 may include at least one processor.

Figure 3:
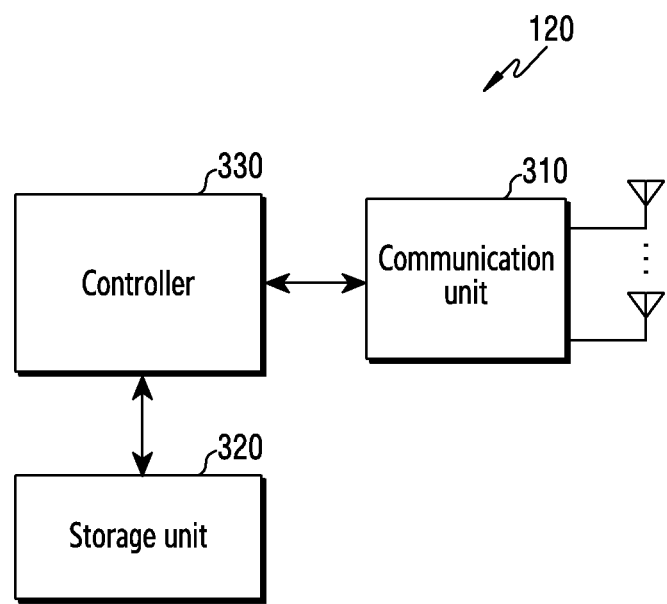
FIG. 3 illustrates the configuration of a UE in a wireless communication system according to various embodiments of the disclosure.

FIG. 3 illustrates a configuration of the UE in a wireless communication system according to various embodiments of the disclosure. The configuration illustrated in FIG. 3 may be understood as the configuration of the UE 120. The term "~unit" or "~er" used hereinafter may refer to the unit for processing at least one function or operation and may be implemented in hardware, software, or a combination of hardware and software.

Referring to FIG. 3, the UE includes a communication unit 310, a storage unit 320, and a controller 330.

The communication unit 310 performs functions for transmitting and receiving a signal through a radio channel. For example, the communication unit 310 performs a function of conversion between a baseband signal and a bitstream according to a physical-layer standard of the system. For example, in data transmission, the communication unit 310 encodes and modulates a transmission bitstream to generate complex symbols. In data reception, the communication unit 310 reconstructs a reception bitstream by demodulating and decoding a baseband signal. Further, the communication unit 310 up-converts a baseband signal to an RF band signal, transmits the RF band signal through an antenna, and then down-converts the RF band signal received through the antenna to the baseband signal. For example, the communication unit 310 may include a transmission filter, a reception filter, an amplifier, a mixer, an oscillator, a DAC, and an ADC.

The communication unit 310 may include a plurality of transmission/reception paths. The communication unit 310 may include at least one antenna array including a plurality of antenna elements. On the hardware side, the communication unit 310 may include a digital circuit and an analog circuit (for example, a radio frequency integrated circuit (RFIC)). The digital circuit and the analog circuit may be implemented as one package. The communication unit 310 may include a plurality of RF chains. The communication unit 310 may perform beamforming.

The communication unit 310 transmits and receives a signal as described above. Accordingly, all or part of the communication unit 310 may be referred to as a "transmitter", a "receiver", or a "transceiver". In the following description, transmission and reception performed through a radio channel are used to have a meaning including the processing performed by the communication unit 310.

The storage unit 320 stores a basic program for the operation of the UE, an application program, and data such as configuration information. The storage unit 320 may include volatile memory, nonvolatile memory, or a combination of volatile memory and nonvolatile memory. The storage unit 320 provides stored data in response to a request from the controller 330.

The controller 330 controls the overall operation of the UE. For example, the controller 330 transmits and receives a signal through the communication unit 310. The controller 330 records data in the storage unit 320 and reads the same. The controller 330 may perform the functions of a protocol stack required by the communication standard. To this end, the controller 330 may include at least one processor or microprocessor, or may be a part of the processor. Further, the part of the communication unit 310 or the controller 330 may be referred to as a communications processor (CP).

Figure 4:
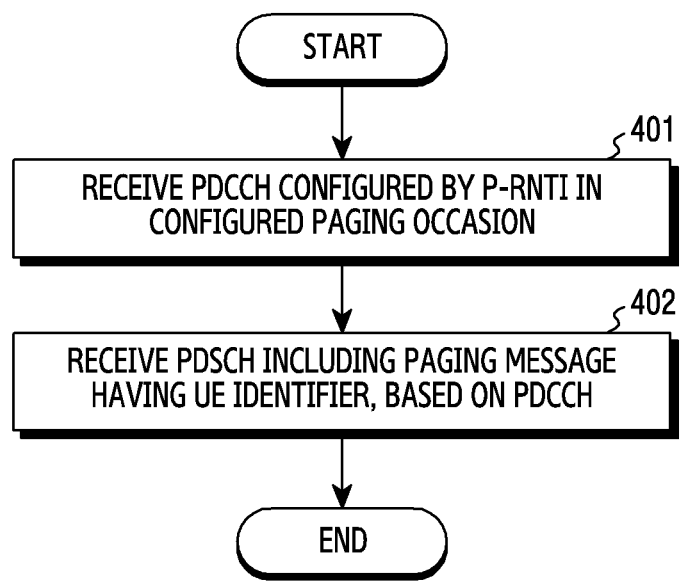
FIG. 4 is a flowchart illustrating the operation of the UE in a wireless communication system according to various embodiments of the disclosure.

FIG. 4 is a flowchart illustrating the operation of the UE in a wireless communication system according to various embodiments of the disclosure. FIG. 4 illustrates an operation method of the UE 120.

Referring to FIG. 4, in operation 401, the UE receives a physical downlink control channel (PDCCH) configured by a paging-radio network temporary identifier (P-RNTI) in a configured paging occasion. The paging procedure may be used to inform of, when an incoming call to the UE in an idle is generated, the incoming call to start network access for UEs or inform UEs in a connected state that system information has changed. Paging starts from an AMF and is transmitted to the UE via the base station (gNB). More specifically, paging starts from the AMF, is transmitted to a gNB 1102 through S1 application protocol (S1AP) signaling, and then transmitted to the UE through RRC signaling. At this time, the UE may know whether there is a paging message by monitoring a PDCCH configured by a P-RNTI in a paging occasion. The paging occasion may be determined on the basis of a DRX cycle which the BS configures in the UE.

In operation 402, the UE receives a physical downlink shared channel (PDSCH) containing a paging message including an identifier of the UE on the basis of the PDCCH. The UE receiving the PDCCH configured by the P-RNTI may receive a PDSCH including a paging message 1106. The paging message may include UE identifier (UE ID) information of the UE which the BS desires to wake.

A wireless communication system has developed into a broadband wireless communication system that provides a high-speed and high-quality packet data service according to communication standards such as high-speed packet access (HSPA) of 3GPP, long-term evolution (LTE) or evolved universal terrestrial radio access (E-UTRA), LTE-advanced (LTE-A), LTE-Pro, high rate packet data (HRPD) of 3GPP2, ultra mobile broadband (UMB), and 802.16e of IEEE beyond the initially provided voice-based service.

An LTE system, which is a representative example of the broadband wireless communication system, employs an orthogonal frequency division multiplexing (OFDM) scheme for a downlink (DL), and employs a single carrier frequency division multiple access (SC-FDMA) scheme for an uplink (UL). The uplink is a radio link through which a user equipment (UE) (or a mobile station (MS)) transmits data or a control signal to a base station (BS) (or an eNode B), and the downlink is a radio link through which the BS transmits data or a control signal to the UE. In the multiple access schemes as described above, time-frequency resources for carrying data or control information are allocated and operated in a manner to prevent overlapping of the resources, that is, to establish the orthogonality, between users, so as to identify data or control information of each user.

A post-LTE communication system, that is, a 5G communication system, should be able to freely reflect the various requirements of a user and a service provider, and thus it is required to support a service which simultaneously satisfies the various requirements. Services considered for the 5G communication system include enhanced mobile broadband (eMBB), massive machine-type communication (mMTC), and ultra-reliability low-latency communication (URLLC).

The eMBB aims to provide a data transmission rate that is improved so as to surpass the data transmission rate supported by LTE, LTE-A, or LTE-Pro. For example, in the 5G communication system, the eMBB should provide a peak downlink data rate of 20 Gbps and a peak uplink data rate of 10 Gbps from the viewpoint of one BS. Further, the 5G communication system should provide not only the peak data rate but also an increased user-perceived data rate. In order to satisfy such requirements, improvement of various transmission/reception technologies, including a further improved multi-input multi-output (MIMO) transmission technology, is needed. Further, while the current LTE system uses a maximum of bandwidths of 20 MHz in bandwidths of 2 GHz used in LTE to transmit signals, the 5G communication system uses a frequency bandwidth wider than 20 MHz in frequency bands of 3 to 6 GHz or higher than or equal to 6 GHz, whereby the data transmission rate required by the 5G communication system can be satisfied.

Also, in order to support an application service such as the Internet of Things (IoT), mMTC is considered in the 5G communication system. The mMTC is required to support access by massive numbers of UEs within a cell, improve coverage of the UE, increase a battery lifetime, and reduce the costs of the UE in order to efficiently provide IoT. IoT is attached to various sensors and devices to provide a communication function, and thus should support a large number of UEs (for example, 1,000,000 UEs/km$^2$) within the cell. Since the UE supporting the mMTC is highly likely to be located in a shaded area, such as a basement, which a cell cannot cover due to service characteristics, the mMTC may require wider coverage than other services provided by the 5G communication system. The UE supporting the mMTC needs to be produced at low cost and it is difficult to frequently exchange a battery thereof, so that a very long battery lifetime, for example, 10 to 15 years, may be required.

Last, the URLLC is a cellular-based wireless communication service used for a particular (mission-critical) purpose. For example, services used for remote control of robots or machinery, industrial automation, unmanned aerial vehicles, remote health care, and emergency alerts may be considered. Accordingly, communication provided by the URLLC should provide very low latency and very high reliability. For example, services supporting the URLLC should satisfy a radio access delay time (air interface latency) shorter than 0.5 milliseconds and also have a requirement of a packet error rate equal to or smaller than 75. Accordingly, for services supporting the URLLC, the 5G system should provide a transmit time interval (TTI) smaller than that of other systems and also has a design requirement of allocating a wide array of resources in a frequency band in order to guarantee reliability of a communication link.

The three services of 5G, that is, eMBB, URLLC, and mMTC may be multiplexed and transmitted in one system. At this time, in order to meet the different requirements of the respective services, different transmission/reception schemes and transmission/reception parameters may be used for the services. Of course, 5G is not limited to the above-described three services.

Hereinafter, a frame structure of the 5G system is described in more detail with reference to the drawings.

Figure 5:
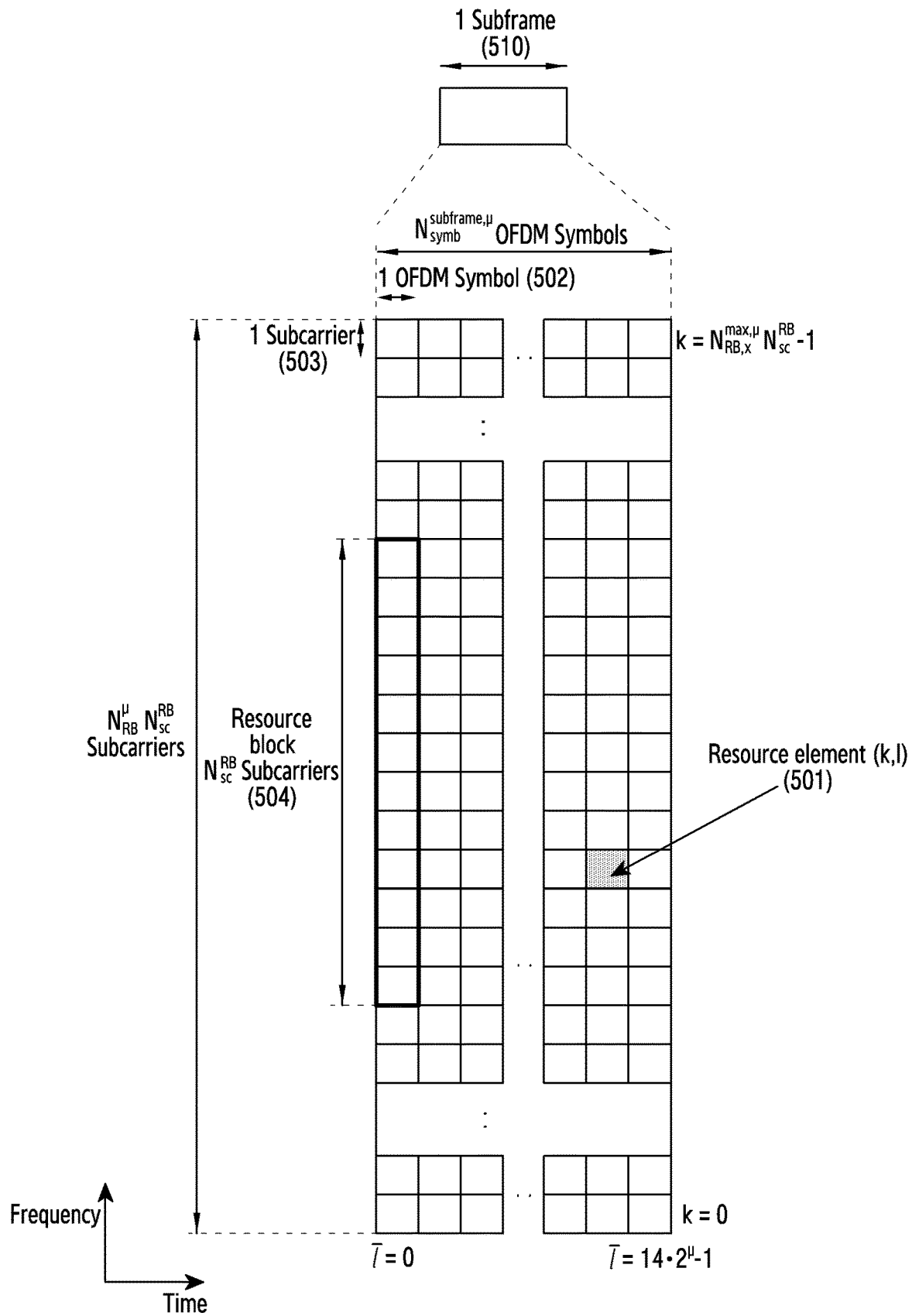
FIG. 5 illustrates the structure of resources in a wireless communication system according to various embodiments of the disclosure.

FIG. 5 illustrates the structure of resources in a wireless communication system according to various embodiments of the disclosure. Specifically, FIG. 5 illustrates the basic structure of a time-frequency domain which is a radio resource area in which data or a control channel is transmitted in a 5G system.

In FIG. 5, a horizontal axis indicates a time domain, and a vertical axis indicates a frequency domain. A basic unit of resources in the time and frequency domain is a resource element (RE) 501 and may be defined as 1 orthogonal frequency division multiplexing (OFDM) symbol 502 in the time axis and 1 subcarrier 503 in the frequency axis. In the frequency domain, Ne (for example, 12) successive REs may correspond to one resource block (RB) 504.

Figure 6:
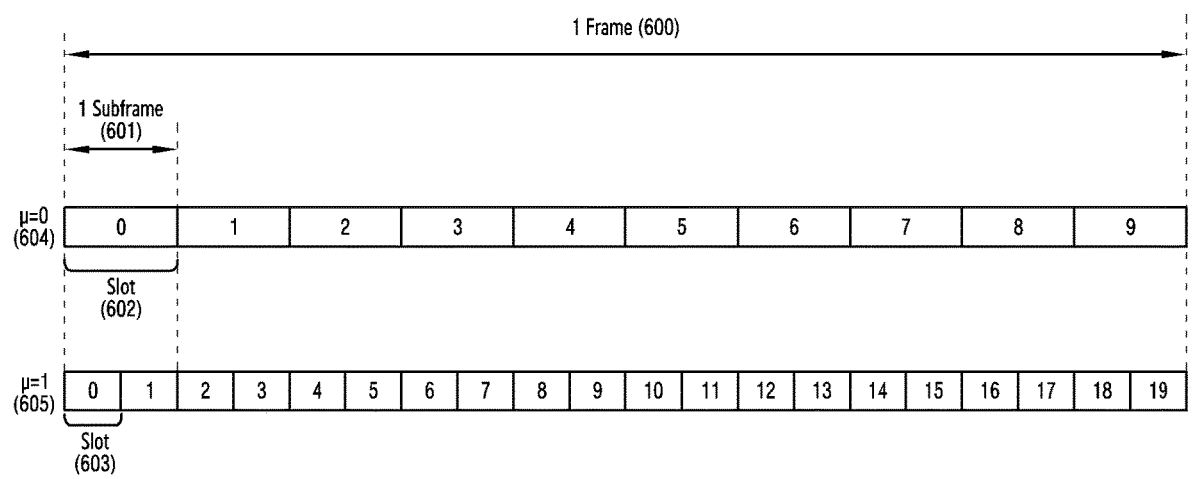
FIG. 6 illustrates the structure of resources in a wireless communication system according to various embodiments of the disclosure.

FIG. 6 illustrates the structure of resources in a wireless communication system according to various embodiments of the disclosure. Specifically, FIG. 6 illustrates the slot structure considered in the 5G system.

Referring to FIG. 6, an example of the structure of a frame 600, a subframe 601, and a slot 602 is illustrated. One frame 600 may be defined as 10 ms. One subframe 601 may be defined as 1 ms and, accordingly, one frame 600 may include a total of 10 subframes 601. One slot 602 or 603 may be defined as 14 OFDM symbols (that is, the number of symbols $N_{symb}^{slot}$ per slot=14). One subframe 601 may include one or a plurality of slots 602 or 603, and the number of slots 601 or 602 per subframe 601 may vary depending on a set value u 604 or 605 for subcarrier spacing.

In the example of FIG. 6, the case in which the subcarrier spacing configuration values μ=0 604 and μ=1 605 is illustrated. One subframe 601 may include one slot 602 in the case of μ=0 604, and one subframe 601 may include two slots 603 in the case of μ=1 605. That is, the number of slots $N_{slot}^{subframe}$ per subframe, may be different according to the configuration value μ for subcarrier spacing and, accordingly, the number of slots $N_{slot}^{subframe,\mu}$ per frame may be different. $N_{slot}^{subframe,\mu}$ and $N_{slot}^{frame,\mu}$ according to each subcarrier spacing configuration u may be defined as shown in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Subsequently, a configuration of a bandwidth part (BWP) in the 5G communication system will be described in detail with reference to the drawings.

Figure 7:
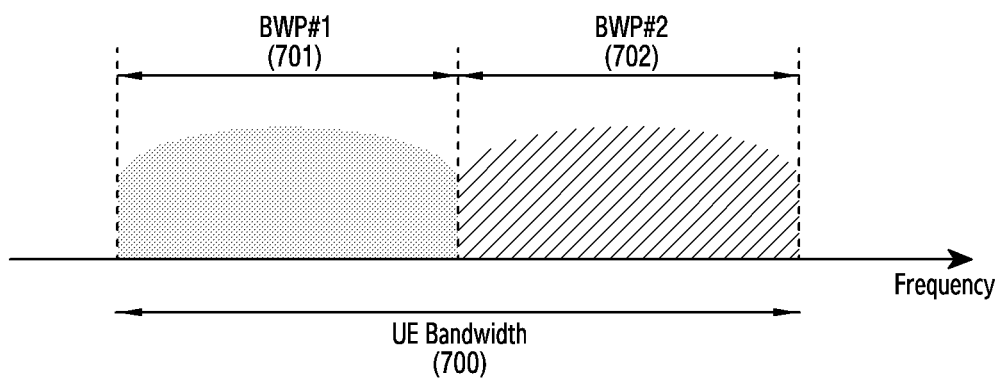
FIG. 7 illustrates the structure of a BWP in a wireless communication system according to various embodiments of the disclosure.

FIG. 7 illustrates the structure of a BWP in a wireless communication system according to various embodiments of the disclosure. Specifically, FIG. 7 illustrates an example of a configuration for a BWP in a 5G communication system.

Referring to FIG. 7, an example in which a UE bandwidth 700 is configured as two BWPs, that is, BWP #1 701 and BWP #2 702 is illustrated. The BS may configure one or a plurality of BWPs in the UE and configure information as shown in Table 2 below for each BWP.

TABLE 2

```
BWP ::=                      SEQUENCE {
    bwp-Id                       BWP-Id,
    (Bandwidth part indentifier)
    locationAndBandwidth         INTEGER (1..65536),
    (Bandwidth part location)
    subcarrierSpacing            ENUMERATED {n0, n1, n2, n3, n4,
n5},
    (Subcarrier spacing)
    cyclicPrefix                 ENUMERATED { extended }
    (Cyclic prefix)
}
```

Various embodiments of the disclosure are not limited to the above example, and various parameters related to the BWP as well as the configuration information may be configured in the UE. The information may be transmitted from the BS to the UE through higher-layer signaling, for example, radio resource control (RRC) signaling. Among the configured one or plurality of BWPs, at least one BWP may be activated. Information indicating whether to activate the configured BWPs may be semi-statically transferred from the BS to the UE through RRC signaling or may be dynamically transferred through Downlink Control Information (DCI).

According to an embodiment, the UE before the radio resource control (RRC) connection may receive a configuration of an initial BWP for initial access from the BS through a master information block (MIB). More specifically, the UE may receive configuration information for a control resource set (CORESET) and a search space in which a PDCCH for receiving system information (remaining system information (RMSI) or system information block 1 (SIB1)) required for initial access through the MIB can be transmitted in an initial access step. The control resource set and the search space configured by the MIB may be considered as an identity (ID) of 0. The BS may inform the user of configuration information such as frequency allocation information, time allocation information, and numerology for control resource set #0. Further, the BS may inform the UE of configuration information of a monitoring period and a paging occasion for control resource set #0, that is, configuration information for search space #0 through the MIB. The UE may consider a frequency domain configured as control resource set #0 acquired from the MIB as an initial BWP for initial access. At this time, an ID of the initial BWP may be considered as 0.

The configuration for the BWP supported by 5G may be used for various purposes.

According to an embodiment, when a bandwidth supported by the UE is smaller than a system bandwidth, the bandwidth may be supported through the BWP configuration. For example, the BS may configure a frequency location of the BWP (configuration information 2) in the UE and thus transmit and thus the UE may transmit and receive data at a specific frequency location within the system bandwidth.

According to an embodiment, the BS may configure a plurality of BWPs in the UE in order to support different numerologies. For example, in order to support the UE to perform data transmission and reception using both subcarrier spacing of 15 kHz and subcarrier spacing of 30 kHz, two BWPs may be configured as subcarrier spacings of 15 kHz and 30 kHz, respectively. Different BWPs may be frequency-division-multiplexed, and when data is transmitted/ received at particular subcarrier spacing, the BWP configured at the corresponding subcarrier spacing may be activated.

According to an embodiment, the BS may configure BWPs having different sizes of bandwidths in the UE in order to reduce power consumption of the UE. For example, when the UE supports a very large bandwidth, for example, 100 MHz and always transmits and receives data through the corresponding bandwidth, very high power consumption may be generated. Particularly, monitoring an unnecessary downlink control channel through a large bandwidth of 100 MHz in the state in which there is no traffic is very inefficient from the aspect of power consumption. In order to reduce power consumption of the UE, the BS may configure a BWP having a relatively small bandwidth, for example, a BWP of 20 MHz in the UE. The UE may perform a monitoring operation in the BWP of 20 MHz in the state in which there is no traffic, and if data is generated, may transmit and receive data through the BWP of 100 MHz according to an instruction from the BS.

In a method of configuring the BWP, UEs before the RRC connection may receive configuration information for an initial BWP through a master information block (MIB) in an initial access operation. More specifically, the UE may receive a configuration of a control resource set (CORESET) for a downlink control channel in which downlink control information (DCI) for scheduling a system information block (SIB) can be transmitted from an MIB of a physical broadcast channel (PBCH). A bandwidth of the CORESET configured by the MIB may be considered as an initial downlink BWP, and the UE may receive a physical downlink shared channel (PDSCH), in which the SIB is transmitted, through the configured initial BWP. The initial BWP may be used not only for receiving the SIB but also for other system information (OSI), paging, or random access.

When one or more BWPs are configured in the UE, the BS may instruct the UE to change the BWPs through a BWP indicator field within the DCI. For example, when a currently activated BWP of the UE is BWP #1 701 in FIG. 7, the BS may indicate BWP #2 702 to the UE through a BWP indicator within DCI, and the UE may change the BWP into BWP #2 702 indicated by the received BWP indicator within the DCI.

As described above, since the DCI-based BWP change may be indicated by the DCI for scheduling the PDSCH or the PUSCH, the UE should be able to receive or transmit the PDSCH or the PUSCH scheduled by the corresponding DCI in the changed BWP without any difficulty if the UE receives a BWP change request. To this end, the standard defines requirements of a delay time (TBWP) required for a BWP change, and the requirements may be defined as, for example, shown in Table 3 below.

TABLE 3

| | NR Slot length | BWP switch delay $T_{BWP}$ (slots) | |
|---|---|---|---|
| $\mu$ | (ms) | Type 1[Note 1] | Type 2[Note 1] |
| 0 | 1 | [1] | [3] |
| 1 | 0.5 | [2] | [5] |

TABLE 3-continued

| | NR Slot length | BWP switch delay $T_{BWP}$ (slots) | |
|---|---|---|---|
| μ | (ms) | Type 1[Note 1] | Type 2[Note 1] |
| 2 | 0.25 | [3] | [9] |
| 3 | 0.125 | [6] | [17] |

Note 1:
Depends on UE capability.
Note 2:
If the BWP switch involves changing of SCS, the BWP switch delay is determined by the larger one between the SCS before BWP switch and the SCS after BWP switch.

The requirements for the BWP change delay time support type 1 or type 2 according to a capability of the UE. The UE may report a supportable BWP delay time type to the BS.

When the UE receives DCI including a BWP change indicator in slot n according to the requirements for the BWP change delay time, the UE may complete a change to a new BWP indicated by the BWP change indicator at a time point that is not later than slot n+$T_{BWP}$ and transmit and receive a data channel scheduled by the corresponding DCI in the changed new BWP. When the BS desires to schedule a data channel in the new BWP, the BS may determine allocation of time domain resources for the data channel in consideration of the BWP change delay time $T_{BWP}$ of the UE. That is, when scheduling the data channel in the new BWP, the BS may schedule the corresponding data channel after the BWP change delay time through a method of determining allocation of time domain resources for the data channel. Accordingly, the UE may not expect that the DCI indicating the BWP change indicates a slot offset (K0 or K2) smaller than the BWP change delay time ($T_{BWP}$).

If the UE receives DCI (for example, DCI format 1_1 or 0_1) indicating the BWP change, the UE may perform no transmission or reception during a time interval corresponding to symbols from a third symbol of a slot for receiving the PDCCH including the corresponding DCI to a start point of the slot indicated by the slot offset (K0 or K2) indicated by a time domain resource allocation field within the corresponding DCI. For example, when the UE receives DCI indicating the BWP change in slot n and a slot offset value indicated by the corresponding DCI is K, the UE may perform no transmission or reception from the third symbol of slot n to a symbol before slot n+K (that is, the last symbol of slot n+K−1).

Subsequently, a synchronization signal (SS)/PBCH block in 5G is described.

The SS/PBCH block may be a physical layer channel block including a primary SS (PSS), a secondary SS (SSS), and a PBCH. Specifically, the configuration of the SS/PBCH block is described below.

PSS: is a signal which is a reference of downlink time/frequency synchronization and provides some pieces of information of a cell ID.

SSS: is a reference of downlink time/frequency synchronization and provides the remaining cell ID information which the PSS does not provide. In addition, the SSS serves as a reference signal for demodulation of a PBCH.

PBCH: provides necessary system information required for transmitting and receiving a data channel and a control channel by the UE. The necessary system information may include control information related to a search space indicating radio resource mapping information of a control channel, scheduling control information for a separate data channel for transmitting system information, and the like.

SS/PBCH block: includes a combination of PSS, SSS, and PBCH. One or a plurality of SS/PBCH blocks may be transmitted within a time of 5 ms, and each of the transmitted SS/PBCH blocks may be separated by an index.

The UE may detect the PSS and the SSS in an initial access operation and decode the PBCH. The UE may receive the MIB from the PBCH and receive a configuration of a control resource set (CORESET) #0 (corresponding to a control resource set having a control resource set index or identity (ID) of 0) and search space #0 (corresponding to a search space having a search space index or ID of 0). The UE may monitor CORESET #0 on the basis of the assumption that the selected SS/PBCH block and a demodulation reference signal (DMRS) transmitted in CORESET #0 are Quasi Co-Located (QCL). The UE may receive system information through downlink control information transmitted in CORESET #0. The UE may acquire configuration information related to a random access channel (RACH) required for initial access from the received system information. The UE may transmit a physical RACH (PRACH) to the BS in consideration of the selected SS/PBCH index, and the BS receiving the PRACH may acquire information on the SS/PBCH block index selected by the UE. The BS may know which block is selected by the UE from among the SS/PBCH blocks and that CORESET #0 related thereto is monitored.

Subsequently, downlink control information (DCI) in the 5G system will be described in detail.

In the 5G system, scheduling information for uplink data (or a physical uplink data channel (physical uplink shared channel (PUSCH)) or downlink data (or physical downlink data channel (physical downlink shared channel (PDSCH)) may be transmitted from the BS to the UE through DCI. The UE may monitor a fallback DCI format and a non-fallback DCI format for the PUSCH or the PDSCH. The fallback DCI format may include a fixed field predefined between the BS and the UE, and the non-fallback DCI format may include a configurable field.

The DCI may be transmitted through a physical downlink control channel (PDCCH) after passing through a channel coding and modulation process. A cyclic redundancy check (CRC) is added to a DCI message payload and is scrambled by a radio network temporary identifier (RNTI) corresponding to the identity of the UE. Depending on the purpose of the DCI message, for example, UE-specific data transmission, a power control command, a random access response, or the like, different RNTIs may be used. That is, the RNTI is not explicitly transmitted but is included in a CRC calculation process to be transmitted. If the DCI message transmitted through the PDCCH is received, the UE may identify the CRC through the allocated RNTI, and may recognize that the corresponding message is transmitted to the UE when the CRC is determined to be correct on the basis of the CRC identification result.

For example, DCI for scheduling a PDSCH for system information (SI) may be scrambled by an SI-RNTI. DCI for scheduling a PDSCH for a random access response (RAR) message may be scrambled by an RA-RNTI. DCI for scheduling a PDSCH for a paging message may be scrambled by a P-RNTI. DCI for notifying of a slot format indicator (SFI) may be scrambled with an SFI-RNTI. DCI for notifying of transmit power control (TPC) may be scrambled with a TPC-RNTI. DCI for scheduling a UE-specific PDSCH or PSCH may be scrambled by a cell RNTI (C-RNTI), a modulation coding scheme (MCS)-C-RNTI, or a configured scheduling (CS)-RNTI.

DCI format 0_0 may be used for fallback DCI for scheduling a PUSCH in which case the CRC may be scrambled by a C-RNTI. DCI format 0_0 in which the CRC is scrambled by the C-RNTI may include, for example, information in Table 4 below.

TABLE 4

- Identifier for DCI formats - 1 bit
  - The value of this bit field is always set to 0, indicating an UL DCI format
- Frequency domain resource assignment- $\lceil \log_2(N_{RB}^{UL,BWP}(N_{RB}^{UL,BWP}+1)/2) \rceil$ bits where $N_{RB}^{UL,BWP}$ is defined in subclause 7.3.1.0
  - For PUSCH hopping with resource allocation type 1:
    - $N_{UL\_hop}$ MSB bits are used to indicate the frequency offset according to Subclause 6.3 of [6, TS 38.214], where $N_{UL\_hop} = 1$ if the higher layer parameter frequencyHoppingOffsetLists contains two offset values and $N_{UL\_hop} = 2$ if the higher layer parameter frequencyHoppingOffsetLists contains four offset values
    - $\lceil \log_2(N_{RB}^{UL,BWP}(N_{RB}^{UL,BWP}+1)/2) \rceil - N_{UL\_hop}$ bits provides the frequency domain resource allocation according to Subclause 6.1.2.2.2 of [6, TS 38.214]
  - For non-PUSCH hopping with resource allocation type 1:
    - $\lceil \log_2(N_{RB}^{UL,BWP}(N_{RB}^{UL,BWP}+1)/2) \rceil$ bits provides the frequency domain resource allocation according to Subclause 6.1.2.2.2 of [6, TS 38.214]
- Time domain resource assignment- 4 bits as defined in Subclause 6.1.2.1 of [6, TS 38.214]
- Frequency hopping flag- 1 bit according to Table 7.3.1.1.1-3, as defined in Subclause 6.3 of [6, TS 38.214]
- Modulation and coding scheme - 5 bits as defined in Subclause 6.1.4.1 of [6, TS 38.214]
- New data indicator- 1 bit
- Redundancy version- 2 bits as defined in Table 7.3.1.1.1-2
- HARQ process number- 4 bits
- TPC command for scheduled PUSCH- 2 bits as defined in Subclause 7.1.1 of [5, TS 38.213]
- Padding bits, if required.
- UL/SUL indicator - 1 bit for UEs configured with supplementaryUplink in ServingCellConfig in the cell as defined in Table 7.3.1.1.1-1 and the number of bits for DCI format 1_0 before padding is larger than the number of bits for DCI format 0_0 before padding; 0 bit otherwise. The UL/SUL indicator, if present, locates in the last bit position of DCI format 0_0, after the padding bit(s).
  - If the UL/SUL indicator is present in DCI format 0_0 and the higher layer parameter pusch-Config is not configured on both UL and SUL the UE ignores the UL/SUL indicator field in DCI format 0_0, and the corresponding PUSCH scheduled by the DCI format 0_0 is for the UL or SUL for which high layer parameter pucch-Config is configured;
  - If the UL/SUL indicator is not present in DCI format 0_0 and pucch-Config is configured, the corresponding PUSCH scheduled by the DCI format 0_0 is for the UL or SUL for which high layer parameter pucch-Config is configured.
  - If the UL/SUL indicator is not present in DCI format 0_0 and pucch-Config is not configured, the corresponding PUSCH scheduled by the DCI format 0_0 is for the uplink on which the latest PRACH is transmitted.

DCI format 0_1 may be used for non-fallback DCI for scheduling a PUSCH in which case the CRC may be scrambled with a C-RNTI. DCI format 0_1 in which the CRC is scrambled by the C-RNTI may include, for example, information in Table 5 below.

TABLE 5

- Identifier for DCI formats - 1 bit
    - The value of this bit field is always set to 0, indicating an UL DCI format
- Carrier indicator- 0 or 3 bits, as defined in Subclause 10.1 of [5, TS38.213].
- UL/SUL indicator - 0 bit for UEs not configured with supplementaryUplink in ServingCellConfig in the cell or UEs configured with supplementaryUplink in ServingCellConfig in the cell but only PUCCH carrier in the cell is configured for PUSCH transmission; otherwise, 1 bit as defined in Table 7.3.1.1.1-1.
- Bandwidth part indicator- 0, 1 or 2 bits as determined by the number of UL BWPs $n_{BWP,RRC}$ configured by higher layers, excluding the initial UL bandwidth part. The bitwidth for this field is determined as $\lceil \log_2 (n_{BWP}) \rceil$ bits, where
    - $n_{BWP} = n_{BWP,RRC} + 1$ $n_{BWP,RRC} \leq 3$, in which case the bandwidth part indicator is equivalent to the ascending order of the higher layer parameter BWP-Id;
    - otherwise $n_{BWP} = n_{BWP,RRC}$, in which case the bandwidth part indicator is defined in Table 7.3.1.1.2-1;
    If a UE does not support active BWP change via DCI, the UE ignores this bit field.
- Frequency domain resource assignment- number of bits determined by the following, where $N_{RB}^{UL,BWP}$ is the size of the active UL bandwidth part:
    - $N_{RBG}$ bits if only resource allocation type 0 is configured, where $N_{RBG}$ is defined in Subclause 6.1.2.2.1 of [6, TS 38.214],
    - $\lceil \log_2(N_{RB}^{UL,BWP}(N_{RB}^{UL,BWP} +1)/2) \rceil$ bits if only resource allocation type 1 is configured, or
      $\max(\lceil \log_2(N_{RB}^{UL\ BWP}(N_{RB}^{UL\ BWP} + 1)/ 2) \rceil, N_{RBG})+ 1$ bits if both resource allocation type 0 and 1 are configured.
    - If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
    - For resource allocation type 0, the $N_{RBG}$ LSBs provide the resource allocation as defined in Subclause 6.1.2.2.1 of [6, TS 38.214].
    - For resource allocation type 1, $\lceil \log_2(N_{RB}^{UL,BWP}(N_{RB}^{UL,BWP} + 1)/2) \rceil$ LSBs provide the resource allocation as follows:
        - For PUSCH hopping with resource allocation type 1:
            - $N_{UL\_hop}$ MSB bits are used to indicate the frequency offset according to Subclause 6.3 of [6, TS 38.214], where $N_{UL\_hop} = 1$ if the higher layer parameter frequencyHopping OffsetLists contains two offset values and $N_{UL\_hop} = 2$ if the higher layer parameter frequencyHoppingOffsetLists contains four offset values
            - $\lceil \log_2(N_{RB}^{UL,BWP}(N_{RB}^{UL,BWP} + 1)/2) \rceil - N_{UL\_hop}$ bits provides the frequency domain resource allocation according to Subclause 6.1.2.2.2 of [6, TS 38.214]
        - For non-PUSCH hopping with resource allocation type 1:
            - $\lceil \log_2(N_{RB}^{UL,BWP}(N_{RB}^{UL,BWP} + 1)2) \rceil$ bits provides the frequency domain resource allocation according to Subclause 6.1.2.2.2 of [6, TS 38.214]
        If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.
- Time domain resource assignment- 0, 1, 2, 3, or 4 bits as defined in Subclause 6.1.2.1 of [6, TS38.214]. The bitwidth for this field is determined as $\lceil \log_2(I) \rceil$ bits, where 1 is the number of entries in the higher layer parameter pusch-TimeDomainAllocationList if the higher layer parameter is configured; otherwise 1 is the number of entries in the default table.
- Frequency hopping flag- 0 or 1 bit:
    - 0 bit if only resource allocation type 0 is configured or if the higher layer parameter frequencyHopping is not configured;
    - 1 bit according to Table 7.3.1.1.1-3 otherwise, only applicable to resource allocation type 1, as defined in Subclause 6.3 of [6, TS 38.214].
- Modulation and coding scheme- 5 bits as defined in Subclause 6.1.4.1 of [6, TS 38.214]
- New data indicator- 1 bit
- Redundancy version- 2 bits as defined in Table 7.3.1.1.1-2
- HARQ process number- 4 bits
- 1$^{st}$ downlink assignment index - 1 or 2 bits:
    - 1 bit for semi-static HARQ-ACK codebook;
    - 2 bits for dynamic HARQ-ACK codebook.
- 2$^{nd}$ downlink assignment index- 0 or 2 bits:
    - 2 bits for dynamic HARQ-ACK codebook with two HARQ-ACK sub-codebooks;
    - 0 bit otherwise.
- TPC command for scheduled PUSCH- 2 bits as defined in Subclasse 7.1.1 of [5, TS38.213]

TABLE 5-continued

- SRS resource indicator

- $$\left\lceil \log_2\left( \sum_{k=1}^{min\{L_{MIN}, N_{MIN}\}} \binom{N_{SRS}}{k} \right) \right\rceil$$

or $\lceil \log_2 (N_{SRS}) \rceil$ bits, where $N_{SRS}$ is
    the number of configured SRS resources in the SRS resource set associated with the
    higher layer parameter usage of value 'codeBook' or 'nonCodeBook',

- $$\left\lceil \log_2\left( \sum_{k=1}^{min\{L_{MIN}, N_{MIN}\}} \binom{N_{SRS}}{k} \right) \right\rceil$$

bits according to Tables 7.3.1.1.2-28/29/30/31 if the
    higher layer parameter txConfig = nonCodebook, where $N_{SRS}$ is the number of
    configured SRS resources in the SRS resource set associated with the higher layer
    parameter usage of value 'nonCodeBook' and
    - if UE supports operation with maxMIMO-Layers and the higher layer
      parameter maxMIMO-Layers of PUSCH-ServingCellConfig of the serving cell
      is configured, $L_{max}$ is given by that parameter
    - otherwise, $L_{max}$ is given by the maximum number of layers for PUSCH
      supported by the UE for the serving cell for non-codebook based operation.
  - $\lceil \log_2 (N_{SRS}) \rceil$ bits according to Tables 7.3.1.1.2-32 if the higher layer parameter
    txConfig = codebook, where $N_{SRS}$ is the number of configured SRS resources in
    the SRS resource set associated with the higher layer parameter usage of value
    'codeBook'.
- Precoding information and number of layers- number of bits determined by the
  following:
  - 0 bits if the higher layer parameter txConfig = nonCodeBook;
  - 0 bits for 1 antenna port and if the higher layer parameter txConfig = codebook;
  - 4, 5, or 6 bits according to Table 7.3.1.1.2-2 for 4 antenna ports, if txConfig =
    codebook, and according to whether transform precoder is enabled or disabled,
    and the values of higher layer parameters maxRank, and codebookSubset;
  - 2, 4, or 5 bits according to Table 7.3.1.1.2-3 for 4 antenna ports, if txConfig =
    codebook, and according to whether transform precoder is enabled or disabled,
    and the values of higher layer parameters maxRank, and codebookSubset;
  - 2 or 4 bits according to Table7.3.1.1.2-4 for 2 antenna ports, if txConfig =
    codebook, and according to whether transform precoder is enabled or disabled,
    and the values of higher layer parameters maxRank and codebookSubset;
  - 1 or 3 bits according to Table7.3.1.1.2-5 for 2 antenna ports, if txConfig =
    codebook, and according to whether transform precoder is enabled or disabled,
    and the values of higher layer parameters maxRank and codebookSubset.
- Antenna ports- number of bits determined by the following
  - 2 bits as defined by Tables 7.3.1.1.2-6, if transform precoder is enabled, dmrs-
    Type=1, and maxLength=1;
  - 4 bits as defined by Tables 7.3.1.1.2-7. if transform precoder is enabled, dmrs-
    Type=1, and maxLength=2;
  - 3 bits as defined by Tables 7.3.1.1.2-8/9/10/11, if transform precoder is disabled,
    dmrs-Type=1, and maxLength=1, and the value of rank is determined according to
    the SRS resource indicator field if the higher layer parameter txConfig =
    nonCodebook and according to the Precoding information and number of layers
    field if the higher layer parameter txConfig = codebook;
  - 4 bits as defined by Tables 7.3.1.1.2-12/13/14/15, if transform precoder is
    disabled, dmrs-Type=1, and maxLength=2, and the value of rank is determined
    according to the SRS resource indicator field if the higher layer parameter
    txConfig = nonCodebook and according to the Precoding information and number
    of layers field if the higher layer parameter txConfig = codebook;
  - 4 bits as defined by Tables 7.3.1.1.2-16/17/18/19, if transform precoder is
    disabled, dmrs-Type=2, and maxLength=1, and the value of rank is determined
    according to the SRS resource indicator field if the higher layer parameter
    txConfig = nonCodebook and according to the Precoding information and number
    of layers field if the higher layer parameter txConfig = codebook;
  - 5 bits as defined by Tables 7.3.1.1.2-20/21/22/23, if transform precoder is
    disabled, dmrs-Type=2, and maxLength=2, and the value of rank is determined
    according to the SRS resource indicator field if the higher layer parameter
    txConfig = nonCodebook and according to the Precoding information and number
    of layers field if the higher layer parameter txConfig = codebook.
  where the number of CDM groups without data of values 1, 2, and 3 in Tables
  7.3.1.1.2-6 to 7.3.1.1.2-23 refers to CDM groups {0}, {0,1}, and {0, 1,2}
  respectively.
  If a UE is configured with both dmrs-UplinkForPUSCH-Mapping TypeA and dmrs-
  UplinkForPUSCH-MappingTypeB, the bitwidth of this field equals max $\{x_A, x_B\}$,
  where $x_A$ is the "Antenna ports" bitwidth derived according to dmrs-
  UplinkForPUSCH-MappingTypeA and $x_B$ is the "Antenna ports" bitwidth derived
  according to dmrs-UplinkForPUSCH-MappingTypeB. A number of $|x_A - x_B|$ zeros
  are padded in the MSB of this field, if the mapping type of the PUSCH corresponds
  to the smaller value of $x_A$ and $X_B$.

TABLE 5-continued

- SRS request- 2 bits as defined by Table 7.3.1.1.2-24 for UEs not configured with
  supplementaryUplink in ServingCellConfig in the cell; 3 bits for UEs configured
  with supplementaryUplink in ServingCellConfig in the cell where the first bit is the
  non-SUL/SUL indicator as defined in Table 7.3.1.1.1-1 and the second and third bits
  are defined by Table 7.3.1.1.2-24. This bit field may also indicate the associated
  CSI-RS according to Subclause 6.1.1.2 of [6, TS 38.214].
- CSI request- 0, 1, 2, 3, 4, 5, or 6 bits determined by higher layer parameter
  reportTriggerSize.
- CBG transmission information (CBGTI)- 0 bit if higher layer parameter
  codeBlockGroupTransmission for PDSCH is not configured, otherwise, 2, 4, 6, or 8
  bits determined by higher layer parameter maxCodeBlockGroupsPerTransportBlock
  for PUSCH.
- PTRS-DMRS association- number of bits determined as follows
  -   0 bit if PTRS-UplinkConfig is not configured and transform precoder is disabled,
      or if transform precoder is enabled, or if maxRank=1;
  -   2 bits otherwise, where Table 7.3.1.1.2-25 and 7.3.1.1.2-26 are used to indicate
      the association between PTRS port(s) and DMRS port(s) for transmission of one
      PT-RS port and two PT-RS ports respectively, and the DMRS ports are indicated
      by the Antenna ports field.
  If "Bandwidth part indicator" field indicates a bandwidth part other than the active
  bandwidth part and the "PTRS-DMRS association" field is present for the indicated
  bandwidth part but not present for the active bandwidth part, the UE assumes the
  "PTRS-DMRS association" field is not present for the indicated bandwidth part.
- beta_offset indicator - 0 if the higher layer parameter betaOffsets = semiStatic;
  otherwise 2 bits as defined by Table 9.3-3 in [5, TS 38.213].
- DMRS sequence initialization - 0 bit if transform precoder is enabled; 1 bit if
  transform precoder is disabled.
- UL-SCH indicator - 1 bit. A value of "1" indicates UL-SCH shall be transmitted on
  the PUSCH and a value of "0" indicates UL-SCH shall not be transmitted on the
  PUSCH. Except for DCI format 0_1 with CRC scrambled by SP-CSI-RNTI, a UE is
  not expected to receive a DCI format 0_1 with UL-SCH indicator of "0" and CSI
  request of all zero(s).

DCI format 1_0 may be used for fallback DCI for scheduling a PDSCH in which case the CRC may be scrambled with a C-RNTI. DCI format 1_0 in which the CRC is scrambled by the C-RNTI may include, for example, information in Table 6 below.

TABLE 6

- Identifier for DCI formats- 1 bits
  - The value of this bit field is always set to 1, indicating a DL DCI format
- Frequency domain resource assignment- $\lceil \log_2(N_{RB}^{DL,BWP}(N_{RB}^{DL,BWP}+1)/2) \rceil$ bits where
  $N_{RB}^{DL,BWP}$ is given by subclause 7.3.1.0
If the CRC of the DCI format 1_0 is scrambled by C-RNTI and the "Frequency domain
resource assignment" field are of all ones, the DCI format 1_0 is for random access
procedure initiated by a PDCCH order, with all remaining fields set as follows:
- Random Access Preamble index- 6 bits according to ra-PreambleIndex in Subclause
  5.1.2 of [8, TS38.321]
- UL/SUL indicator- 1 bit. If the value of the "Random Access Preamble index" is not
  all zeros and if the UE is configured with supplementaryUplink in
  ServingCellConfig in the cell, this field indicates which UL carrier in the cell to
  transmit the PRACH according to Table 7.3.1.1.1-1; otherwise, this field is reserved
- SS/PBCH index- 6 bits. If the value of the "Random Access Preamble index" is not
  all zeros, this field indicates the SS/PBCH that shall be used to determine the RACH
  occasion for the PRACH transmission; otherwise, this field is reserved.
- PRACH Mask index- 4 bits. If the value of the "Random Access Preamble index" is
  not all zeros, this field indicates the RACH occasion associated with the SS/PBCH
  indicated by "SS/PBCH index" for the PRACH transmission, according to Subclause
  5.1.1 of [8, TS38.321]; otherwise, this field is reserved
- Reserved bits- 10 bits
Otherwise, all remaining fields are set as follows:
- Time domain resource assignment- 4 bits as defined in Subclause 5.1.2.1 of [6, TS
  38.214]
- VRB-to-PRB mapping- 1 bit according to Table 7.3.1.2.2-5
- Modulation and coding scheme- 5 bits as defined in Subclause 5.1.3 of [6, TS
  38.214]
- New data indicator- 1 bit
- Redundancy version- 2 bits as defined in Table 7.3.1.1.1-2
- HARQ process number- 4 bits
- Downlink assignment index- 2 bits as defined in Subclause 9.1.3 of [5, TS 38.213],
  as counter DAI TABLE 6-continued

- TPC command for scheduled PUCCH- 2 bits as defined in Subclause 7.2.1 of [5, TS 38.213]
- PUCCH resource indicator- 3 bits as defined in Subclause 9.2.3 of [5, TS 38.213]
- PDSCH-to-HARQ_feedback timing indicator- 3 bits as defined in Subclause 9.2.3 of [5, TS38.213]

DCI format 1_1 may be used for non-fallback DCI for scheduling a PDSCH in which case the CRC may be scrambled by a C-RNTI. DCI format 1_1 in which the CRC is scrambled by the C-RNTI may include, for example, information in Table 7 below.

TABLE 7

- Identifier for DCI formats- 1 bits
  - The value of this bit field is always set to 1, indicating a DL DCI format
- Carrier indicator- 0 or 3 bits as defined in Subclause 10.1 of [5, TS 38.213].
- Bandwidth part indicator- 0, 1 or 2 bits as determined by the number of DL BWPs $n_{BWP,RRC}$ configured by higher layers, excluding the initial DL bandwidth part. The bitwidth for this field is determined as $\lceil \log_2(n_{BWP}) \rceil$ bits, where
  - $n_{BWP} = n_{BWP,RRC} +1$ if $n_{BWP,RRC} \leq 3$, in which case the bandwidth part indicator is equivalent to the ascending order of the higher layer parameter BWP-Id;
  - otherwise $n_{BWP} = n_{BWP,RRC}$, in which case the bandwidth part indicator is defined in Table 7.3.1.1.2-1;
  If a UE does not support active BWP change via DCI, the UE ignores this bit field.
- Frequency domain resource assignment- number of bits determined by the following, where $N_{RB}^{DL,BWP}$ is the size of the active DL bandwidth part:
  - $N_{RBG}$ bits if only resource allocation type 0 is configured, where $N_{RBG}$ is defined in Subclause 5.1.2.2.1 of [6, TS38.214],
  - $\lceil \log_2(N_{RB}^{DL,BWP}(N_{RB}^{DL,BWP}+1)/2) \rceil$ bits if only resource allocation type 1 is configured, or
  - $\max(\lceil \log_2(N_{RB}^{DL,BWP}(N_{RB}^{DL,BWP}+1)/2) \rceil, N_{RBG})+1$ bits if both resource allocation type 0 and 1 are configured.
  - If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
  - For resource allocation type 0, the $N_{RBG}$ LSBs provide the resource allocation as defined in Subclause 5.1.2.2.1 of [6, TS 38.214].
  - For resource allocation type 1, the $\lceil \log_2(N_{RB}^{DL,BWP}(N_{RB}^{DL,BWP}+1)/2) \rceil$ LSBs provide the resource allocation as defined in Subclause 5.1.2.2.2 of [6, TS 38.214]
  If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.
- Time domain resource assignment- 0, 1, 2, 3, or 4 bits as defined in Subclause 5.1.2.1 of [6, TS 38.214]. The bitwidth for this field is determined as $\lceil \log_2(I) \rceil$ bits, where I is the number of entries in the higher layer parameter pdsch-TimeDomainAllocationList if the higher layer parameter is configured; otherwise I is the number of entries in the default table.
- VRB-to-PRB mapping- 0 or 1 bit:
  - 0 bit if only resource allocation type 0 is configured or if interleaved VRB-to-PRB mapping is not configured by high layers;
  - 1 bit according to Table 7.3.1.2.2-5 otherwise, only applicable to resource allocation type 1, as defined in Subclause 7.3.1.6 of [4, TS 38.211].
- PRB bundling size indicator- 0 bit if the higher layer parameter prb-BundlingType is not configured or is set to 'static', or 1 bit if the higher layer parameter prb-BundlingType is set to 'dynamic' according to Subclause 5.1.2.3 of [6, TS 38.214].
- Rate matching indicator- 0, 1, or 2 bits according to higher layer parameters rateMatchPatternGroup1 and rateMatchPatternGroup2, where the MSB is used to indicate rateMatchPatternGroup1 and the LSB is used to indicate rateMatchPatternGroup2 when there are two groups.
- ZP CSI-RS trigger- 0, 1, or 2 bits as defined in Subclause 5.1.4.2 of [6, TS 38.214]. The bitwidth for this field is determined as $\lceil \log_2(n_{ZP} + 1) \rceil$ bits, where $n_{ZP}$ is the number of aperiodic ZP CSI-RS resource sets configured by higher layer.
For transport block 1:
  - Modulation and coding scheme- 5 bits as defined in Subclause 5.1.3.1 of [6, TS 38.214]
  - New data indicator- 1 bit
  - Redundancy version- 2 bits as defined in Table 7.3.1.1.1-2
For transport block 2 (only present if maxNrofCodeWordsScheduledByDCI equals 2):
  - Modulation and coding scheme- 5 bits as defined in Subclause 5.1.3.1 of [6, TS 38.214]
  - New data indicator- 1 bit
  - Redundancy version- 2 bits as defined in Table 7.3.1.1.1-2

TABLE 7-continued

If "Bandwidth part indicator" field indicates a bandwidth part other than the active bandwidth part and the value of maxNrofCodeWordsScheduledByDCI for the indicated bandwidth part equals 2 and the value of maxNrofCodeWordsScheduledByDCI for the active bandwidth part equals 1, the UE assumes zeros are padded when interpreting the "Modulation and coding scheme", "New data indicator", and "Redundancy version" fields of transport block 2 according to Subclause 12 of [5, TS38.213], and the UE ignores the "Modulation and coding scheme", "New data indicator", and "Redundancy version" fields of transport block 2 for the indicated bandwidth part.
- HARQ process number- 4 bits
- Downlink assignment index- number of bits as defined in the following
  - 4 bits if more than one serving cell are configured in the DL and the higher layer parameter pdsch-HARQ-ACK-Codebook=dynamic, where the 2 MSB bits are the counter DAI and the 2 LSB bits are the total DAI;
  - 2 bits if only one serving cell is configured in the DL and the higher layer parameter pdsch-HARQ-ACK-Codebook=dynamic, where the 2 bits are the counter DAI;
  - 0 bits otherwise.
- TPC command for scheduled PUCCH- 2 bits as defined in Subclause 7.2.1 of [5, TS 38.213]
- PUCCH resource indicator- 3 bits as defined in Subclause 9.2.3 of [5, TS 38.213]
- PDSCH-to-HARQ_feedback timing indicator- 0, 1, 2, or 3 bits as defined in Subclause 9.2.3 of [5, TS 38.213]. The bitwidth for this field is determined as $\lceil \log_2(I) \rceil$ bits, where I is the number of entries in the higher layer parameter dl-DataToUL-ACK.
- Antenna port(s)- 4, 5, or 6 bits as defined by Tables 7.3.1.2.2-1/2/3/4, where the number of CDM groups without data of values 1, 2, and 3 refers to CDM groups $\{0\}$, $\{0,1\}$, and $\{0, 1,2\}$ respectively. The antenna ports $\{p_{0,...,}p_{0-1}\}$ shall be determined according to the ordering of DMRS port(s) given by Tables 7.3.1.2.2-1/2/3/4.
If a UE is configured with both dmrs-DownlinkForPDSCH-MappingTypeA and dmrs-DownlinkForPDSCH-MappingTypeB, the bitwidth of this field equals $\max\{x_A, x_B\}$, where $x_A$ is the "Antenna ports" bitwidth derived according to dmrs-DownlinkForPDSCH-MappingTypeA and $x_B$ is the "Antenna ports" bitwidth derived according to dmrs-DownlinkForPDSCH-MappingTypeB. A number of $|x_A - x_B|$ zeros are padded in the MSB of this field, if the mapping type of the PDSCH corresponds to the smaller value of $x_A$ and $x_B$.
- Transmission configuration indication- 0 bit if higher layer parameter tci-PresentInDCI is not enabled; otherwise 3 bits as defined in Subclause 5.1.5 of [6, TS38.214].
If "Bandwidth part indicator" field indicates a bandwidth part other than the active bandwidth part,
  - if the higher layer parameter tci-PresentInDCI is not enabled for the CORESET used for the PDCCH carrying the DCI format 1_1,
    - the UE assumes tci-PresentInDCI is not enabled for all CORESETs in the indicated bandwidth part;
  - otherwise,
    - the UE assumes tci-PresentInDCI is enabled for all CORESETs in the indicated bandwidth part.
- SRS request- 2 bits as defined by Table 7.3.1.1.2-24 for UEs not configured with supplementaryUplink in ServingCellConfig in the cell; 3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of [6, TS 38.214].
- CBG transmission information (CBGTI)- 0 bit if higher layer parameter codeBlockGroupTransmission for PDSCH is not configured, otherwise, 2, 4, 6, or 8 bits as defined in Subclause 5.1.7 of [6, TS38.214], determined by the higher layer parameters maxCodeBlockGroupsPerTransportBlock and maxNrofCodeWordsScheduledByDCI for the PDSCH.
- CBG flushing out information (CBGFI)- 1 bit if higher layer parameter codeBlockGroupFlushIndicator is configured as "TRUE", 0 bit otherwise.
- DMRS sequence initialization- 1 bit.

Hereinafter, a method of allocating time domain resources for a data channel in a 5G communication system is described.

The BS may configure a table for time domain resource allocation information for a downlink data channel (physical downlink shared channel (PDSCH)) and an uplink data channel (physical uplink shared channel (PUSCH)) in the UE through higher-layer signaling (for example, RRC signaling). A table including a maximum of maxNrofDL-Allocations=16 entries may be configured for the PDSCH, and a table including a maximum of maxNrofUL-Allocations=16 entries may be configured for the PUSCH. The time domain resource allocation information may include, for example, PDCCH-to-PDSCH slot timing (corresponding to a time interval in units of slots between a time point at which a PDCCH is received and a time point at which a PDSCH scheduled by the received PDCCH is transmitted, and indicated by K0) or PDCCH-to-PUSCH slot timing (corresponding to a time interval in units of slots between a time point at which a PDCCH is received and a time point at which a PUSCH scheduled by the received PDCCH is transmitted, and indicated by K2), information on a location and a length of a start symbol in which a PDSCH or a PUSCH is scheduled within the slot, a mapping type of a PDSCH or a PUSCH, and the like. For example, information shown in Table 8 and Table 9 below may be notified to the UE by the BS.

TABLE 8

PDSCH-TimeDomainResourceAllocationList information element

PDSCH-TimeDomainResourceAllocationList ::= SEQUENCE (SIZE(1..maxNrofDL-Allocations)) OF PDSCH-TimeDomainResourceAllocation
PDSCH-TimeDomainResourceAllocation ::=   SEQUENCE {
  k0                                       INTEGER(0..32)
OPTIONAL,   -- Need S
  (PDCCH-to-PDSCH timing, slot unit)
  mappingType                    ENUMERATED {typeA, typeB},
  (PDSCH mapping type)
  startSymbolAndLength     INTEGER (0..127)
  (start symbol and length of PDSCH)
}

TABLE 9

PUSCH-TimeDomainResourceAllocation information element

PUSCH-TimeDomainResourceAllocationList ::= SEQUENCE (SIZE(1..maxNrofUL-Allocations)) OF PUSCH-TimeDomainResourceAllocation
PUSCH-TimeDomainResourceAllocation ::=   SEQUENCE {
  k2                                       INTEGER(0..32)
OPTIONAL,   -- Need S
  (PDCCH-to-PUSCH timing, slot unit)
  mappingType                    ENUMERATED {typeA, typeB},
  (PUSCH mapping type)
  startSymbolAndLength     INTEGER (0..127)
  (start symbol and length of PDSCH)
}

The BS may inform the UE of one of the entries in the table for the time domain resource allocation information through L1 signaling (for example, DCI) (for example, through a 'time domain resource allocation' filed within DCI). The UE may acquire time domain resource allocation information for a PDSCH or a PUSCH on the basis of the DCI received from the BS.

Hereinafter, a method of allocating frequency domain resources for a data channel in a 5G communication system is described.

In 5G, two types, such as resource allocation type 0 and resource allocation type 1, are supported as a method of indicating frequency domain resource allocation information for a downlink data channel (Physical Downlink Shared Channel (PDSCH) and an uplink data channel (Physical Uplink Shared Channel (PUSCH)).

Resource Allocation Type 0

The BS may inform the UE of RB allocation information in the form of a bitmap for a resource block group (RBG). At this time, the RBG may include a set of successive virtual RBs (VRBs), and the size P of the RBG may be determined on the basis of a value configured as a higher-layer parameter (rbg-Size) and a value of the size of a BWP defined in Table 10 below. Table 10 shows the nominal RBG size P.

TABLE 10

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

A total number $N_{RBG}$ of RBGs of a BWP i having the size of be defined as below.

$N_{RBG} = \lceil (N_{BWP,i}^{size} + (N_{BWP,i}^{start} \bmod P))/P \rceil$, where the size of the first RBG is $RBC_0^{size} = P - N_{BWP,i}^{start} \bmod P$,
the size of last RBG is $RBG_{last}^{size} = (N_{BWB}^{start} + N_{BWP,i}^{size}) \bmod P$ if $(N_{BWP,i}^{start} + N_{BWP,i}^{size}) \bmod P > 0$ and P otherwise,
the size of all other RBGs is P.

Bits in a bitmap having the bit size of $N_{RBG}$ may correspond to respective RBGs. Indexes may be assigned to the RBGs in the order of increasing frequencies starting from the lowest frequency. For $N_{RBG}$ RBGs within the BWP, RBGs from RBG #0 to RBG #($N_{RBG}-1$) may be mapped to bits from the MSB to the LSB in the RBG bitmap. When a specific bit value within the bitmap is 1, the UE may determine that an RBG corresponding to the corresponding bit value is allocated. When a specific bit value within the bitmap is 0, the UE may determine that an RBG corresponding to the corresponding bit value is not allocated.

Resource Allocation Type 1

The BS may inform the UE of the RB allocation information through information on a start location and a length of successively allocated VRBs. At this time, interleaving or non-interleaving may be additionally applied to the successively allocated VRBs. A resource allocation field of resource allocation type 1 may include a resource indication value (RIV), and the RIV may include a start point RB start of the VRB and a length $L_{RBs}$ of successively allocated RBs. More specifically, the RIV within the BWP having the size of $N_{BWP}^{size}$ may be defined as below.

if $(L_{RBs} - 1) \leq \lfloor N_{BWP}^{size} / 2 \rfloor$ then
  RIV = $N_{BWP}^{size}(L_{RBs} - 1) + RB_{start}$
else
  RIV = $N_{BWP}^{size}(N_{BWP}^{size} - L_{RBs} + 1) + (N_{BWP}^{size} - 1 - RB_{start})$ where $L_{RBS} \geq 1$ and shall not exceed $N_{BWP}^{size} - RB_{start}$.

The BS may configure a resource allocation type in the UE through higher-layer signaling (for example, a higher-layer parameter resourceAllocation may be configured as one value among resourceAllocationType0, resourceAllocationType1, or dynamicSwitch). If the UE receives a configuration of both resource allocation types 0 and 1 (or if the higher-layer parameter resourceAllocation is configured as dynamicSwitch), it may indicate whether a bit corresponding to the most significant bit (MSB) of a field indicating resource allocation within a DCI format indicating scheduling is resource allocation type 0 or resource allocation type 1, resource allocation information may be indicated through the remaining bits except for the bit corresponding to the MSB on the basis of the indicated resource allocation type, and the UE may analyze resource allocation field information of the DCI field on the basis thereof. If the UE receives a configuration of one of resource allocation type 0 or resource allocation type 1 (or if the higher-layer parameter resourceAllocation is configured as one value among resourceAllocationType0 or resourceAllocationType1), resource allocation information may be indicated on the basis of a field indicating resource allocation within a DCI format indicating scheduling and the UE may analyze resource allocation field information of a DCI field on the basis of thereof.

Hereinafter, the downlink control channel in the 5G communication system will be described in more detail with reference to the drawings.

Figure 8:
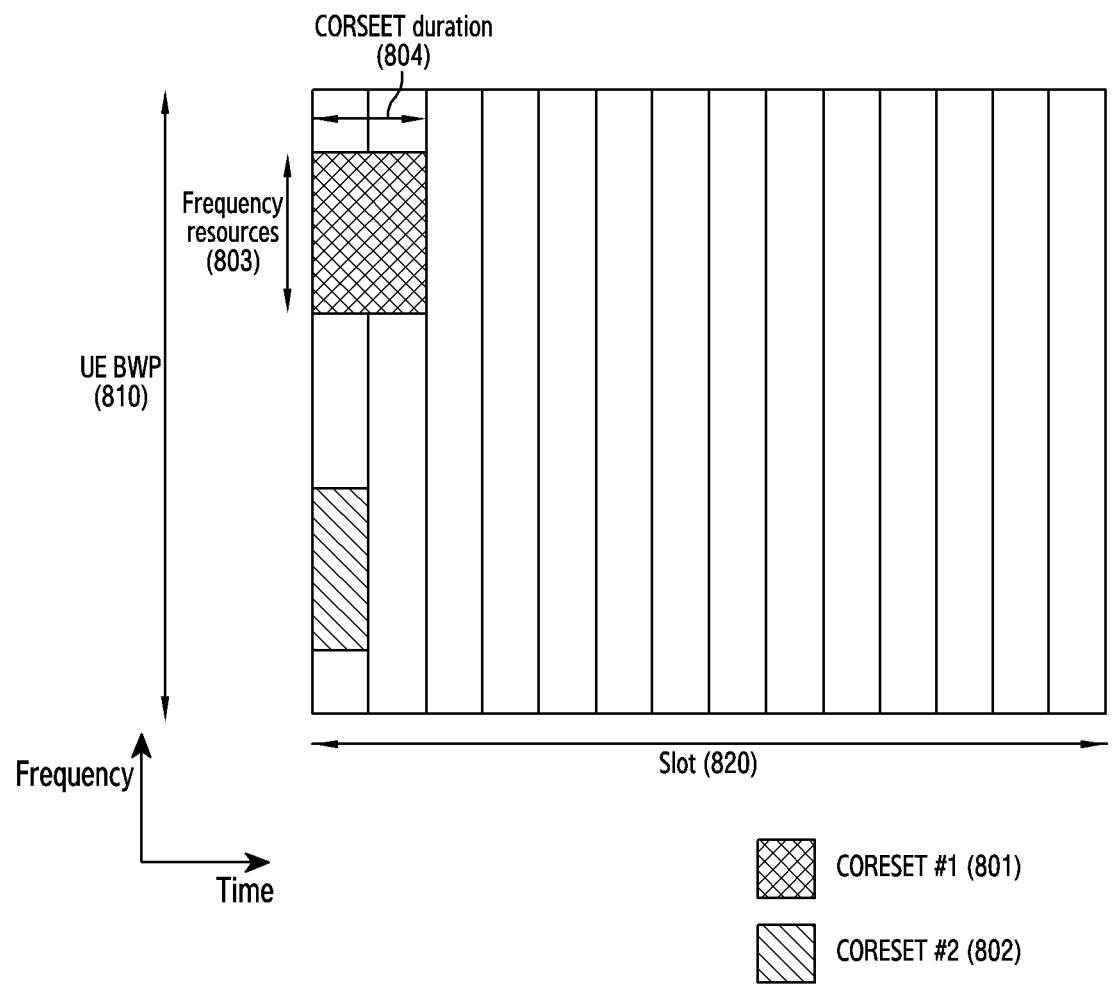
FIG. 8 illustrates the structure of a control resource set in a wireless communication system according to various embodiments of the disclosure.

FIG. 8 illustrates the structure of a control resource set in a wireless communication system according to various embodiments of the disclosure.

Specifically, FIG. 8 illustrates an example of a control resource set (CORESET) in which a downlink control channel is transmitted in the 5G wireless communication system. FIG. 8 illustrates an example in which a BWP of the UE (UE bandwidth part) 810 is configured in a frequency axis and two CORESETs (CORESET #1 801 and CORESET #2 802) are configured within one slot 820 in a time axis. The CORESETs 801 and 802 may be configured in specific frequency resources 803 within the entire UE BWP 810 in the frequency axis. The CORESETs may be configured as one or a plurality of OFDM symbols in the time axis, which may be defined as a control resource set duration 804.

Referring to FIG. 8, CORESET #1 801 may be configured to have CORESET duration of two symbols, and CORESET #2 802 may be configured to have CORESET duration of one symbol.

The CORESET in 5G may be configured in the UE by the BS through higher-layer signaling (for example, system information, a master information block (MIB), or radio resource control. (RRC) signaling). Configuring the control resource set in the UE may mean providing information such as an identity of the control resource set, a frequency location of the control resource set, a symbol length of the control resource set, and the like. For example, information in Table 11 below may be included.

TABLE 11

```
ControlResourceSet ::=              SEQUENCE {
    -- Corresponds to L1 parameter 'CORESET-ID'
    controlResourceSetId
    ControlResourceSetId,
    (Control Resource Set Identity))
    frequencyDomainResources        BIT STRING (SIZE (45)),
    (Frequency domain resources allocation information)
    duration                        INTEGER
(1..maxCoReSetDuration),
    (Time domain resources allocation information)
    cce-REG-MappingType             CHOICE {
    (CCE-to-REG mapping type)
        interleaved
        SEQUENCE {
            reg-BundleSize
            ENUMERATED {n2, n3, n6},
            (REG bundle size)
                precoderGranularity
            ENUMERATED {sameAsREG-bundle, allContiguousRBs},
                interleaverSize
            ENUMERATED {n2, n3, n6}
                (interleaver size)
                shiftIndex
            INTEGER(0..maxNrofPhysicalResourceBlocks-1)
                OPTIONAL
                (interleaver shift)
        },
        nonInterleaved              NULL
    },
    tci-StatesPDCCH
```

TABLE 11-continued

```
    SEQUENCE(SIZE (1..maxNrofTCI-StatesPDCCH)) OF TCI-StateId
        OPTIONAL,
    (QCL configuration information)
        tci-PresentInDCI            ENUMERATED
{enabled}
                OPTIONAL,  -- Need S
}
```

In Table 11, tci-StatesPDCCH (simply, referred to as a transmission configuration indication (TCI) state) configuration information may include information on one or a plurality of synchronization signal (SS)/physical broadcast channel (PBCH) block indexes or channel state information reference signal (CSI-RS) indexes having the quasi co-located (QCL) relationship with a demodulation reference signal (DMRS) transmitted in the corresponding CORESET.

Figure 9:
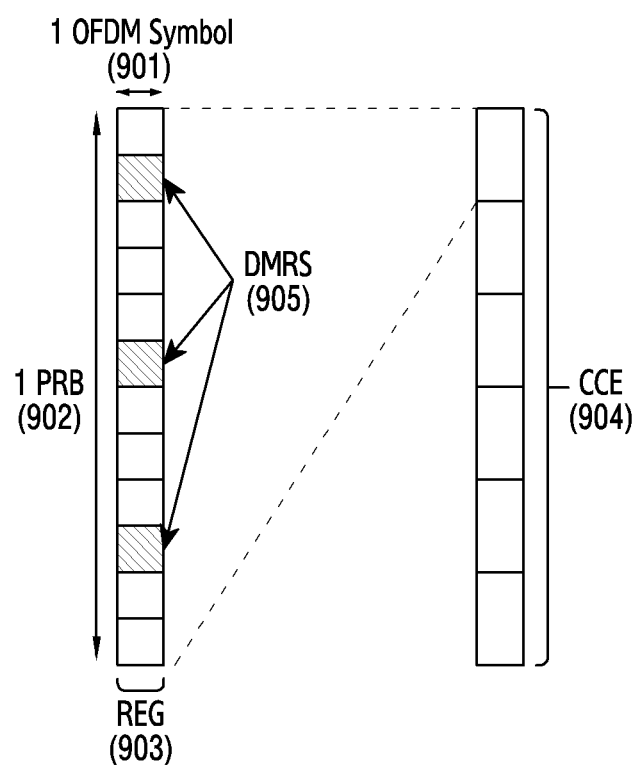
FIG. 9 illustrates the structure of resources in a wireless communication system according to various embodiments of the disclosure.

FIG. 9 illustrates the structure of resources in a wireless communication system according to various embodiments of the disclosure.

Specifically, FIG. 9 illustrates an example of a basic unit of time and frequency resources included in a downlink control channel which can be used in 5G.

Referring to FIG. 9, the basic unit of time and frequency resources included in the control channel may be a resource element group (REG) 903, and the REG 903 may be defined as one OFDM symbol 901 in the time axis and one physical resource block (PRB) 902, that is, as 12 subcarriers in the frequency axis. The BS may configure a downlink control channel allocation unit by concatenating the REGs 903.

Referring to FIG. 9, when a basic unit of allocation of the downlink control channel in 5G is a control channel element (CCE) 904, one CCE 904 may include a plurality of REGs 903. To take the REG 903 illustrated in FIG. 9 as an example, the REG 903 may include 12 REs, and when 1 CCE 904 includes 6 REGs 903, 1 CCE 904 may include 72 REs. When a downlink CORESET is configured, the corresponding area may include a plurality of CCEs 904, and a specific downlink control channel may be mapped to one or a plurality of CCEs 904 according to an aggregation level (AL) within the CORESET and then transmitted. The CCEs 904 within the CORESET may be distinguished by numbers, and at this time, the numbers of the CCEs 904 may be assigned according to a logical mapping scheme.

Referring to FIG. 9, the basic unit of the downlink control channel, that is, the REG 903, may include all of REs to which the DCI is mapped and areas to which DMRSs 905, which are reference signals for decoding the REs, are mapped. As illustrated in FIG. 9, 3 DMRSs 903 may be transmitted within 1 REG 905. The number of CCEs required to transmit the PDCCH may be 1, 2, 4, 8, or 16 according to the aggregation level (AL), and the different number of CCEs may be used to implement link adaptation of the downlink control channel. For example, if AL=L, one downlink control channel may be transmitted through L CCEs. The UE is required to detect a signal in the state in which the UE is not aware of information on the downlink control channel, and a search space indicating a set of CCEs is defined for blind decoding. The search space is a set of downlink control channel candidates including CCEs for which the UE should attempt decoding at the given aggregation level, and there are several aggregation levels at which one set of CCEs is configured by 1, 2, 4, 8, and 16 CCEs, so that the UE may have a plurality of search spaces. The search space set may be defined as a set of search spaces at all configured aggregation levels.

The search spaces may be classified into a common search space and a UE-specific search space. UEs in a predetermined group or all UEs may search for a common search space of the PDCCH in order to receive cell-common control information such as dynamic scheduling for system information or paging messages. For example, PDSCH scheduling allocation information for transmission of an SIB including information on a service provider of a cell may be received by searching for a common-search space of the PDCCH. In the case of the common search space, UEs in a predetermined group or all UEs should receive the PDCCH, so that the common-search space may be defined as a set of pre-arranged CCEs. Scheduling allocation information for the UE-specific PDSCH or PUSCH may be received by searching for a UE-specific search space of the PDCCH. The UE-specific search space may be UE-specifically defined as a UE identity and a function of various system parameters.

In 5G, parameters for the search space of the PDCCH may be configured in the UE by the BS through higher-layer signaling (for example, SIB, MIB, or RRC signaling). For example, the BS may configure, in the UE, the number of PDCCH candidates at each aggregation level L, a monitoring period of the search space, a monitoring occasion in units of symbols within the slot for the search space, a search space type, that is, a common-search space or a UE-specific search space, a combination of a DCI format and an RNTI to be monitored in the corresponding search space, and a control resource set index for monitoring the search space. For example, the parameter of the search space for the PDCCH may include information in Table 12 below.

TABLE 12

```
SearchSpace ::=                                         SEQUENCE {
    -- Identity of the search space. SearchSpaceId = 0 identifies the
SearchSpace configured via PBCH (MIB) or ServingCellConfigCommon.
    searchSpaceId                                       SearchSpaceId,
    (search space ID)
        controlResourceSetId
        ControlResourceSetId,
    (control resource set ID)
        monitoringSlotPeriodicityAndOffset              CHOICE {
    (monitoring slot periodicity and offset)
            sl1
        NULL,
            sl2
        INTEGER (0..1),
            sl4
        INTEGER (0..3),
            sl5
        INTEGER (0..4),
            sl8
        INTEGER (0..7),
            sl10
        INTEGER (0..9),
            sl16
        INTEGER (0..15),
            sl20
        INTEGER (0..19)
        }
                                                        OPTIONAL,
    duration(monitoring length)                         INTEGER (2..2559)
        monitoringSymbolsWithinSlot                     BIT STRING
(SIZE (14))
            OPTIONAL,
    (monitoring symbols within slot)
        nrofCandidates                                  SEQUENCE {
    (number of PDCCH candidates per aggregation level)
        aggregationLevel1                               ENUMERATED
{n0, n1, n2, n3, n4, n5, n6, n8},
        aggregationLevel2                               ENUMERATED
{n0, n1, n2, n3, n4, n5, n6, n8},
        aggregationLevel4                               ENUMERATED
{n0, n1, n2, n3, n4, n5, n6, n8},
        aggregationLevel8                               ENUMERATED
{n0, n1, n2, n3, n4, n5, n6, n8},
        aggregationLevel16                              ENUMERATED
{n0, n1, n2, n3, n4, n5, n6, n8}
        },
        searchSpaceType                                 CHOICE {
        (search space type)
            -- Configures this search space as common search space (CSS) and
DCI formats to monitor.
            common
        SEQUENCE {
        (common search space)
        }
            ue-Specific
        SEQUENCE {
```

TABLE 12-continued

```
(UE-specific search space)
        -- Indicates whether the UE monitors in this USS for DCI
formats 0-0 and 1-0 or for formats 0-1 and 1-1.
        formats
        ENUMERATED {formats0-0-And-1-0, formats0-1-And-1-1},
        ...
    }
```

The BS may configure one or a plurality of search space sets in the UE according to configuration information. According to an embodiment, the BS may configure search space set 1 and search space 2 in the UE, and the configuration may be performed such that DCI format A scrambled by an X-RNTI in search space set 1 is monitored in the common-search space and DCI format B scrambled by a Y-RNTI in search space set 2 is monitored in the UE-specific search space.

According to configuration information, one or a plurality of search space sets may exist in the common search space or the UE-specific search space. For example, search space set #1 and search space set #2 may be configured as common-search spaces, and search space set #3 and search space set #4 may configured as UE-specific search spaces.

In the common search space, the following combinations of DCI formats and RNTIs may be monitored. Of course, various embodiments of the disclosure are not limited to the following examples.
  DCI format 0_0/1_0 with CRC scrambled by C-RNTI, CS-RNTI, MCS-C-RNTI, SP-CSI-RNTI, RA-RNTI, TC-RNTI, P-RNTI, SI-RNTI
  DCI format 2_0 with CRC scrambled by SFI-RNTI
  DCI format 2_1 with CRC scrambled by INT-RNTI
  DCI format 2_2 with CRC scrambled by TPC-PUSCH-RNTI, TPC-PUCCH-RNTI
  DCI format 2_3 with CRC scrambled by TPC-SRS-RNTI In the UE-specific search space, the following combinations of DCI formats and RNTIs may be monitored. Of course, various embodiments of the disclosure are not limited to the following examples.
  DCI format 0_0/1_0 with CRC scrambled by C-RNTI, CS-RNTI, TC-RNTI
  DCI format 1_0/1_1 with CRC scrambled by C-RNTI, CS-RNTI, TC-RNTI The described RNTIs may follow the following definition and use.
  Cell RNTI (C-RNTI): used for scheduling UE-specific PDSCH
  Modulation coding scheme (MCS) C-RNTI (MCS-C-RNTI): used for UE-specific PDSCH scheduling
  Temporary cell RNTI (TC-RNTI): used for scheduling UE-specific PDSCH
  Configured scheduling RNTI (CS-RNTI): used for semi-statically configured UE-specific PDSCH scheduling
  Random access RNTI (RA-RNTI): used for PDSCH scheduling at random access stage
  Paging RNTI (P-RNTI): used for PDSCH scheduling through which paging is transmitted
  System information RNTI (SI-RNTI): used for PDSCH scheduling through which system information is transmitted
  Interruption (INT)-RNTI: used for indicating whether puncturing is performed for PDSCH
  Transmit power control for (TPC)-PUSCH-RNTI: used for indicating PUSCH power control command
  Transmit power control for (TPC)-PUCCH RNTI: used for indicating PUCCH power control command
  Transmit power control for (TPC)-SRS RNTI: used for indicating SRS power control command The DCI formats may follow the definition in Table 13 below.

TABLE 13

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, a search space at an aggregation level L in a CORESET p and a search space set s may be expressed as shown in Equation 1 below.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p}/L \rfloor \right\} + i \quad \text{Equation (1)}$$

L: aggregation level
nCI: carrier index
$N_{CCE,p}$: total number of CCEs existing within control resource set p
$n^\mu_{s,f}$: slot index
$M^{(L)}_{p,s,max}$: number of PDCCH candidates at aggregation level L
$m_{s,n_{CI}}=0, \ldots, M^{(L)}_{p,s,max}-1$: PDCCH candidate index at aggregation level L
i=0, ..., L−1

$$Y_{p,n_{s,f}^\mu} = \left( A_p \cdot Y_{p,n_{s,f}^\mu-1} \right) \mod D, \quad Y_{p,-1} = n_{RNTI} \neq 0,$$

$$A_0 = 39827, A_1 = 39829, A_2 = 39839, D = 65537$$

nRNTI: UE identifier
A value of $Y\_(p,n^\mu_{s,f})$ may correspond to 0 in the case of the common search space.
A value of $Y\_(p,n^\mu_{s,f})$ may correspond to a value varying depending on a UE identity (a C-RNTI or an ID configured in the UE by the BS) and a time index in the case of the UE-specific search space.

Figure 10:
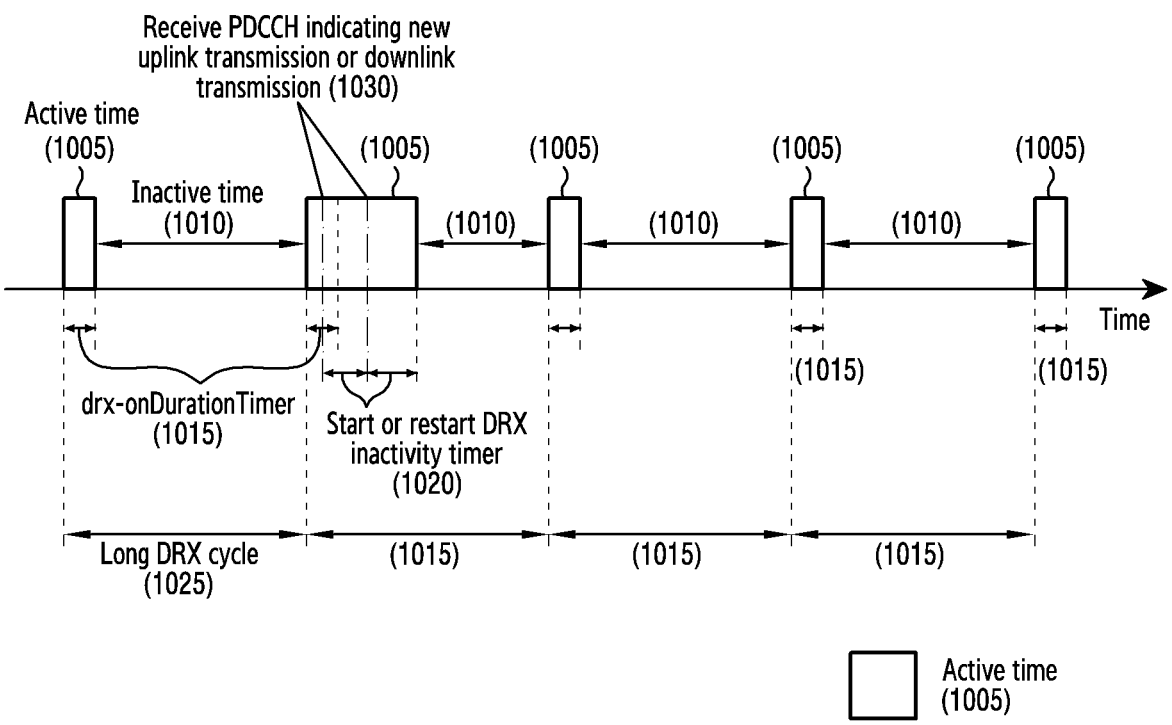
FIG. 10 illustrates a process of discontinuous reception (DRX) in a wireless communication system according to various embodiments of the disclosure.

FIG. 10 illustrates a process of Discontinuous Reception (DRX) in a wireless communication system according to various embodiments of the disclosure. Specifically, FIG. 10 describes Discontinuous Reception (DRX).

Discontinuous Reception (DRX) is an operation in which the UE using a service discontinuously receives data in an RRC-connected state in which a radio link is established between the BS and the UE. When DRX is applied, the UE may turn on a receiver at a specific time point and monitor a control channel, and when there is no data received for a predetermined period, turn off the receiver to reduce power consumption of the UE. The DRX operation may be controlled by a MAC layer device on the basis of various parameters and a timer.

Referring to FIG. 10, an active time 1005 is a time during which the UE wakes up every DRX cycle and monitor a PDCCH. The active time 1005 may be defined below.

drx-onDurationTimer, drx-InactivityTimer, drx-Retransmission TimerDL, drx-RetransmissionTimerUL, or ra-ContentionResolutionTimer is running;

a scheduling request is sent on a PUCCH and is pending; or a PDCCH indicating new transmission addressed to a C-RNTI of a MAC entity has not been received after successful reception of a random access response to a random access preamble that is not selected by the MAC entity among contention-based random access preambles drx-onDurationTimer, drx-InactivityTimer, drx-Retransmission TimerDL, drx-RetransmissionTimerUL, ra-ContentionResolutionTimer, and the like are timers of which values are configured by the BS, and have functions configured to monitor a PDCCH by the UE in the state in which a predetermined condition is satisfied.

The drx-onDurationTimer 1015 is a parameter for configuring a minimum time during which the UE is awake in a DRX cycle. The drx-InactivityTimer 1020 is a parameter for configuring a time during which the UE is additionally awake when a PDCCH indicating new uplink transmission or downlink transmission is received as indicated by reference numeral 1030. The drx-RetransmissionTimerDL is a parameter for configuring a maximum time during which the UE is awake in order to receive downlink retransmission in a downlink HARQ procedure. The drx-RetransmissionTimerUL is a parameter for configuring a maximum time during which the UE is awake in order to receive a grant of uplink retransmission in an uplink HARQ procedure. The drx-onDurationTimer, drx-InactivityTimer, drx-RetransmissionTimerDL, and drx-RetransmissionTimerUL may be configured as, for example, a time, the number of subframe, the number of slots, and the like. The ra-ContentionResolutionTimer is a parameter for monitoring a PDCCH in a random access procedure.

An inactive time 1010 is a time in which no PDCCH monitoring is performed or a time in which no PDCCH reception is performed during the DRX operation, and the remaining time except for the active time 1005 in the entire time in which the DRX operation is performed may be the inactive time 1010. When the PDCCH is not monitored during the active time 1005, the UE may enter the sleep or inactive state and reduce power consumption.

The DRX cycle refers to a cycle on which the UE wakes up and monitors a PDCCH. That is, the DRX cycle is a time interval or a cycle of on duration from monitoring of the PDCCH to monitoring of the next PDCCH by the UE. The DRX cycle includes two types, such as a short DRX cycle and a long DRX cycle. The short DRX cycle may be optionally applied.

The long DRX cycle 1025 is a longer DRX cycle among two DRX cycles configured in the UE. The UE starts the drx-onDurationTimer 1015 at a time point at which the long DRX cycle 1025 passes after a start point (for example, a start symbol) of the drx-onDurationTimer 1015 during the long DRX cycle. In the case of the long DRX cycle 1025, the UE may start the drx-onDurationTimer 1015 in a slot after drx-SlotOffset in a subframe that satisfies Equation 2 below. Here, the drx-SlotOffset is a delay before the drx-onDurationTimer 1015 starts. The drx-SlotOffset may be configured as, for example, a time, the number of slots, or the like.

$$[(SFN \times 10)+\text{subframe number}] \bmod (drx\text{-LongCycle}) = drx\text{-StartOffset} \quad \text{Equation (2)}$$

At this time, a drx-LongCycleStartOffset may include the long DRX cycle 1025 and a drx-StartOffset, and may be used to define a subframe for starting the long DRX cycle 1025. The drx-LongCycleStartOffset may be configured as, for example, a time, the number of subframes, the number of slots, or the like.

The short DRX cycle is a shorter DRX cycle among two DRX cycles configured in the UE. When the UE operates on the long DRX cycle 1025 and then a predetermined event, for example, reception of a PDCCH indicating new uplink transmission or downlink transmission, is generated in the active time 1005, the UE may start or restart the drx-InactivityTimer 1020 and, when the drx-InactivityTimer 1020 has expired or a DRX command MAC CE is received, operate on the short DRX cycle. For example, in FIG. 10, the UE may start the drx-ShortCycleTimer at a time point at which the drx-onDurationTimer 1015 or the drx-InactivityTimer 1020 expires and operate on the short DRX cycle before the drx-ShortCycleTimer expires. When the UE receives the PDCCH indicating new uplink transmission or downlink transmission as indicated by reference numeral 1030, the UE may expect additional uplink transmission or downlink transmission in the future and extend the active time 1005 or delay the advent of the inactive time 1010. The UE starts the drx-onDurationTimer 1015 again at a time point at which the short DRX cycle passes from a start point of previous on duration during the short DRX cycle. Thereafter, when the drx-ShortCycleTimer has expired, the UE operates on the long DRX cycle 1025 again.

In the case of the short DRX cycle, the UE may start the drx-onDurationTimer 1015 after the drx-SlotOffset in a subframe that satisfies Equation 3 below. Here, the drx-SlotOffset is a delay before the drx-onDurationTimer 1015 starts. The drx-SlotOffset may be configured as, for example, a time, the number of slots, or the like.

$$[(SFN \times 10)+\text{subframe number}] \bmod (drx\text{-Short-Cycle}) = (drx\text{-StartOffset}) \bmod (drx\text{-Short-Cycle}) \quad \text{Equation (3)}$$

Here, drx-ShortCycle and drx-StartOffset may be used to define a subframe to start a short DRX cycle. The drx-ShortCycle and the drx-StartOffset may be configured as, for example, a time, the number of subframes, the number of slots, or the like.

The DRX operation has been described above with reference to FIG. 10. According to an embodiment, the UE may reduce power consumption of the UE by performing the DRX operation. However, even though the UE performs the DRX operation, the UE does not always receive a PDCCH related to the UE in the active time 1005. Accordingly, an embodiment of the disclosure may provide a signal for controlling the UE operation in order to more efficiently save power of the UE.

Hereinafter, carrier aggregation and a scheduling method in a 5G communication system are described in detail.

The UE may access a primary cell through initial access, and the BS may additionally configure one or a plurality of secondary cells in the UE. The UE may perform communication through a serving cell including the primary cell and the secondary cells configured by the BS.

The BS may additionally configure whether to perform cross-carrier scheduling for cells configured in the UE. For convenience of description, when the cross-carrier scheduling is configured, a cell (that is, a cell receiving downlink control information corresponding to downlink allocation or uplink grant) performing the scheduling is referred to as a "first cells" and a cell (that is, a cell to which and from which downlink or uplink data is actually scheduled and transmitted and received on the basis of downlink control information) for which the scheduling is performed is referred to as a "second cell". If the UE receives a configuration of cross-carrier scheduling for a specific cell A (scheduled cell) (at this time, the cell A corresponds to the "second cell"), the UE may not perform PDCCH monitoring in the cell A but may perform the PDCCH monitoring in another cell B indicated by the cross-carrier scheduling, that is, a cell performing the scheduling (scheduling cell) (at this time, the cell B corresponds to the "first cell"). The BS may configure information on the "first cell" performing the scheduling for the "second cell" (for example, a cell index of the cell corresponding to the "first cell"), a value of a Carrier Indicator Field (CIF) for the "second cell", and the like in order to configure cross-carrier scheduling in the UE. For example, the BS may inform the UE of configuration information in Table 14 below through higher-layer signaling (for example, RRC signaling).

TABLE 14

| | |
|---|---|
| CrossCarrierSchedulingConfig ::= | SEQUENCE { |
| schedulingCellInfo | CHOICE { |
| own (self carrier scheduling) | SEQUENCE { - |
| - No cross carrier scheduling | |
| cif-Presence | BOOLEAN |
| }, | |
| other (cross carrier scheduling) | SEQUENCE { - |
| - Cross carrier scheduling | |
| schedulingCellId | ServCellIndex, |
| (scheduling cell index) | |
| cif-InScheduhngCell | INTEGER (1..7) |
| (CIF value) | |
| } | |
| }, | |
| ... | |
| } | |

The UE may monitor a PDCCH for a cell configured by cross-carrier scheduling in a cell corresponding to the "first cell". The UE may determine an index of the cell scheduled by received DCI on the basis of the value of the carrier indicator field within a DCI format for scheduling data and may transmit and receive data in a cell indicated by the carrier indicator.

The scheduled cell (cell A) and the scheduling cell (cell B) may be configured by different numerologies. The numerology may include subcarrier spacing, a cyclic prefix, and the like. When numerologies of the cell A and the cell B are different, the following minimum scheduling offset may be further considered between a PDCCH and a PDSCH when the PDCCH of the cell B schedules the PDSCH of the cell A.

[Cross-Carrier Scheduling Method]

(1) When subcarrier spacing (μB) of the cell B is smaller than subcarrier spacing (μA) of the cell A, the PDSCH may be scheduled from the next PDSCH slot corresponding to a point after X symbols from the last symbol of the received PDCCH in the cell B. X may vary depending on μB, and may be defined such that X=4 symbols when μB=15 kHz, X=4 symbols when μB=30 kHz, and X=8 symbols when uB-60 kHz.

(2) When subcarrier spacing (μB) of the cell B is larger than subcarrier spacing (μA) of the cell A, the PDSCH may be scheduled from a time point corresponding to a point after X symbols from the last symbol of the received PDCCH in the cell B. X may vary depending on μB, and may be defined such that X=4 symbols when μB=30 kHz, X=8 symbols when μB=60 kHz, and X=12 symbols when μB=120 kHz.

Hereinafter, a method of configuring a transmission configuration indication (TCI) state that is a means for indicating or exchanging quasi co-location (QCL) information between the UE and the BS in the 5G communication system is described in detail.

The BS may configure and indicate the TCI state between different two RSs or channels through appropriate signaling and inform on the QCL relation between the different RSs or channels. The QCL relation between different RSs or channels may mean that, when a channel is estimated through a reference RS antenna port A (reference RS #A) and another purpose RS antenna port B (target RS #B) which are QCLed, the UE is allowed to apply some or all of large-scale channel parameters estimated in the antenna port A to channel measurement from the antenna port B. The QCL is required to correlate different parameters according to 1) time tracking influenced by an average delay and a delay spread, 2) frequency tracking influenced by a Doppler shift and a Doppler spread, 3) Radio Resource Management (RRM) influenced by an average gain, 4) Beam Management (BM) influenced by a spatial parameter, and the like. Accordingly, NR supports four types of QCL relations shown in Table 15 below.

TABLE 15

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial RX parameter may refer to some or all of various parameters such as an angle of arrival (AoA), a power angular spectrum (PAS) of AoA, an angle of departure (AoD), a PAS of AoD, a transmit/receive channel correlation, transmit/receive beamforming, a spatial channel correlation, and the like.

The QCL relation can be configured in the UE through an RRC parameter TCI state and QCL information (QCL-Info) as shown in Table 16 below. Referring to Table 16 below, the gNB may configure one or more TCI states in the UE and inform the UE of a maximum of two QCL relations (qcl-Type 1 and qcl-Type 2) for an RS referring to an ID of the TCI state, that is, a target RS. At this time, each piece of QCL information (QCL-Info) included in each TC state includes a serving cell index of a reference RS indicated by the corresponding QCL information, a BWP index, a type and an ID of a reference RX, and a QCL type shown in Table 15.

TABLE 16

```
TCI-State ::=                       SEQUENCE {
    tci-StateId                     TCI-StateId,
    (ID of the corresponding TCI state)
    qcl-Type1                       QCL-Info,
    (QCL information of the first reference RS of RS (target RS) referring
to the corresponding TCI state ID)
    qcl-Type2                       QCL-Info
        OPTIONAL,    -- Need R
    (QCL information, of the second reference RS of the RS (target RS)
referring to the corresponding TCI state ID)
    ...
}
QCL-Info ::=                        SEQUENCE {
    cell                            ServCellIndex
        OPTIONAL,    -- Need R
    (the serving cell index of the reference RS indicated by the
corresponding QCL information)
    bwp-Id                          BWP-Id
        OPTIONAL, -- Cond CSI-RS-Indicated
    (BWP index of reference RS indicated by the corresponding QCL
information)
    referenceSignal                 CHOICE {
        csi-rs                      NZP-CSI-RS-
ResourceId,
        ssb                         SSB-
Index
        (one of the CSI-RS ID or SSB ID indicated by the corresponding
QCL information)
    },
    qcl-Type                        ENUMERATED {typeA,
typeB, typeC, typeD},
    ...
}
```

Hereinafter, a paging method in the 5G communication system is described in detail.

Figure 11:
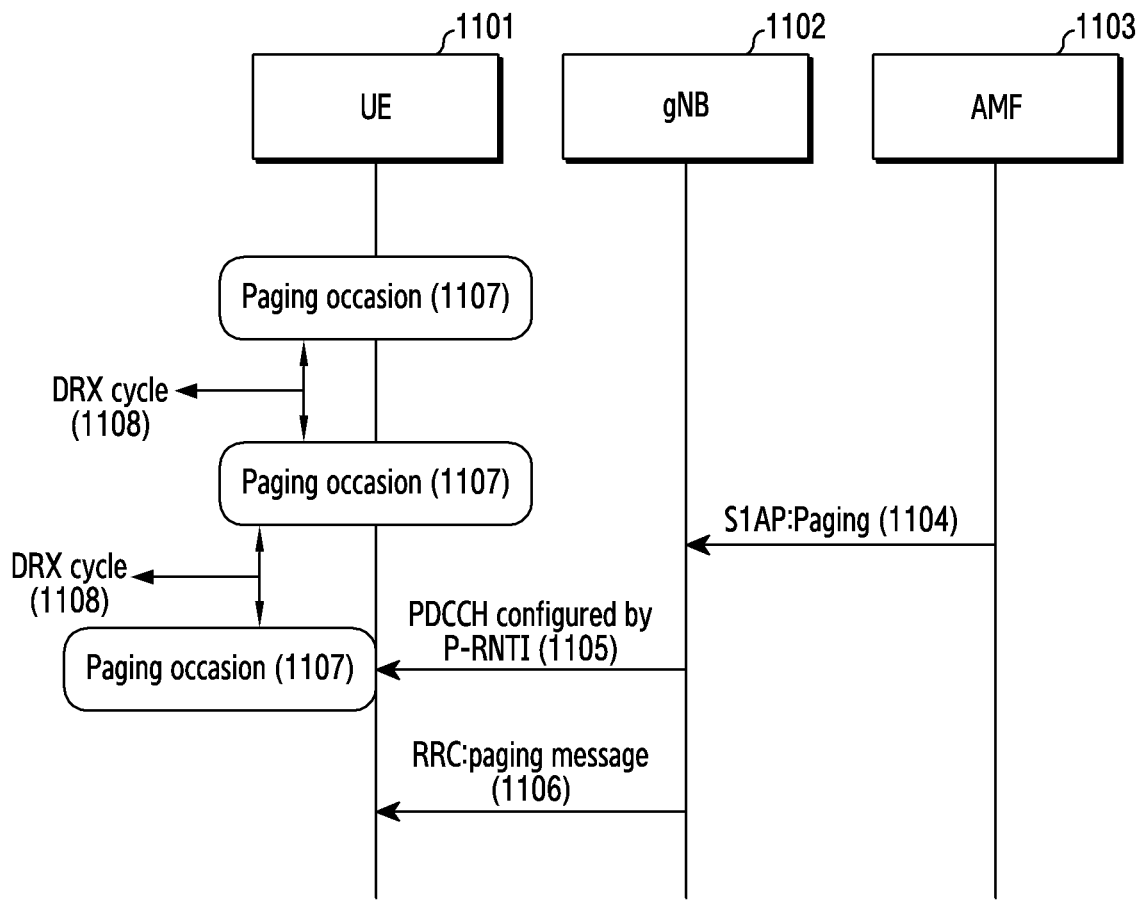
FIG. 11 illustrates a process of paging in a wireless communication system according to various embodiments of the disclosure.

FIG. 11 illustrates a process of paging in a wireless communication system according to various embodiments of the disclosure. Specifically, FIG. 11 illustrates a paging procedure in the 5G communication system. The paging procedure may be used to inform of, when an incoming call to the UE in an idle is generated, the incoming call to start network access for UEs or inform UEs in a connected state that system information has changed. Paging may be controlled by a mobility management entity (AMF) and a paging message may be transmitted over a plurality of cells within a tracking area (TA). Referring to FIG. 7, paging is started at an AMF 1103 and transmitted to a UE 1101 via a gNB 1102. More specifically, paging is started at the AMF 1103 and transmitted to the gNB 1102 through S1AP signaling 1104, and then transmitted to the UE 1101 through RRC signaling 1106. At this time, the UE 1101 may know whether there is a paging message by monitoring a PDCCH 1105 configured by a P-RNTI in a paging occasion 1107. The paging occasion 1107 may be determined on the basis of a DRX cycle 1108 which the gNB configures in the UE. The UE receiving the PDCCH 1105 configured by the P-RNTI may receive a PDSCH including the paging message 1106. The paging message 1106 may include UE ID information of the UE which the gNB desires to wake up.

In an efficient paging procedure, the UE 1101 should have a rest without any reception operation in the most time and should be able to wake up for a little while during only a predetermined time interval in order to observe paging information from the network. To this end, in NR, a paging occasion (PO) and a paging frame (PF) are defined. The PO may be defined as a subframe or a time point in which there is a PDCCH configured by a P-RNTI for receiving a paging message. The PF may be defined as one radio frame including one or a plurality of POs. Referring to FIG. 11, the UE 1101 may observe one PO per discontinuous reception (DRX) cycle 1108.

Figure 12:
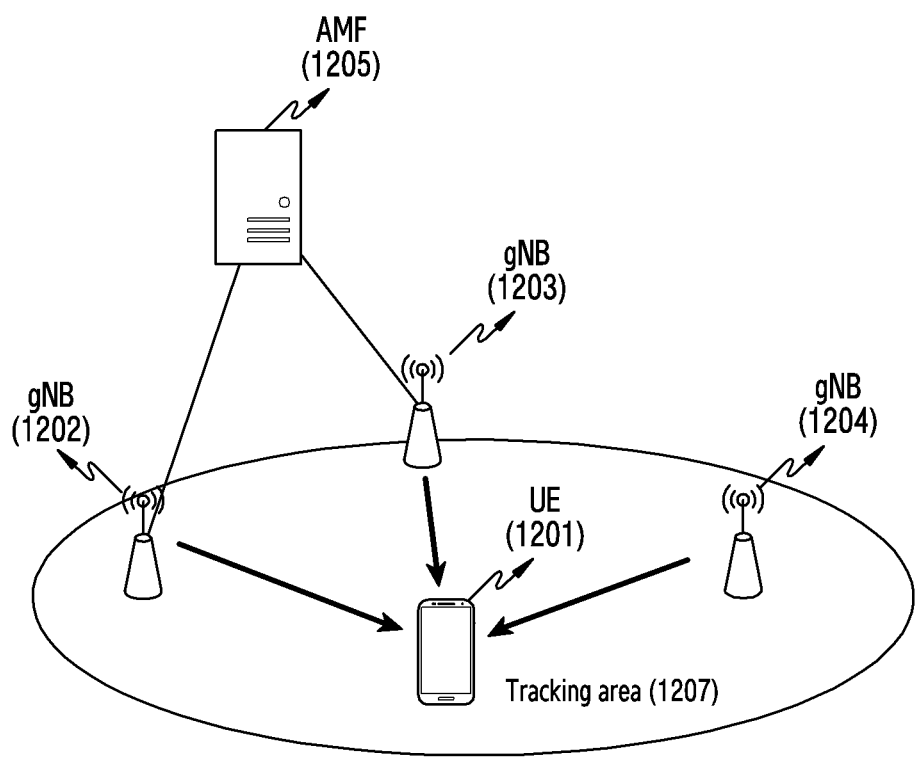
FIG. 12 illustrates a paging process in a wireless communication system according to various embodiments of the disclosure.

FIG. 12 illustrates a paging process in a wireless communication system according to various embodiments of the disclosure.

Specifically, FIG. 12 illustrates an example of paging in the 5G communication system. When a UE 1201 is in an RRC_IDLE state, the NR network knows the location of the UE 1201 in units of tracking areas (TAs) 1207 rather than in units of cells. When accessing the NR network, the UE receives allocation of a tracking area identity (TAI) list from an access and mobility management function (AMF) 1205. The UE 1201 may freely move within a cell in the TAI list without any update of the AMF 805. When an incoming call to the UE 1201 is generated, the AMF 1205 may transmit the same paging message to all cells 1202, 1203, and 1204 within the TA 1207 configured in the corresponding UE 1201, and the respective cells 1202, 1203, and 1204 transmit the paging message to the corresponding UE 1201. When (re) selecting any cell, the UE 1201 may acquire a Tracking Area Code (TAC) of the corresponding cell through system information (for example, SIB1) and identify whether the corresponding cell is a cell in its own TAI list on the basis of thereof. If the TAC of the selected cell is an ID that is not included in the TAI list, the UE transmits a TAU message to the AMF 1205. When transmitting a response (TAU accept) to the TAU message to the UE, the MME may also transmit a TAI list and thus update the TAI list according to movement of the UE location in the UE.

Hereinafter, an operation for monitoring paging of the UE is described in detail.

The UE may monitor one paging occasion (PO) per DRX cycle. One PO may include a set of a plurality of PDCCH monitoring occasions, and a slot in which paging DCI can be transmitted may include a plurality of time slots (for example, subframe or OFDM symbol). One paging frame (PF) may correspond to one radio frame, and may include start points of one or a plurality of POs or a predetermined PO.

In a multi-beam operation, the UE may assume that the same paging message or the same short message is repeated in all transmission beams. At this time, a beam selected to receive a paging message or a short message may be determined by implementation of the UE. Paging message may be all the same for radio access network (RAN)-initiated paging and core network (CN)-initiated paging.

If the UE receives RAN-initiated paging, an RRC connection resumption (RRCConnection Resume) procedure may be started. If the UE receives CN-initiated paging in an RRC_INACTIVE state, the UE may change the RRC_INACTIVE state to an RRC_IDLE mode and inform of the change through network attached storage (NAS).

The paging frame (PF) and the paging occasion (PO) for paging may be determined by the following equation.

A system frame number (SFN) corresponding to the paging frame may be determined by Equation 4 below. In Equation 4 below, A mode B may mean a modulo operation for outputting the remainder obtained by dividing A by B.

$$(SFN+PF\_offset) \bmod T = (T \text{ div } N)*(UE\_ID \bmod N) \quad \text{Equation (4)}$$

An index (i_s) indicating a paging occasion index may be determined by Equation 5 below.

$$i\_s = \text{floor}(UE\_ID/N) \bmod Ns \quad \text{Equation (5)}$$

Respective parameters in Equation 4 and Equation 5 for determining the paging frame and the paging occasion may be determined below.

T: DRX cycle configured in UE (DRX cycle may be configured through higher-layer signaling (for example, RRC signaling, system information (system information block (SIB)), or the like)
N: total number of paging frames within T
Ns: number of paging occasions for one paging frame
PF_offset: offset value for determining time point of paging frame
UE ID: UE ID for determining paging frame and paging occasion which may be determined as in Equation 6

$$UE\_ID = 5G\text{-}S\text{-}TMSI \bmod 1024 \quad \text{Equation (6)}$$

A 5G-S-TMSI may be received by, for example, the UE through higher-layer signaling. If the UE has not been registered in the network, the UE may assume that UE_ID is 0. Alternatively, the UE ID for paging may correspond to a parameter determined by an international mobile subscriber identity (IMSI). In the disclosure, the UE ID for paging is generalized and used as UE_ID. This may include all of a value which can be configured on the basis the 5G-S-TMSI and a value which can be derived from the IMSI value.

PDCCH (or PDCCH scrambled by a P-RNTI) monitoring occasions for paging may be determined by a configuration of a search space for paging (for example, a search space indicated by a higher-layer signaling parameter pagingSearchSpace), information on a configuration for a first PDCCH monitoring occasion of a paging occasion (for example, a higher-layer signaling parameter firstPDCCH-MonitoringOccasionOfPO), and the number of PDCCH monitoring occasions per SS/PBCH within the paging occasion (for example, a higher-layer signaling parameter nrofPDCCH-MontiroingOccasionPerSSB-InPO). Definition of the pagingSearchSpace, firstPDCCH-MonitoringOccasionOfPO, and the nrofPDCCH-MontiroingOccasionPerSSB-InPO are described below in detail.

nrofPDCCH-MontiroingOccasionPerSSB-InPO), and if there is no corresponding configuration information, the UE may assume that X=1. In the paging occasions, a $[x*S+K]^{th}$ (x=0, 1, 2, . . . , X−1, and K=1, 2, 3, . . . , S) PDCCH monitoring occasion may correspond to a $K^{th}$ transmission SS/PBCH block. PDCCH monitoring occasions starting from a first PDCCH monitoring occasion within the paging frame which do not overlap with an uplink (UL) symbol may sequentially have numbers from 0. At this time, when the firstPDCCH-MonitoringOccasionOfPO is configured through higher-layer signaling, a start PDCCH monitoring occasion number of the $(i\_s+1)^{th}$ paging occasion may correspond to a $(i\_s+1)^{th}$ value within the firstPDCCH-MonitoringOccasionOfPO parameter. If the firstPDCCH-MonitoringOccasionOfPO is not configured through higher-layer signaling, a start PDCCH monitoring occasion number of the $(i\_s+1)^{th}$ paging occasion may be the same as i_s*S*X. If X>1 and the UE detects a PDCCH corresponding to a P-RNTI in any paging occasion, the UE is not required to monitor the remaining PDCCH monitoring occasions or PDCCH monitoring occasion thereafter in the corresponding paging occasion.

One paging occasion associated with any paging frame may start within the corresponding paging frame or after the corresponding paging frame.

PDCCH monitoring occasions for a predetermined paging occasion may exist over a plurality of radio frames. When the search space for paging is configured to have a search space ID which is a value other than 0, PDCCH monitoring occasions for one paging occasion may exist over a plurality of cycles of the paging search space.

The following description corresponds to a part related to discontinuous reception for paging in the TS 38.304 standard.

--- pagingSearchSpace
ID of the Search space for paging (see TS 38.213 [13], clause 10.1). If the field is absent, the UE does not receive paging in this BWP (see TS 38.213 [13], clause 10).
firstPDCCH-MonitoringOccasionOfPO
Points out the first PDCCH monitoring occasion for paging of each PO of the PF, see TS 38.304 [20].
nrofPDCCHMonitoringOccasionPerSSB-InPO
The number of PDCCH monitoring occasions corresponding to an SSB for paging, see TS 38.304 [20], clause 7.1.

---

If the paging search space is configured to have a search space ID of 0, there may be one paging occasion within the paging frame when Ns=1, there may be two paging occasions within the paging frame when Ns=2, a first paging occasion (i_s=0) may exist in a first half frame within the paging frame, and a second paging occasion ((i_s=1) may exist in a second half frame within the paging frame. The search space having the search space ID of 0 may correspond to a search space configured from a master information block (MIB).

If the paging search space is configured to have a search space ID of 0, the UE may monitor a $(i\_s+1)^{th}$ paging occasion. One paging occasion may include a set of "S*X" successive PDCCH monitoring occasions, where "S" may correspond to the number of actually transmitted SS/PBCH blocks, and the corresponding information is a specific parameter (for example, ssb-PositionsInBurst) value of the system information block (SIB) and may be transmitted from the gNB to the UE. Further, "X" may correspond to the number of PDCCH monitoring occasions per SS/PBCH block within the paging occasion configured in the UE by the BS (for example, a higher-layer signaling parameter 7 Paging 7.1 Discontinuous Reception for Paging The UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g. subframe or OFDM symbol) where paging DCI can be sent (TS 38.213 [4]). One Paging Frame (PF) is one Radio Frame and may contain one or multiple PO(s) or starting point of a PO.

In multi-beam operations, the UE assumes that the same paging message and the same Short Message are repeated in all transmitted beams and thus the selection of the beam(s) for the reception of the paging message and Short Message is up to UE implementation. The paging message is same for both RAN initiated paging and CN initiated paging.

The UE initiates RRC Connection Resume procedure upon receiving RAN initiated paging. If the UE receives a CN initiated paging in RRC_INACTIVE state, the UE moves to RRC_IDLE and informs NAS.

The PF and PO for paging are determined by the following formulae:

SFN for the PF is determined by:
(SFN+PF_offset) mod T=(T div N)*(UE_ID mod N)
Index (i_s), indicating the index of the PO is determined by:
i_s=floor (UE_ID/N) mod Ns The PDCCH monitoring occasions for paging are determined according to pagingSearchSpace as specified in TS 38.213 [4] and firstPDCCH-MonitoringOccasionOfPO and nrofPDCCH-MonitoringOccasionPerSSB-InPO if configured as specified in TS 38.331 [3]. When SearchSpaceId=0 is configured for pagingSearchSpace, the PDCCH monitoring occasions for paging are same as for RMSI as defined in clause 13 in TS 38.213 [4].

When SearchSpaceId=0 is configured for paging-SearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF. When SearchSpaceId other than 0 is configured for paging-SearchSpace, the UE monitors the $(i\_s+1)^{th}$ PO. A PO is a set of 'S*X' consecutive PDCCH monitoring occasions where 'S' is the number of actual transmitted SSBs determined according to ssb-PositionsInBurst in SIB1 and X is the nrofPDCCH-MonitoringOccasionPerSSB-InPO if configured or is equal to 1 otherwise. The $[x*S+K]^{th}$ PDCCH monitoring occasion for paging in the PO corresponds to the $k^{th}$ transmitted SSB, where x=0, 1, ... ,X−1, K=1, 2, ... ,S. The PDCCH monitoring occasions for paging which do not overlap with UL symbols (determined according to tdd-UL-DL-ConfigurationCommon) are sequentially numbered from zero starting from the first PDCCH monitoring occasion for paging in the PF.

When firstPDCCH-MonitoringOccasionOfPO is present, the starting PDCCH monitoring occasion number of (i_s+ 1)$^{th}$ PO is the $(i\_s+1)^{th}$ value of the firstPDCCH-MonitoringOccasionOfPO parameter; otherwise, it is equal to i_s*S*X. If X>1, when the UE detects a PDCCH transmission addressed to P-RNTI within its PO, the UE is not required to monitor the subsequent PDCCH monitoring occasions for this PO.

NOTE 1: A PO associated with a PF may start in the PF or after the PF.
NOTE 2: The PDCCH monitoring occasions for a PO can span multiple radio frames.
When SearchSpaceId other than 0 is configured for paging-SearchSpace the PDCCH monitoring occasions for a PO can span multiple periods of the paging search space.

The following parameters are used for the calculation of PF and i_s above:
T: DRX cycle of the UE (T is determined by the shortest of the UE specific DRX value(s), if configured by RRC and/or upper layers, and a default DRX value broadcast in system information. In RRC_IDLE state, if UE specific DRX is not configured by upper layers, the default value is applied).
N: number of total paging frames in T
Ns: number of paging occasions for a PF
PF_offset: offset used for PF determination
UE_ID: 5G-S-TMSI mod 1024

Parameters Ns, nAndPagingFrameOffset, nrofPDCCH-MonitoringOccasionPerSSB-InPO, and the length of default DRX Cycle are signaled in SIB1. The values of N and PF_offset are derived from the parameter nAndPagingFrameOffset as defined in TS 38.331 [3]. The parameter first-PDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration.

If the UE has no 5G-S-TMSI, for instance when the UE has not yet registered onto the network, the UE shall use as default identity UE_ID=0 in the PF and i_s formulas above. 5G-S-TMSI is a 48 bit long bit string as defined in TS 23.501 [10]. 5G-S-TMSI shall in the formulae above be interpreted as a binary number where the left most bit represents the most significant bit.

The gNB may transmit a PDCCH for paging to the UE, and the corresponding PDCCH may include scheduling information for a PDSCH including a paging message. The paging message may include information on IDs of one or a plurality of UEs which the BS desires to wake up. More specifically, the following information may be included.

| Paging message |  |  |
|---|---|---|
| -- ASN1START |  |  |
| -- TAG-PAGING-START |  |  |
| Paging ::= | SEQUENCE { |  |
| pagingRecordList | PagingRecordList | OPTIONAL, |
| -- Need N |  |  |
| (paging record list) |  |  |
| LateNonCriticalExtension | OCTET STRING | OPTIONAL, |
| nonCriticalExtension | SEQUENCE{ } | OPTIONAL |
| } |  |  |
| PagingRecordList ::= | SEQUENCE (SIZE(1..maxNrofPageRec)) OF PagingRecord |  |
| PagingRecord ::= | SEQUENCE { |  |
| ue-Identity | PagingUE-Identity, |  |
| (ue identity(ID)) |  |  |
| accessType | ENUMERATED {non3GPP} | OPTIONAL, -- Need N |
| (access type) |  |  |
| ... |  |  |
| } |  |  |
| PagingUE-Identity ::= | CHOICE { |  |
| ng-5G-S-TMSI | NG-5G-S-TMSI, |  |
| fullI-RNTI | I-RNTI-Value, |  |
| ... |  |  |
| } |  |  |

After receiving the PDCCH for paging from the gNB, the UE may receive the PDSCH scheduled by the corresponding PDCCH. UEs having IDs which are the same as the UD_ID indicated by the paging message transmitted through the received PDSCH and then an operation procedure (for example, random access, RRC connection, and the like) may be performed.

Hereinafter, a method of configuring a TCI state for a PDCCH (or a PDCCH DMRS) in the 5G communication system is described in detail.

The gNB can configure and indicate a TCI state for a PDCCH (or a PDCCH DMRS) through appropriate signaling. The gNB can configure and indicate a TCI state for a PDCCH (or a PDCCH DMRS) through appropriate signaling on the basis of the above description. The TCI state is to inform of a Quasi Co-Location (QCL) relation between a PDCCH (or a PDCCH DMRS) and another RS or channel, and the QCL relation between a reference antenna port A (reference RS #A) and another purpose antenna port B (target RS #B) means that the UE is allowed to apply some or all of large-scale channel parameters estimated in the antenna port A to channel measurement from the antenna port B. The QCL is required to correlate different parameters according to 1) time tracking influenced by an average delay and a delay spread, 2) frequency tracking influenced by a Doppler shift and a Doppler spread, 3) radio resource management (RRM) influenced by an average gain, 4) Beam Management (BM) influenced by a spatial parameter, and the like. Accordingly, NR supports four types of QCL relations shown in Table 17 below.

TABLE 17

| QCL type | Large-scale characteristics |
|---|---|
| A | Doppler shift, Doppler spread, average delay, delay spread |
| B | Doppler shift, Doppler spread |
| C | Doppler shift, average delay Spatial Rx parameter |

The spatial RX parameter may refer to some or all of various parameters such as an angle of arrival (AoA), a power angular spectrum (PAS) of AoA, an angle of departure (AoD), a PAS of AoD, a transmit/receive channel correlation, transmit/receive beamforming, a spatial channel correlation, and the like.

The QCL relation can be configured in the UE through an RRC parameter TCI state and QCL information (QCL-Info) as shown in Table 18 below. Referring to Table 18 below, the gNB may configure one or more TCI states in the UE and inform the UE of a maximum of two QCL relations (qcl-Type 1 and qcl-Type 2) for an RS referring to an ID of the TCI state, that is, a target RS. At this time, each piece of QCL information (QCL-Info) included in each TCI state includes a serving cell index of a reference RS indicated by the corresponding QCL information, a BWP index, a type and an ID of a reference RX, and a QCL type shown in Table 17.

TABLE 18

```
TCI-State ::=                           SEQUENCE {
    tci-StateId                                        TCI-StateId,
    (corresponding TCI state ID)
    qcl-Type1                                          QCL-Info,
    (QCL information of the first reference RS of RS (target RS) referring to the corresponding
    TCI state ID)
    qcl-Type2                                          QCL-Info
                        OPTIONAL, -- Need R
    (QCL information of the second reference RS of the RS (target RS) referring to the
    corresponding TCI state ID)
    ...
}
QCL-Info ::=                            SEQUENCE {
    cell                                               ServCellIndex
                        OPTIONAL, -- Need R
    (The serving cell index of the reference RS indicated by the corresponding QCL information)
    bwp-Id                                             BWP-Id
                        OPTIONAL, -- Cond CSI-RS-Indicated
    (BWP index of reference RS indicated by the corresponding QCL information)
    referenceSignal                                    CHOICE {
        csi-rs                                         NZP-CSI-RS-
ResourceId,
        ssb                                            SSB-
Index
    (One of the CSI-RS ID or SSB ID indicated by the corresponding QCL information)
    },
    qcl-Type                                           ENUMERATED {typeA, typeB, typeC,
typeD},
    ...
}
```

Figure 13:
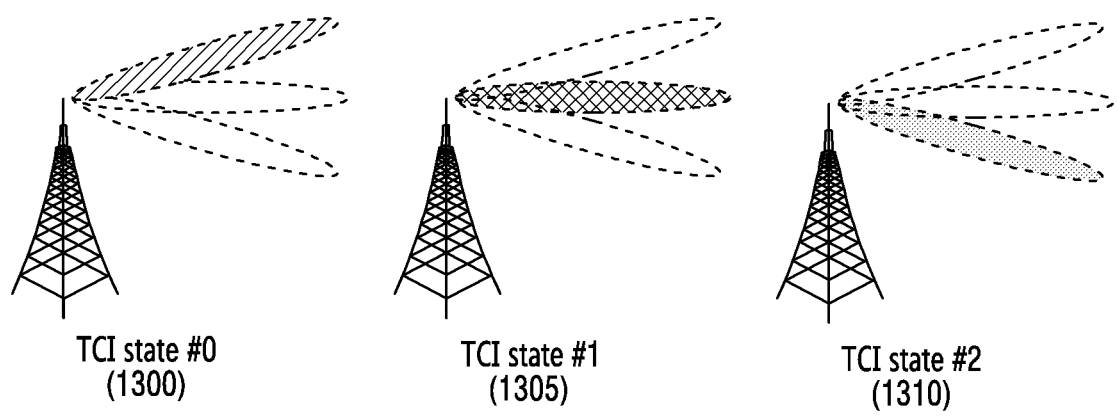
FIG. 13 illustrates BS beam allocation according to a TCI state configuration in a wireless communication system according to various embodiments of the disclosure.

FIG. 13 illustrates BS beam allocation according to a TCI state configuration in a wireless communication system according to various embodiments of the disclosure.

Specifically, FIG. 13 illustrates an example of BS beam allocation according to the TCI state configuration. Referring to FIG. 13, the BS may transmit information on N different beams to the UE through N different TCI states. For example, when N=3 as illustrated in FIG. 9, the BS may notify that a qcl-Type 2 parameter included in three TCI states 900, 905, and 910 is associated with a CSI-RS or SSB corresponding to different beams to be configured as QCL type D and antenna ports referring to the different TCI states 900, 905, and 910 are associated with different spatial RX parameters, that is, different beams. Specifically, combinations of TCI states which can be applied to PDCCH DMRS antenna ports are as shown in Table 19 below. In Table 19, a fourth row is a combination assumed by the UE before the RRC configuration, and configurations after RRC are impossible.

TABLE 19

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 14:
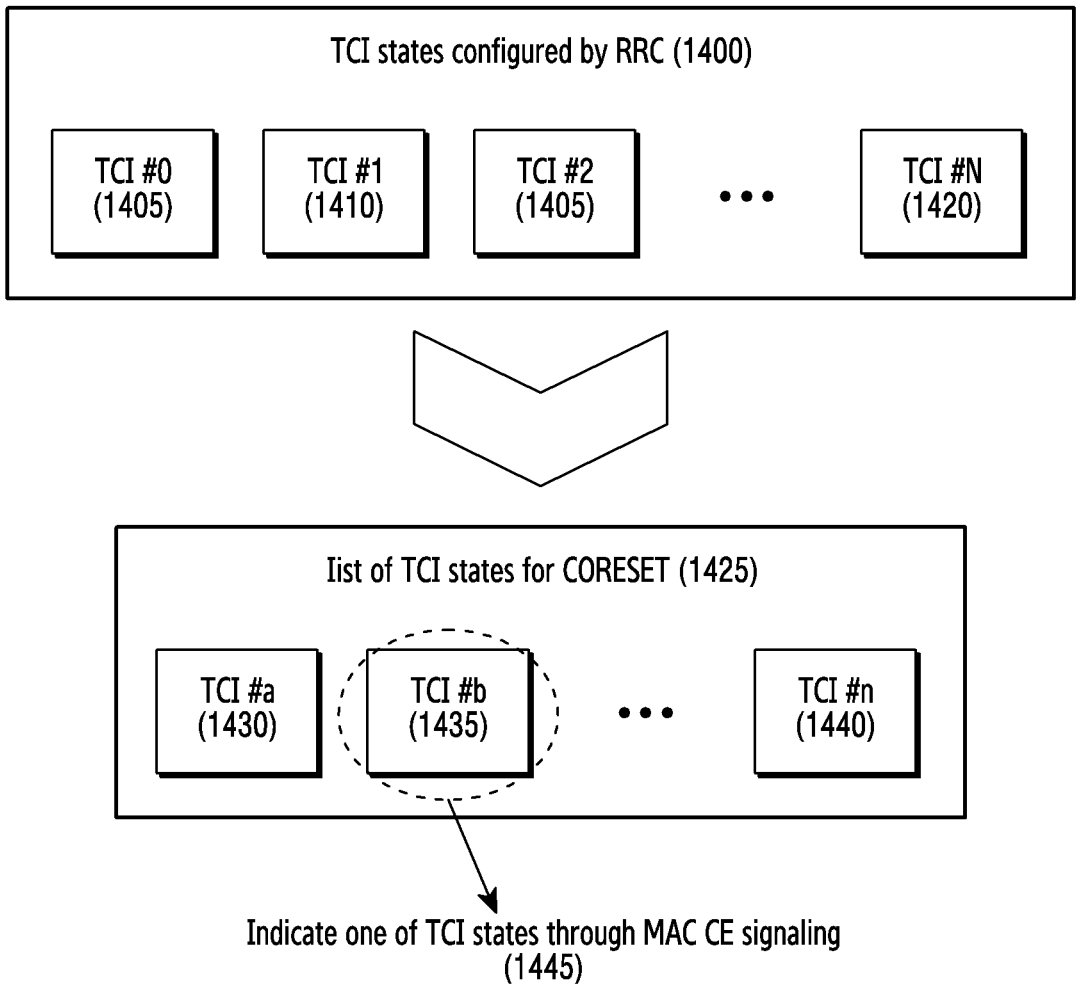
FIG. 14 illustrates a process of hierarchical signaling in a wireless communication system according to various embodiments of the disclosure.

FIG. 14 illustrates a process of hierarchical signaling in a wireless communication system according to various embodiments of the disclosure.

NR supports the hierarchical signaling method as illustrated in FIG. 8 for dynamical allocation of PDCCH beams. Referring to FIG. 10, the BS may configure N TCI states 1000, 1005, . . . , 1020 in the UE through RRC signaling 1000 and configure some thereof to be in the TCI state for the CORESET as indicated by reference numeral 1025. Thereafter, the BS may indicate one of the TCI states 1030, 1035, and 1040 for the CORESET to the UE through MAC CE signaling as indicated by reference numeral 1045. Thereafter, the UE receives a PDCCH on the basis of beam information included in the TCI state indicated by the MAC CE signaling.

Figure 15:
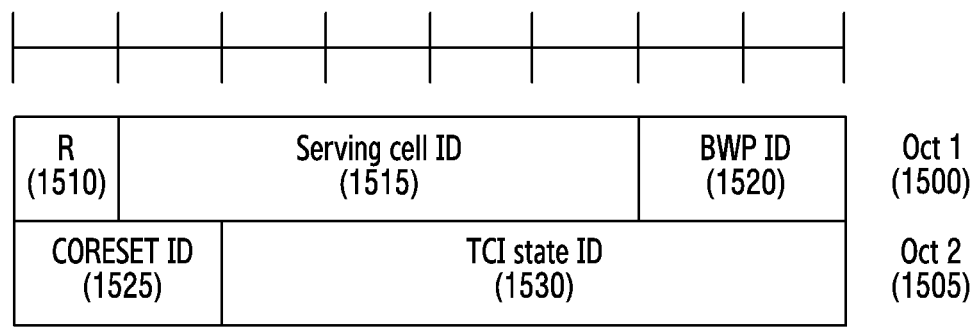
FIG. 15 illustrates an example of the structure of signaling in a wireless communication system according to various embodiments of the disclosure.

FIG. 15 illustrates an example of the structure of signaling in a wireless communication system according to various embodiments of the disclosure.

Specifically, FIG. 15 illustrates the structure of TCI indication MAC CE signaling for a PDCCH DMRS. Referring to FIG. 11, the TCI indication MAC CE signaling for the PDCCH DMRS is configured by 2 bytes (16 bits), and includes a reserved bit 1510 of 1 bit, a serving cell ID 1515 of 5 bits, a BWP ID 1520 of 2 bits, a CORESET ID 1525 of 2 bits, and a TCI state ID 1530 of 6 bits.

The BS may configure one or a plurality of TCI states for a specific CORESET in the UE and activate one of the configured TCI states through a MAC CE activation command. For example, {TCI state #0, TCI state #1, TCI state #2} may be configured as the TCI state in CORESET #1, and the BS may transmit a command activating the TCI state for CORESET #1 assumed as TCI state #0 to the UE through the MAC CE. The UE may correctly receive a DMRS of the corresponding CORESET on the basis of QCL information within the activated TCI state by means of the activation command for the TCI state received through the MAC CE.

If the UE does not receive a configuration of the TCI state indicating QCL information for a DMRS antenna port for receiving a PDCCH of a CORESET (or a CORESET having a CORESET ID (or index) of 0 or CORESET #0) configured through the MIB, the UE may assume that the following physical layer channel is QCLed in an aspect of features such as an average gain, QCL-TypeA, or QCL-TypeD.

A DMRS (or DMRS antenna port) associated with the PDCCH received through the CORESET (or the CORESET having the CORESET ID of 0 or CORSEET #0) configured through the MIB
    A DMRS antenna port associated with reception of a PDSCH (PDSCH scheduled by the PDCCH transmitted through CORESET #0) corresponding thereto
    An SS/PBCH block (or SS/PBCH block associated with CORESET #0 or SS/PBCH block transmitting the MIB configuring corresponding CORESET #0) corresponding thereto The following description corresponds to a part of the TS 38.213 standard related to the above description.

The UE may assume that the DM-RS antenna port associated with PDCCH receptions in the CORESET configured by pdcch-ConfigSIB1 in MIB, the DM-RS antenna port associated with corresponding PDSCH receptions, and the corresponding SS/PBCH block are quasi co-located with respect to average gain, QCL-TypeA, and QCL-TypeD properties, when applicable [6, TS 38.214], if the UE is not provided a TCI state indicating quasi co-location information of the DM-RS antenna port for PDCCH reception in the CORESET. The value for the DM-RS scrambling sequence initialization is the cell ID. A SCS is provided by subCarrierSpacingCommon in MIB.

If the UE receives a configuration of a search space having a search space ID of 0 for a common search space set for monitoring an SI-RNTI/P-RNTI (or when a common search space set for monitoring an SI-RNTI/P-RNTI is a search space set configured through the MIB or is search space #0), the UE may monitor a PDCCH in a monitoring occasion associated with an SS/PBCH block A in which case SS/PBCH block A may be determined as described below.

The UE may receive a command activating a specific TCI state for CORESET #0 through the MAC CE and, at this time, the corresponding TCI state may include a CSI-RS related to a predetermined SS/PBCH. An SS/PBCH related to a CSI-RS of a TCI state activated through the MAC CE which the UE most recently received may correspond to the SS/PBCH block A.

When performing random access, the UE may transmit a preamble (or a physical random access channel (PRACH)) related to a specific SS/PBCH to the BS. An SS/PBCH identified through a random access procedure which the UE most recently performed may correspond to the SS/PBCH block A.

The following description corresponds to a part of the TS 38.213 standard related to the above description.

If a UE is provided a zero value for searchSpaceID in PDCCH-ConfigCommon for a Type0/0A/2-PDCCH CSS set, the UE determines monitoring occasions for PDCCH candidates of the Type0/0A/2-PDCCH CSS set as described in Clause 13, and the UE is provided a C-RNTI, the UE monitors PDCCH candidates only at monitoring occasions associated with a SS/PBCH block, where the SS/PBCH block is determined by the most recent of
    a MAC CE activation command indicating a TCI state of the active BWP that includes a CORESET with index 0, as described in [6, TS 38.214], where the TCI-state includes a CSI-RS which is quasi-co-located with the SS/PBCH block, or a random access procedure that is not initiated by a PDCCH order that triggers a contention-free random access procedure For a CORESET (CORESET #X) configured to have an index that is a value other than 0, If the UE does not receive a configuration of the TCI state for CORESET #X or the UE receives the configuration of one or more TCI states but does not receive a MAC CE activation command for activating one thereof, the UE may assume that a DMRS transmitted in CORESET #X is QCLed with an SS/PBCH block identified in an initial access process.

If the UE receives the configuration for one or more TCI states as a part of the handover procedure (or a part of the reconfiguration with sync procedure) but does not receive a MAC CE activation command for activating one thereof, the UE may assume that a DMRS transmitted in CORESET #X is QCLed with an SS/PBCH or CSI-RS resources identified during a random access procedure initiated by the handover procedure (or reconfiguration with synch procedure).

The following description corresponds to a part of the TS 38.213 standard related to the above description.

For a CORESET other than a CORESET with index 0, if a UE has not been provided a configuration of TCI state(s) by tci-StatesPDCCH-ToAddList and tci-StatesPDCCH-ToReleaseList for the CORESET, or has been provided initial configuration of more than one TCI states for the CORESET by tci-StatesPDCCH-ToAddList and tci-StatesPDCCH-ToReleaseList but has not received a MAC CE activation command for one of the TCI states as described in [11, TS 38.321], the UE assumes that the DM-RS antenna port associated with PDCCH receptions is quasi co-located with the SS/PBCH block the UE identified during the initial access procedure;

if a UE has been provided a configuration of more than one TCI states by tei-StatesPDCCH-ToAddList and tci-StatesPDCCH-ToReleaseList for the CORESET as part of Reconfiguration with sync procedure as described in [12, TS 38.331] but has not received a MAC CE activation command for one of the TCI states as described in [11, TS 38.321], the UE assumes that the DM-RS antenna port associated with PDCCH receptions is quasi co-located with the SS/PBCH block or the CSI-RS resource the UE identified during the random access procedure initiated by the Reconfiguration with sync procedure as described in [12, TS 38.331].

For CORESET having an index of 0 (CORESET #0), the UE may assume that a DMRS antenna port of a PDCCH received through CORESET #0 is QCLed with the following physical resources.

A downlink reference signal included in the TCI state activated by the MAC CE activation command or An SS/PBCH block identified by the UE through the most recent random access procedure (random access that is not non-contention-based random access triggered by a PDCCH order) if the UE does not receive the MAC CE activation command for the TCI state The following description corresponds to a part of the TS 38.213 standard related to the above description.

For a CORESET with index 0, the UE assumes that a DM-RS antenna port for PDCCH receptions in the CORESET is quasi co-located with the one or more DL RS configured by a TCI state, where the TCI state is indicated by a MAC CE activation command for the CORESET, if any, or a SS/PBCH block the UE identified during a most recent random access procedure not initiated by a PDCCH order that triggers a contention-free random access procedure, if no MAC CE activation command indicating a TCI state for the CORESET is received after the most recent random access procedure.

Hereinafter, higher-layer signaling may be signaling corresponding to at least one of the following signalings or a combination of one or more thereof.

MIB (Master Information Block)
SIB (System Information Block) or SIB X (X=1, 2, . . . )
RRC (Radio Resource Control)
MAC (Medium Access Control) CE (Control Element)
UE Capability Reporting
UE assistance information or message L1 signaling may be signaling corresponding to at least one of the following physical layer channels or signaling methods or a combination of one or more thereof.

PDCCH (Physical Downlink Control Channel)
DCI (Downlink Control Information)
UE-specific DCI
Group common DCI
Common DCI
Scheduling DCI (for example, DCI used for scheduling downlink or uplink data)
Non-scheduling DCI (for example, DCI other than DCI used for scheduling downlink or uplink data)
PUCCH (Physical Uplink Control Channel)
UCI (Uplink Control Information)

Hereinafter, definition of each mathematical operator is described below.

floor(X): function outputting largest number among integers smaller than X ceil(X): function outputting smallest number among integers larger than X A mod B: function outputting remainder obtained by dividing A by B (modulo operator)

Hereinafter, the terms of paging, a PDCCH, a PDCCH for paging, a PDCCH corresponding to paging, a PDCCH scrambled by a P-RNTI, and a PDCCH configured as a P-RNTI may be all used as the same meaning.

Hereinafter, the terms of paging, a PDSCH, a PDCSH for paging, a PDSCH corresponding to paging, a PDSCH scrambled by a P-RNTI, and a PDSCH configured as a P-RNTI may be all used as the same meaning.

As described above, in the wireless communication system, the BS may transmit paging in order to wake up the UE. The BS may transmit a PDCCH and a PDSCH for paging to the UE. The UE may receive configuration information for monitoring the PDCCH for paging from the BS and determine a paging frame and a paging occasion on the basis of the corresponding configuration information. At this time, one or a plurality of UEs or a UE group including a plurality of UEs may monitor a PDCCH for paging in the same paging occasion. The BS may transmit a PDCCH for paging in order to wake up a specific UE(s) in a predetermined UE group, and at this time, all UEs in the UE group monitoring the paging occasion in which the corresponding PDCCH is transmitted may wake up. UEs receiving the paging PDCCH may receive a PDSCH for scheduling the corresponding PDCCH. The UE may acquire UE ID information through a paging message transmitted through the PDSCH and perform an RRC connection procedure after UEs having the same ID as the indicated UE ID wake up.

In the paging operation, as a UE group including a plurality of UEs monitors the PDCCH in the same paging occasion, a UE which the BS does not intend to wake up may actually wake up. For example, when there are UE #1 and UE #2 in a specific UE group monitoring the PDCCH in the same paging occasion and the BS transmits the paging PDCCH in order to wake up UE #1, all UEs in the corresponding UE group, that is, not only UE #1 but also UE #2 may receive the corresponding PDCCH and, accordingly, subsequently perform an even decoding operation for the PDSCH scheduled by the corresponding PDCCH. UE ID information of UE #1 which the BS desired to wake up may exist in the paging message of the corresponding PDSCH, and accordingly, UE #1 may perform the following operation (for example, RRC connection procedure) after receiving the paging message. UE #2 may identify that there is no its own UE ID in the paging message and, accordingly, maintain the basic operation for monitoring paging again. Accordingly, UE #2 wakes up due to untended reception of the paging PDCCH and thus consumes unnecessary power.

Various embodiments of the disclosure propose methods of removing inefficient problems of the UE group-based paging method. In order to reduce the number of UEs unnecessarily waking up due to paging transmission, it is required to minimize the number of UEs existing in the UE group monitoring the same paging occasion. As the number of UEs existing in a specific UE group is smaller, a probability of unnecessary waking up UEs may be reduced, and accordingly, power consumption of the UE may be reduced. An embodiment of the disclosure proposes a method of reducing the number of UEs per UE group by further subdividing and separating the paging occasion in time and frequency axes.

The UE receiving the paging PDCCH may determine whether to wake up or not on the basis of a UE ID included in the paging message transmitted through the PDSCH scheduled by the corresponding PDCCH. Accordingly, since the UE receiving the unintended paging PDCCH can determine that the UE does not need to wake up after decoding the PDSCH, unnecessary power consumption is generated by the PDSCH decoding. In order to solve the problem, the disclosure proposes a method of indicating whether the UE decodes the PDSCH through a DCI format transmitted by the paging PDCCH.

<First Embodiment>—Time-Axis Grouping Method

The first embodiment of the disclosure proposes a method of more precisely grouping UE groups for paging than in the time axis.

Figure 16:
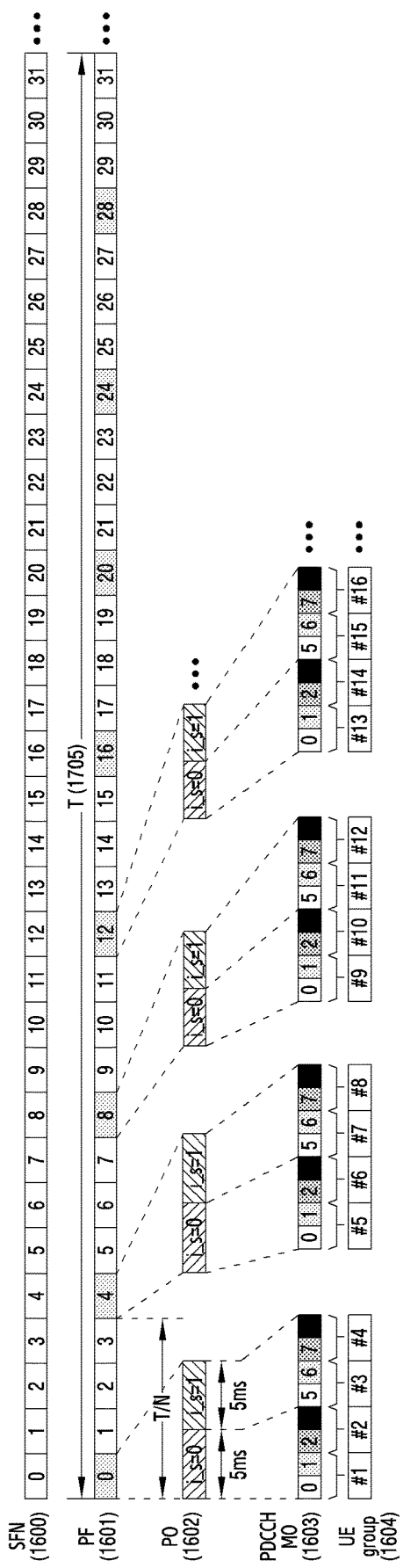
FIG. 16 illustrates a process of paging in a wireless communication system according to various embodiments of the disclosure.

FIG. 16 illustrates a process of paging in a wireless communication system according to various embodiments of the disclosure.

Specifically, FIG. 16 illustrates an example of a paging method according to the first embodiment of the disclosure. Referring to FIG. 16, the UE may receive a configuration of a DRX cycle T 1605 for paging from the BS, and one or a plurality of paging frames (PFs) 1601 may exist in the cycle T. Further, in a predetermined paging frame 1601, one or a plurality of paging occasions 1202 may exist. A predetermined paging occasion 1602 may include one or a plurality of PDCCH monitoring occasions (PDCCH MOs) 1603. A predetermined UE may determine the paging frame 1601 and the paging occasion 1602 within the cycle T 1605 for monitoring the PDCCH for paging (for example, a PDCCH configured or scrambled by a P-RNTI) on the basis of a UE ID (UE_ID) value. For example, the paging frame and the paging occasion may be determined on the basis of Equation 7 and Equation 8 below.

[Paging Frame Determination Method]

$$(SFN+PF\_\text{offset}) \bmod T = (T \text{ div } N)*(UE\_ID \bmod N) \quad \text{Equation (7)}$$

[Paging occasion index (i_s) determination method]

$$i\_s = \text{floor}(UE\_ID/N) \bmod Ns \quad \text{Equation (8)}$$

A UE group monitoring a specific paging occasion U within a specific paging frame X may be determined on the basis of Equation 7 and Equation 8 above. More specifically, when there are UEs having M different UE_IDs, each UE may determine one paging frame among N paging frames 1601 within the cycle T 1601 on the basis of the UE_ID configured in the UE itself (see Equation 7). Through such a process, M UEs are uniformly distributed to the N paging frames. That is, within one paging frame, a UE group approximately including M'=M/N UEs is allocated. UEs within a UE group of a specific paging frame X may determine one paging occasion among Ns paging occasions 1602 existing in the corresponding paging frame X on the basis of the UE_ID again (see Equation 8). Through the process, one paging occasion 1602 may be allocated again to a UE group including M"=M'/Ns=M/N/Ns UEs. As a result, when N paging frames 1601 exist within the cycle T 1601 and Ns paging occasions 1602 exist within each paging frame, all of the M UEs may be uniformly distributed to N*Ns paging occasions, and accordingly, the number of UEs within the UE group monitoring the specific paging occasion may approximately be M"=M/N/Ns.

In an embodiment of the disclosure, in order to more subdivide the UE group, a UE grouping method based on one or a plurality of PDCCH MOs 1603 existing within the paging occasion may be additionally considered. Referring to FIG. 16, one or a plurality of PDCCH monitoring occasions 1603 may exist within one paging occasion 1602. For example, one paging occasion may include a set of 'S*X' successive PDCCH monitoring occasions 1603, and S and X may correspond to values configured or selected by the BS or values implicitly determined by other system parameters. For example, 'S' may correspond to the number of actually transmitted SS/PBCH blocks, and the corresponding information may be transmitted from the BS to the UE as a specific parameter (for example, ssb-PositionsInBurst) value of a system information block (SIB). 'X' may correspond to the number of PDCCH monitoring occasions per SS/PBCH block within the paging occasion configured in the UE by the BS (for example, a higher-layer signaling parameter nrofPDCCH-MontiroingOccasionPerSSB-InPO), and if there is no corresponding configuration information, the UE may assume that X=1. In the paging occasions, a $[x*S+K]^{th}$ (x=0, 1, 2, ..., X-1, and K=1, 2, 3, ..., S) PDCCH monitoring occasion may correspond to a $K^{th}$ transmission SS/PBCH block.

In an embodiment of the disclosure, the UE may additionally determine a PDCCH monitoring occasion within the paging occasion 1602 to monitor the paging PDCCH on the basis of a UE identifier (for example, UE_ID) value. That is, the UE may determine a specific PDCCH monitoring occasion Z within a specific paging occasion Y in a specific paging frame X for the paging PDCCH on the basis of the UE identifier (for example, UE_ID) value. For example, when there are UEs having M different UE_IDs, each UE may determine one paging frame among N paging frames 1601 within the cycle T 1601 on the basis of the UE_ID configured in the UE itself (see Equation 7). Through the process, the M UEs are uniformly distributed in the N paging frames. That is, within one paging frame, a UE group approximately including M'=M/N UEs is allocated. UEs within a UE group of a specific paging frame X may determine one paging occasion among Ns paging occasions existing in the corresponding paging frame X on the basis of the UE_ID again (see Equation 8). Through the process, one paging occasion 1602 may be allocated again to a UE group including M"=M'/Ns=M/N/Ns UEs. UEs within the UE group of the specific paging occasion Y of the specific paging frame X may determine one or a plurality of PDCCH monitoring occasions among Np PDCCH monitoring occasions existing in the corresponding paging occasion Y on the basis of the UE_ID again. Referring to FIG. 16, a predetermined paging occasion 1602 may include Np=4 PDCCH monitoring occasions, and when there are UE A and UE B determining paging frame #0 1601 and paging occasion #0 1602 (i_s=0), the corresponding UEs may additionally determine one or a plurality of PDCCH monitoring occasions to monitor the actual paging PDCCH among a total of Np=4 PDCCH monitoring occasions. For example, UE A may determine PDCCH monitoring occasions #0 and #1 1603, and accordingly, it may be considered that UE A belongs to UE group #1 1604. Similarly, UE B may determine PDCCH monitoring occasions #2 and #3 1603, and accordingly, it may be equally considered that UE B belongs to UE group #2 1604. Therefore, =M'/Ns=M/N/Ns UEs allocated to one paging occasion 1602 may be subdivided again on the basis of the number Np of PDCCH monitoring occasions 1603 within the corresponding paging occasion 1602. For example, when there are Nt=Np/Nq 'PDCCH monitoring occasion groups' including Nq PDCCH monitoring occasions among the Np PDCCH monitoring occasions 1603, each PDCCH monitoring occasion group may be allocated to a UE group including a total of M'''=M''/Nt=M/N/Ns/Nt UEs.

In an embodiment of the disclosure, the BS may determine a paging frame, a paging occasion, and a PDCCH monitoring occasions to transmit the paging PDCCH of a predetermined UE having a specific UE identifier on the basis of a UE identifier (for example, UE_ID) value and transmit the paging PDCCH at the corresponding time point.

In some embodiments of the disclosure, as methods by which the UE determines a PDCCH monitoring occasions to monitor the paging PDCCH, the following methods may be considered.

[Method 1]

The UE may determine a specific PDCCH monitoring occasion index on the basis of a UE identifier (UE_ID) among one or a plurality of PDCCH monitoring occasions existing in the specific paging occasion. For example, Equation 9 below may be considered for a method of determining a corresponding PDCCH monitoring index i_p.

$$i\_p = \text{floor}(UE\_ID/N/Ns) \bmod Np \qquad \text{Equation (9)}$$

In Equation 9, Np may be defined as the number of PDCCH monitoring occasions within one paging occasion. For example, Np=S*X (see the above detailed description of S and X for the definition of S and X). In this case, the UE may perform monitoring in one PDCCH monitoring occasion among the Np PDCCH monitoring occasions within the paging occasion. The UE may monitor a PDCCH monitoring occasion corresponding to an index i_p (that is, an $i\_p^{th}$ PDCCH monitoring occasion) among the Np PDCCH monitoring occasions existing within a paging occasion index i_s (that is, an $i\_s^{th}$ paging occasion). That BS may transmit the paging PDCCH to the corresponding UE through the PDCCH monitoring occasion index i_p within the paging occasion index i_s.

[Method 2]

The UE may determine a specific PDCCH monitoring occasion group index on the basis of the UE identifier (UE_ID) among one or a plurality of PDCCH monitoring occasions existing in a specific paging occasion, and the PDCCH monitoring occasion group may include a set of one or a plurality of PDCCH monitoring occasions. For example, the following equation may be considered for a method of determining the corresponding PDCCH monitoring occasion group index i_g.

$$i\_g = \text{floor}(UE\_ID/N/Ns) \bmod Ng \qquad \text{Equation (10)}$$

In Equation 9, Ng may be defined as the number of all PDCCH monitoring occasion groups within one paging occasion, and Nq PDCCH monitoring occasions may exist in one PDCCH monitoring occasion group. For example, Ng=S, Nq=X (see the above detailed description of S and X for the definition of S and X). In this case, an $ng^{th}$ PDCCH monitoring group may be associated with an actually transmitted $s^{th}$ SS/PBCH block and may include X PDCCH monitoring occasions associated with the corresponding $s^{th}$ SS/PBCH block. That is, the UE may monitor the paging PDCCH in one or a plurality of PDCCH monitoring occasions within a PDCCH monitoring occasion group associated with a specific SS/PBCH in a specific paging occasion. Alternatively, values of Ng and Nq may be explicitly configured in the UE by the BS through higher-layer signaling. The UE may monitor Nq PDCCH monitoring occasions existing in a specific PDCCH monitoring occasion among a total of Nq PDCCH monitoring occasions in the paging occasion. That is, the UE may monitor Nq PDCCH monitoring occasions within index i_g (that is, an $i\_g^{th}$ PDCCH monitoring occasion group) existing in paging occasion index i_s (that is, an $i\_s^{th}$ paging occasion). The BS may transmit the paging PDCCH to the corresponding UE through Nq PDCCH monitoring occasions within PDCCH monitoring group index i_g in the paging occasion index i_s.

[Method 3]

The UE may determine one or a plurality of PDCCH monitoring occasion group index on the basis of the UE identifier (UE_ID) among one or a plurality of PDCCH monitoring occasions existing in a specific paging occasion, and the PDCCH monitoring occasion group may include a set of one or a plurality of PDCCH monitoring occasions. For example, the following equation may be considered for a method of determining the corresponding PDCCH monitoring occasion group index i_g.

$$i\_g = \text{floor}(UE\_ID/N/Ns) \bmod Ng \qquad \text{Equation 11}$$

In Equation 11, Ng may be defined as the number of all PDCCH monitoring occasion groups within one paging occasion, and Nq PDCCH monitoring occasions may exist in one PDCCH monitoring occasion group. For example, Ng=S/M, Nq=M*X (M being an integer ≥1) (see the above detailed description of S and X for the definition of S and X). That is, each PDCCH monitoring occasion may include PDCCH monitoring occasions associated with M SS/PBCHs. More specifically, when there are S*X PDCCH monitoring occasions in a specific paging occasion, PDCCH monitoring occasions associated with M SS/PBCH blocks may be considered as one PDCCH monitoring occasion group. For example, in the case of S=4 and X=4, a $[x*S+K]^{th}$ (x=0, 1, 2, 3 and K=1, 2, 3, 4) PDCCH monitoring occasion of S*X=4 PDCCH monitoring occasions may correspond to a $K^{th}$ transmission SS/PBCH block. At this time, in the case of M=2, PDCCH monitoring occasions corresponding to two SS/PBCH blocks may be considered as one PDCCH monitoring group. That is, in the case of S=4 and M=2, a total of Ng=S/M=2 PDCCH monitoring occasion groups may exist, $[x*S+K]^{th}$ (x=0, 1, 2, 3 and K=1, 2) PDCCH monitoring occasions which are PDCCH monitoring occasions corresponding to $K^{th}$ (K=1, 2) SS/PBCH blocks may be included in a first PDCCH monitoring group, and [x*S+K] th (x=0, 1, 2, 3 and K=3, 4) PDCCH monitoring occasions which are PDCCH monitoring occasions corresponding to $K^{th}$ (K=3, 4) SS/PBCH blocks may be included in a second PDCCH monitoring group. Accordingly, an $ng^{th}$ (ng=1, 2, 3, ..., Ng) PDCCH monitoring occasion group may include $[x*S+K]^{th}$ (x=0, 1, 2, ..., X and K=1, 2, ..., M*(ng−1)+m(m=1, 2, ..., M)) PDCCH monitoring occasions associated with M*(ng−1)+m (m=1, 2, ..., M)$^{th}$ SS/PBCH blocks. That is, the UE may monitor the paging PDCCH through PDCCH monitoring occasions associated with one or a plurality of SS/PBCHs within a specific paging occasion. Alternatively, values of Ng and Nq may be explicitly configured in the UE by the BS through higher-layer signaling. The UE may monitor Nq PDCCH monitoring occasions existing in a specific PDCCH monitoring occasion group among a total of Np PDCCH monitoring occasions in the paging occasion. That is, the UE may monitor Nq PDCCH monitoring occasions within index i_g (that is, an i_g$^{th}$ PDCCH monitoring occasion group) existing in paging occasion index i_s (that is, an i_s$^{th}$ paging occasion). The BS may transmit the paging PDCCH to the corresponding UE through Nq PDCCH monitoring occasions within PDCCH monitoring group index i_g in the paging occasion index i_s.

In an embodiment of the disclosure, the UE may monitor the PDCCH for paging in one or a plurality of PDCCH monitoring occasions Z of X paging occasions of a paging frame X in every cycle T corresponding to a DRX cycle for paging. At this time, the UE may change the PDCCH monitoring occasions in every cycle T. For example, the UE may monitor indexes $Z_1, Z_2, \ldots, Z_M$ of PDCCH monitoring occasions of the paging occasion index Y of the paging frame index X in a first cycle and monitor indexes $V_1, V_2, \ldots, V_M$ of PDCCH monitoring occasions of the paging occasion index Y of the paging frame index X in the next cycle. That is, the UE may change PDCCH monitoring occasions to monitor the paging PDCCH in every cycle T. For example, the UE may shift by M and monitor PDCCH monitoring occasion indexes in every cycle T, and M may be associated with the number S of SS/PBCHs or the number X of PDCCH monitoring occasions associated with a specific SS/PBCH. In a detailed example, S=4 and X=4, and the UE may monitor PDCCH monitoring occasions associated with a first SS/PBCH block and a second SS/PBCH block in the paging occasion Y of the paging frame X in the first cycle, that is, PDCCH monitoring occasions corresponding to [x*S+K] (x=0, 1, 2, 3 and K=1, 2). Further, the corresponding UE may monitor PDCCH monitoring occasions associated with a third SS/PBCH block and a fourth SS/PBCH block in the paging occasion Y of the paging frame X in the second cycle, that is, PDCCH monitoring occasions corresponding to [x*S+K] (x=0, 1, 2, 3 and K=3, 4). It is possible to provide occasions allowing the corresponding UE to receive the paging PDCCH transmitted through all SS/PBCHs by changing PDCCH monitoring occasions through which the paging PDCCH of the specific UE can be transmitted in every cycle T. Accordingly, the BS may effectively transmit a paging message to the UE located in a random position within TA by using a transmission beam corresponding to the SS/PBCH.

Second Embodiment

The second embodiment of the disclosure proposes a method of more precisely grouping UE groups for paging in a frequency axis.

Figure 17:
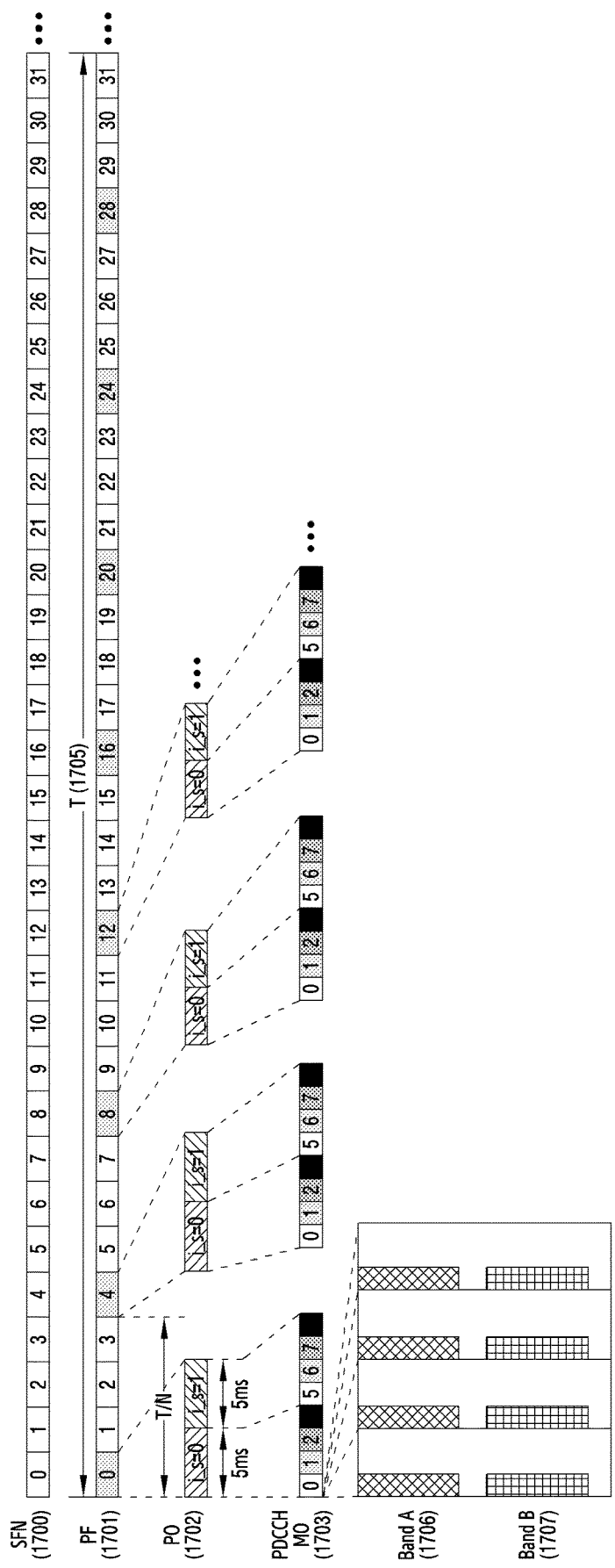
FIG. 17 illustrates a process of paging in a wireless communication system according to various embodiments of the disclosure.

FIG. 17 illustrates a process of paging in a wireless communication system according to various embodiments of the disclosure. Specifically, FIG. 17 illustrates an example of a paging method according to the second embodiment of the disclosure.

Referring to FIG. 17, the UE may receive a configuration of a DRX cycle T 1705 for paging from the BS, and one or a plurality of paging frames (PFs) 1701 may exist in the cycle T. One or a plurality of paging occasions (POs) 1702 may exist in a predetermined paging frame 1701. A predetermined paging occasion 1702 may include one or a plurality of PDCCH monitoring occasions (PDCCH MOS) 1703. A predetermined UE may determine a paging frame (PF) 1705 and a paging occasion (PO) 1702 within the cycle T 1705 for monitoring the PDCCH for paging (for example, a PDCCH configured or scrambled by a P-RNTI) on the basis of a UE ID (UE_ID) value. For example, the paging frame, the paging occasion, and the PDCCH monitoring occasion for monitoring the paging PDCCH by the UE may be determined on the basis of various methods considered in Equation 7, Equation 8, and the first embodiment.

The second embodiment of the disclosure may consider the frequency domain in which the UE additionally monitors the paging PDCCH. That is, one or a plurality of frequency axis resource areas for monitoring the paging PDCCH may exist, and the UE may monitor the paging PDCCH in a specific frequency axis resource area among the plurality of frequency axis resource areas. Referring to FIG. 17, the UE may monitor the paging PDCCH in the time axis at a time point corresponding to the paging frame X, the paging occasion Y, and the PDCCH monitoring occasion Z, and monitor the paging PDCCH in a specific frequency axis area among specific band A 1706 or band B 1707 in the frequency axis. At this time, which frequency axis resource is used to monitor the paging PDCCH by the UE among the plurality of frequency axis resource areas may be determined on the basis of the UE ID for paging configured in the UE. For example, the frequency axis resource index i_B for monitoring the paging PDCCH by the UE may be determined on the basis of Equation 12 below.

$$i\_B = \text{floor}(UE\_ID/M) \bmod N_B \qquad \text{Equation 12}$$

In Equation 12, $N_B$ may be defined as the number of resource areas defined for paging monitoring in the frequency axis. M may be determined on the basis of time axis information for paging PDCCH monitoring, and may be determined as, for example, a combination of parameters such as the number N of paging frames within the DRX cycle T, the number Ns of paging occasions within the paging frame, and the number Np of PDCCH monitoring occasions within the paging frame occasion. For example, M=N*Ns or M=N*Ns*Np.

According to various embodiments of the disclosure, the BS may configure or provide frequency axis resource areas for monitoring the paging PDCCH to the UE through various methods. For example, the following methods may be considered.

[Method 1]

The BS may configure a plurality of control resource sets for monitoring the paging PDCCH in the UE, and the UE may monitor the paging PDCCH in a specific control resource set among the plurality of control resource sets. At this time, the UE may determine the control resource set to monitor the paging PDCCH on the basis of a UE ID value for paging configured in the UE. A control resource set index value i_B to monitor the paging PDCCH may be determined on the basis of Equation 13 below.

$$i\_B = \text{floor}(UE\_ID/M) \bmod N_B \qquad \text{Equation 13}$$

In Equation 13, $N_B$ may correspond to the number of a plurality of control resource sets configured in the UE by the BS for paging. $N_B$ may be explicitly configured in the UE by the BS or may be implicitly derived from another system parameter value (for example, the number of configured resource control sets). The BS may explicitly provide configuration information for a plurality of control resource sets for monitoring the paging PDCCH through higher-layer signaling (for example, MIB, SIB, or RRC) or implicitly provide information indicating that a control resource set which is the same as one preconfigured control resource set exists in a location moved by a specific offset value in the frequency axis (an offset value between two control resource sets may be provided to the UE by the BS through higher-layer signaling).

[Method 2]

The BS may configure a plurality of BWPs or initial BWPs for monitoring the paging PDCCH in the UE, and the UE may monitor the paging PDCCH in a specific BWP among the plurality of BWPs. At this time, the UE may determine the BWP to monitor the paging PDCCH on the basis of a UE ID value for paging configured in the UE. A BWP index value i_B to monitor the paging PDCCH may be determined on the basis of Equation 14 below.

$$i\_B = \text{floor}(UE\_ID/M) \bmod N_B \qquad \text{Equation 14}$$

In [Equation 14], $N_B$ may correspond to the number of a plurality of BWPs configured in the UE for paging by the BS. $N_B$ may be explicitly configured in the UE by the BS or may be implicitly derived from another system parameter value (for example, the number of configured BWPs or the number of initial BWPs).

[Method 3]

The BS may configure a plurality of partial areas within one control resource set for monitoring the paging PDCCH in the UE, and the UE may monitor the paging PDCCH through a specific partial area among the plurality of partial areas within a specific control resource set. At this time, the UE may determine the partial area within the corresponding control resource set to monitor the paging PDCCH on the basis of a UE ID value for paging configured in the UE. A partial area index value i_B within the control resource set to monitor the paging PDCCH may be determined on the basis of Equation 15 below.

$$i\_B = \text{floor}(UE\_ID/M) \bmod N_B \qquad \text{Equation 15}$$

In the above equation, $N_B$ may correspond to the number of partial areas within a specific control resource set configured in the UE for paging by the BS. $N_B$ may be explicitly configured in the UE by the BS or may be explicitly derived by another system parameter value (for example, the number of configured partial areas).

According to the second embodiment of the disclosure, it is possible to more subdivide the number of UEs monitoring the paging PDCCH in the frequency axis to group the same. Accordingly, there is an effect of minimizing power consumption of the UE that can be unnecessarily wasted and efficiently managing paging by the BS.

Third Embodiment

As described above, after receiving the paging PDCCH, the UE may acquire scheduling information for the PDSCH including the paging message from a DCI format transmitted through the corresponding PDCCH. The UE may determine whether to wake up or not on the basis of the UE ID value transmitted through the received paging message. When a UE ID which is the same as the UE ID value configured for paging that the UE currently assumes is indicated by the paging message, the UE may wake up and perform the following operation (for example, RRC connection operation and the like). When the UE ID which is the same as the UE ID value configured for paging that the UE currently assumes is not indicated by the paging message, the UE may maintain the conventional operation (operation of monitoring the paging PDCCH according to the DRX cycle) without waking up. Accordingly, the UE can know whether to wake up or not after the PDSCH decoding is completed, and thus unnecessary power consumption due to the PDSCH decoding operation is generated. In order to solve the problem, the third embodiment of the disclosure proposes a method of indicating whether to decode the PDSCH transmitting the paging message of the UE through L1 signaling. Thereafter, in the description of various embodiments of the disclosure, an indicator indicating whether to decode the PDSCH transmitting the paging message is named a "paging group indicator".

In various embodiments of the disclosure, the BS may transmit the paging group indicator to the UE through L1 signaling (for example, a DCI format scrambled by a P-RNTI).

In various embodiments of the disclosure, the BS may transmit all or some of the bits of an ID of a UE (that is, a UE ID transmitted through the paging message) to be woke up through paging to the UE by the paging group indicator. For example, when the UE ID transmitted through the paging message is N bits, M (≤N) bits corresponding to the most significant bit (MSB) or the least significant bit (LSB) may be transmitted from the BS to the UE through the paging group indicator. The UE may compare all or some of the UE ID indicated as the M bits with all or some of the UE ID value configured for paging that is currently assumed, and when it is determined that they are the same as each other, perform a decoding procedure for the paging PDSCH. For example, when N bits are configured in the UE as the UE ID for paging, the UE may compare the M-bit value received through a paging group indicator field within the DCI format scrambled by the P-RNTI with MSB M bits (or LSB M bits) among the N bits of the UE ID for paging. When they are the same as each other, a decoding operation for the PDSCH scheduling the DCI format scrambled by the corresponding P-RNTI may be subsequently performed. When they are not the same as each other, a decoding operation for the PDSCH scheduling the DCI format scrambled by the corresponding P-RNTI may not be performed. In various embodiments of the disclosure, the BS may transmit a "paging group indicator" including all or some of one or a plurality of UE IDs.

In various embodiments of the disclosure, the BS may transmit a "UE group index" to be woke up through paging to the UE by the paging group indicator. The UE may belong to a predetermined UE group including one or a plurality of UEs, and the group to which the UE belongs may be explicitly configured in the UE by the BS through higher-layer signaling or may be implicitly determined by other system parameters. The BS may transmit the paging group indicator indicating a UE group index to the UE by using the DCI format scrambled by the P-RNTI. At this time, the BS may include index information of the UE group to which the UE to be woke up belongs. For example, the BS may indicate one of a total of $2_B$ ($2^B$−1) UE group indexes to the UE through the paging group indicator having the size of B bits. The UE may determine whether the UE group index indicated by the BS is the same as the UE group index included in the UE. The following decoding procedure for the paging PDSCH may be performed when it is determined that the UE group indexes are the same as each other, and the following decoding procedure for the paging PDSCH may not be performed when it is determined that the UE group indexes are not the same as each other. In a detailed example, when UE #1, UE #2, UE #3, and UE #4 exist, UE group #1={UE #1, UE #2}, and UE group #2={UE #3, UE #4}, the BS may insert information indicating whether the UE group is UE group #1 or UE group #2 into the DCI format scrambled by the P-RNTI through the paging group indicator having the size of 1 bit to indicate the same to the UE. When the BS indicates UE group #1, UE #1 and UE #2 existing in UE group #1 may perform the decoding operation for the paging PDSCH scheduled by the corresponding received DCI format, and UE #3 and UE #4 which do not exist in UE group #1 (that is, existing in UE group #2) may not perform the decoding operation for the paging PDSCH scheduled by the corresponding received DCI format. As described above, there may be a UE group A including one or a plurality of UEs monitoring the paging PDCCH within a specific paging occasion (or a specific PDDCH monitoring occasion) in a specific paging frame (a method of determining the UE group A may be determined by Equation 7 to Equation 11 above. The UE group indicated by the "UE group index" may correspond to a UE group obtained by dividing a plurality of UEs existing in the UE group A into sub groups. For example, UE #1, UE #2, UE #3, . . . , UE #8 may belong to the UE group A, and UEs existing in the UE group A may be configured such that UE group #1={UE #1, UE #2}, UE group #2={UE #3, UE #4}, UE group #3={UE #5, UE #6}, and UE group #4={UE #7, UE #8}. The UE may receive "UE group index" information indicating one UE group index among UE group #1, UE group #2, UE group #3, and UE group #4. In various embodiments of the disclosure, the BS may transmit one or a plurality of "UE group indexes" to the UE. In various embodiments of the disclosure, as a method of determining a UE group of a specific UE, a method of performing grouping through a predetermined rule on the basis of a UE ID for paging configured in the UE. For example, when the size of the paging group indicator field is B bits, a method of grouping UEs (that is, UEs assuming a UE ID belonging to the UE group A) belonging to the UE group A monitoring the paging PDCCH within a specific paging occasion (or a specific paging PDCCH monitoring occasion) in a specific paging frame into $2^B$ groups uniformly according to UE IDs. For example, the UE group may be determined by performing a modulo operation for the ID value by $2^B$. For example, the UE group may be determined on the basis of Equation 16 below.

$$\text{Group index}=\text{mod}(\text{floor}(UE\_ID/M),2^B) \quad \text{Equation 16}$$

In Equation 16, M may be determined as a combination of parameters such as the number N of paging frames existing in the DRX cycle T, the number Ns of paging occasions within the paging frame, and the number S*X of PDCCH monitoring occasions within the paging occasion. For example, M=N*Ns and M=N*Ns*S*X.

In various embodiments of the disclosure, the size B of the paging group indicator group may be configured in the UE by the BS through higher-layer signaling, configured as a predetermined fixed value, implicitly determined by a field size value of a specific field of the DCI format scrambled by the P-RNTI, or implicitly determined by other system parameter values.

In various embodiments of the disclosure, the BS may transmit the paging group indicator within the DCI format scrambled by the P-RNTI to the UE. The DCI format scrambled by the P-RNTI may include, for example, the following fields.

Short message indicator—2 bits
Short message—8 bits according to Clause 6.5 of [9, TS38.331]; if only scheduling information for paging is transmitted, this field is reserved.
Frequency domain resource allocation information—log $[N_{RB}^{DLBWP}(N_{RB}^{DL,BWP}+1)/2)]$ bits; If only a short message is transmitted, this field is reserved. $N^{DL,BWP}_{RB}$ is defined as the number of RBs in a downlink bandwidth part.
Time domain resource allocation information—4 bits; if only a short message is transmitted, this field is reserved.
VRB-to-PRB mapping—1 bits according to Table 7.3.1.2.2-5; if only a short message is transmitted, this field is reserved.
Modulation and coding scheme—5 bits; if only a short message is transmitted, this field is reserved.
TB scaling—2 bits as defined in Clause 5.1.3.2 of [6, TS38.214]; if only a short message is transmitted, this field is reserved.
Reserved bit—8 bits for operation in a cell with shared spectrum channel access; Otherwise, 6 bits

TABLE 20

| Bit field | Short Message indicator |
|---|---|
| 00 | Reserved |
| 01 | Only scheduling information for Paging is present in the DCI |
| 10 | Only short message is present in the DCI |
| 11 | Both scheduling information for Paging and short message are present in the DCI |

Table 20 shows a short message indicator within a DCI format scrambled by a P-RNTI.

Referring to Table 20, the short message indicator is reserved when a bit field is 00, and the short message indicator indicates that only scheduling information for paging is present in DCI when the bit field is 01, indicate that only a short message is present in DCI when the bit field is 10, and indicates that both the scheduling information for paging and the short message are present in DCI when the bit field is 11.

In various embodiments of the disclosure, the paging group indicator may be transmitted using a specific field of the DCI format scrambled by the P-RNTI. For example, some of the fields within the DCI format scrambled by the P-RNTI may be used as the paging group indicator. For example, the following methods may be used.

[Method 1]

Among the fields of the DCI format scrambled by the P-RNTI, the "short message" field may be reanalyzed and used as the paging group indicator field. More specifically, when it is indicated that only scheduling information for paging exists through the "short message indicator" field, the corresponding "short message" field may not be used but may be reserved. The following description may be referenced.

Short message—8 bits according to Clause 6.5 of [9, TS38.331]; if only scheduling information for paging is transmitted, this field is reserved.

In this case, the "short message" field is a non-used field and thus can be used for another purpose, and accordingly, may be used as the paging group indicator field.

[Method 2]

Among the fields of the DCI format scrambled by the P-RNTI, a "reserved bit" field may be reanalyzed and used as the paging group indicator field. In general, the "reserved bit" field has the size of 6 bits or 8 bits (only for the shared spectrum operation), which corresponds to a reserved bit field without being used. Accordingly, all or some of the bits corresponding to the "reserved bit" field may be used for the paging group indicator. Whether to reanalyze and use the "reserved bit" field as the paging group indicator field may be explicitly configured in the UE by the BS through higher-layer signaling (MIB, SIB, RRC, or the like), implicitly determined on the basis of configuration information (for example, UE group configuration information) related to paging configured in the UE by the BS, or predetermined by some of the system parameters.

In various embodiments of the disclosure, whether to reanalyze the specific field of the DCI format scrambled by the P-RNTI as the paging group indicator may be explicitly configured in the UE by the BS, implicitly determined by a combination of values of specific fields within the corresponding DCI format, or determined by a predetermined scheme.

Figure 18:
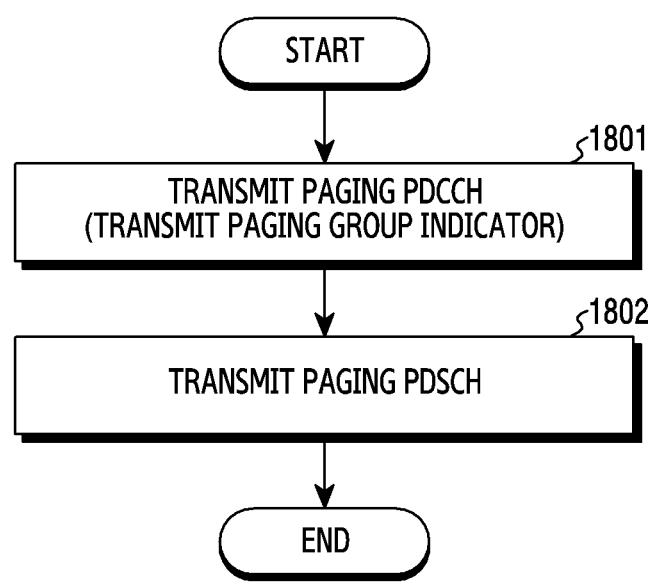
FIG. 18 illustrates an operation process of the BS in a wireless communication system according to various embodiments of the disclosure.

FIG. 18 illustrates an operation process of the BS in a wireless communication system according to various embodiments of the disclosure. Specifically, FIG. 18 illustrates the operation process of the BS according to the third embodiment of the disclosure.

Referring to FIG. 18, in operation 1801, the BS may transmit a paging PDCCH in order to wake up one or a plurality of UEs, and at this time, the paging group indicator may be included and transmitted in a DCI format scrambled by a P-RNTI transmitted through the paging PDCCH. The BS may determine a paging group indicator value on the basis of a UE ID value configured in the UE to be woke up. That is, the content of a UE group to which the UE having the UE ID to be woke up belongs or a paging group indicator including the UE ID may be generated and transmitted.

In operation 1802, the BS may transmit a PDSCH including a paging message for one or a plurality of UEs to be woke.

Figure 19:
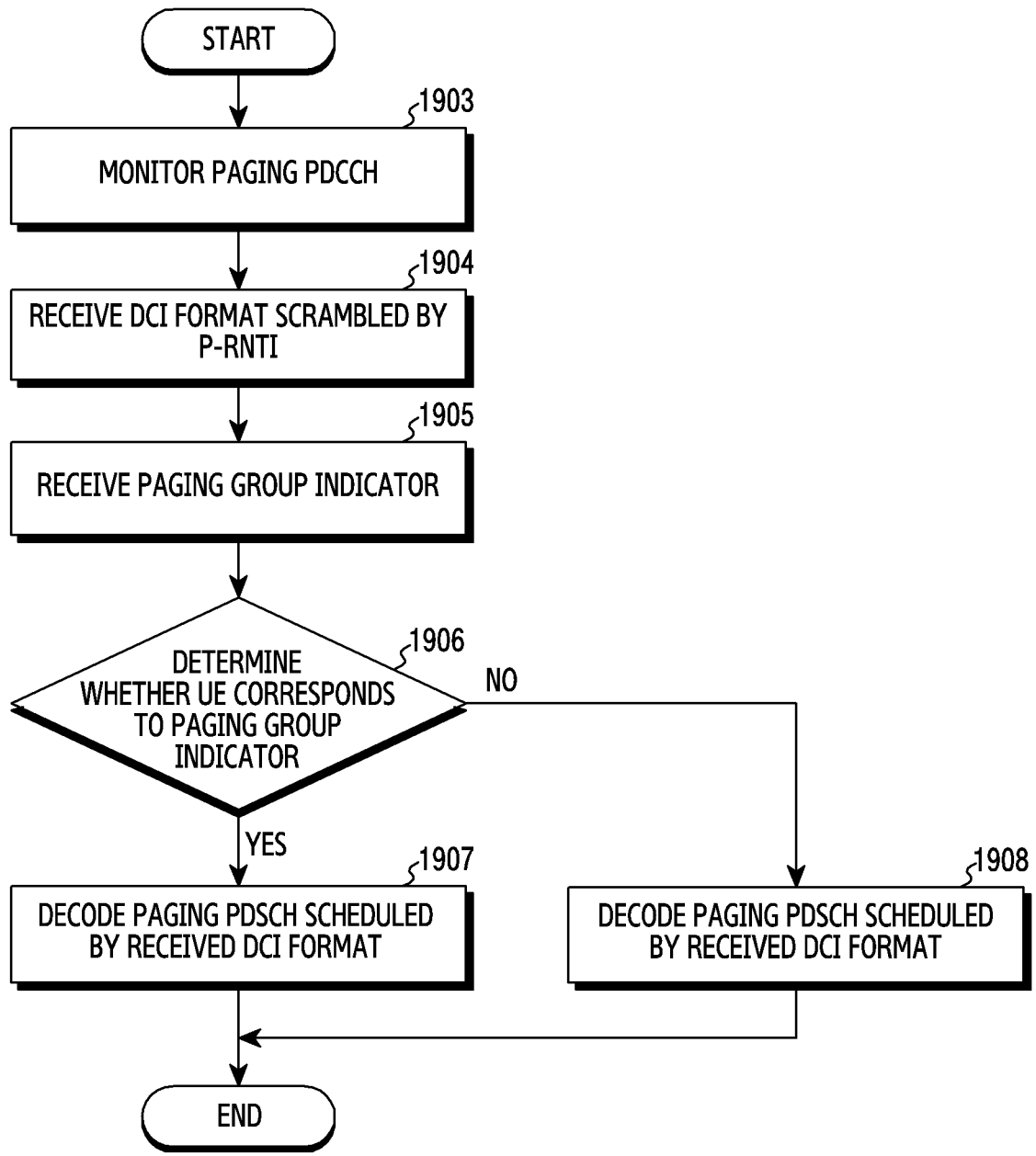
FIG. 19 illustrates an operation process of the UE in a wireless communication system according to various embodiments of the disclosure.

FIG. 19 illustrates an operation process of the UE in a wireless communication system according to various embodiments of the disclosure. Specifically, FIG. 19 illustrates an operation process of the UE according to the third embodiment of the disclosure.

Referring to FIG. 19, in operation 1903, the UE may monitor a paging PDCCH.

In operation 1904, the UE may receive a DCI format scrambled by a P-RNTI transmitted through the paging PDCCH.

In operation 1905, the UE may receive a paging group indicator inserted into and transmitted through the corresponding DCI format.

In operation 1906, the UE may determine whether the content indicated by the corresponding paging group indicator corresponds to the UE itself. For example, the UE may determine whether all or some of the UE ID indicated by the paging group indicator are the same as all or some of the UE ID of the UE itself or whether a UE group index indicated by the paging group indicator is the same as a UE group index to which the UE belongs.

When it is determined that the content indicated by the paging group indicator corresponds to the UE itself in operation 1906, the UE may subsequently perform a decoding operation for a PDSCH for the paging message scheduled by the corresponding DCI format in operation 1907.

When it is not determined that the content indicated by the paging group indicator corresponds to the UE itself in operation 1906, the UE may not subsequently perform a decoding operation for a PDSCH for the paging message scheduled by the corresponding DCI format in operation 1908. In this case, the UE may continue the conventional operation of monitoring the paging PDCCH.

All the above-described embodiments of the disclosure may be implemented in combination.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

INDUSTRIAL APPLICABILITY

The disclosure relates to a 5G or a pre-5G communication system provided to support a higher data transmission rate than that of post-4G communication systems such as LTE. According to various embodiments of the disclosure, a method of operating a UE in a wireless communication system including a process of receiving a physical downlink control channel (PDCCH) configured by a paging-radio network temporary identifier (P-RNTI) in a configured paging occasion and a process of receiving a physical downlink shared channel (PDSCH) including a paging message having an identifier of the UE is provided.

The invention claimed is:

1. A method of operating a user equipment (UE) in a wireless communication system, the method comprising:
   configuring one or more physical downlink control channel (PDCCH) monitoring occasions within a configured paging occasion into at least one PDCCH monitoring occasion group;
   monitoring the PDCCH in a configured paging occasion based on one PDCCH monitoring occasion group among the at least one PDCCH monitoring occasion group, the one PDCCH monitoring occasion group indicated by a PDCCH monitoring occasion group index;
   acquiring a downlink control information (DCI) format through the PDCCH;
   acquiring a paging group indicator included in the DCI format;
   receiving a physical downlink shared channel (PDSCH) scheduled by the DCI format;
   determining whether the UE corresponds to the paging group indicator; and
   decoding the PDSCH, based on whether the UE corresponds to the paging group indicator,
   wherein the PDCCH monitoring occasion group index is included in a PDCCH monitoring indexes associated with one or more PDCCH monitoring occasions,
   wherein the PDCCH monitoring occasion group index is identified based on synchronization signal (SS)/physical broadcast channel (PBCH) block, and
   wherein while the PDCCH is monitored per discontinuous reception (DRX) cycle, the PDCCH monitoring occasion indexes are shifted by an integer associated with the SS/PBCH block.

2. The method of claim 1, wherein the PDCCH is scrambled by a paging-radio network temporary identifier (P-RNTI).

3. The method of claim 2, wherein the paging group indicator is included in at least one of a plurality of fields within the DCI format scrambled by the P-RNTI.

4. The method of claim 1, wherein whether the UE corresponds to the paging group indicator is determined based on whether all or some of a UE identifier indicated by the paging group indicator are identical to all or some of an identifier of the UE.

5. The method of claim 1, wherein whether the UE corresponds to the paging group indicator is determined based on whether a UE group index indicated by the paging group indicator is identical to an index of a UE group to which the UE belongs.

6. The method of claim 1, wherein the decoding of the PDSCH is performed in response to the UE corresponds to the paging group indicator.

7. The method of claim 1, further comprising, in case that the UE does not correspond to the paging group indicator, monitoring the PDCCH in the configured paging occasion without decoding the PDSCH.

8. A user equipment (UE) in a wireless communication system, the UE comprising:
   at least one transceiver;
   at least one processor communicatively coupled to the at least one transceiver; and
   at least one memory, communicatively coupled to the at least one processor, storing instructions executable by the at least one processor individually or in any combination to cause the UE to:
     configure one or more physical downlink control channel (PDCCH) monitoring occasions within a configured paging occasion into at least one PDCCH monitoring occasion group,
     monitor the PDCCH in a configured paging occasion based on one PDCCH monitoring occasion group among the at least one PDCCH monitoring occasion group, the one PDCCH monitoring occasion group indicated by a PDCCH monitoring occasion group index,
     acquire a downlink control information (DCI) format through the PDCCH,
     acquire a paging group indicator included in the DCI format,
     receive a physical downlink shared channel (PDSCH) scheduled by the DCI format,
     determine whether the UE corresponds to the paging group indicator,
     decode the PDSCH, based on whether the UE corresponds to the paging group indicator,
   wherein the PDCCH monitoring occasion group index is included in a PDCCH monitoring indexes associated with one or more PDCCH monitoring occasions,
   wherein the PDCCH monitoring occasion group index is identified based on synchronization signal (SS)/ physical broadcast channel (PBCH) block, and
   wherein while the PDCCH is monitored per discontinuous reception (DRX) cycle, the PDCCH monitoring occasion indexes are shifted by an integer associated with the SS/PBCH block.

9. The UE of claim 8, wherein the PDCCH is scrambled by a paging-radio network temporary identifier (P-RNTI).

10. The UE of claim 9, wherein the paging group indicator is included in at least one of a plurality of fields within the DCI format scrambled by the P-RNTI.

11. The UE of claim 9, wherein whether the UE corresponds to the paging group indicator is determined based on whether all or some of a UE identifier indicated by the paging group indicator are identical to all or some of an identifier of the UE.

12. The UE of claim 9, wherein whether the UE corresponds to the paging group indicator is determined based on whether a UE group index indicated by the paging group indicator is identical to an index of a UE group to which the UE belongs.

13. The UE of claim 9, wherein the decoding of the PDSCH is performed in response to the UE corresponds to the paging group indicator.

14. The UE of claim 9, wherein the at least one processor is further configured to, in case that the UE does not correspond to the paging group indicator, monitor the PDCCH in a configured paging occasion without decoding the PDSCH.

\* \* \* \* \*